United States Patent
Okada et al.

(10) Patent No.: US 6,585,420 B2
(45) Date of Patent: Jul. 1, 2003

(54) WHEEL SUPPORT BEARING ASSEMBLY AND ANTI-SKID BRAKE DEVICE USING THE SAME

(75) Inventors: Koichi Okada, Iwata (JP); Hisashi Ohtsuki, Iwata (JP); Koji Sahashi, Iwata (JP); Kenichi Suzumura, Iwata (JP); Kazuhiko Hozumi, Iwata (JP); Akira Torii, Iwata (JP); Takayuki Norimatsu, Iwata (JP); Hiroaki Ohba, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/917,875

(22) Filed: Jul. 31, 2001

(65) Prior Publication Data

US 2002/0033638 A1 Mar. 21, 2002

(30) Foreign Application Priority Data

| Aug. 1, 2000 | (JP) | 2000-233046 |
| Aug. 9, 2000 | (JP) | 2000-241207 |
| Aug. 11, 2000 | (JP) | 2000-243777 |
| Apr. 10, 2001 | (JP) | 2001-111108 |

(51) Int. Cl.$^7$ .............................................. F16C 32/00
(52) U.S. Cl. ..................... 384/448; 73/514.39; 303/168
(58) Field of Search .......................... 384/448; 324/177, 324/174; 73/514.39; 303/20, 168

(56) References Cited

U.S. PATENT DOCUMENTS

| 5,079,468 A | * | 1/1992 | Sata ........................... 310/168 |
| 5,309,094 A | | 5/1994 | Rigaux et al. |
| 5,523,680 A | * | 6/1996 | Sumi ........................... 324/174 |
| 5,744,720 A | * | 4/1998 | Ouchi ........................ 73/514.39 |
| 5,828,135 A | * | 10/1998 | Barrett ........................... 290/3 |
| 5,967,669 A | * | 10/1999 | Ouchi ........................... 384/448 |
| 6,037,766 A | | 3/2000 | Goossens et al. |
| 6,049,138 A | * | 4/2000 | Folk ............................... 290/3 |
| 6,229,298 B1 | * | 5/2001 | Sakamoto et al. .......... 324/174 |
| 6,406,186 B1 | * | 6/2002 | Torii et al. .................. 384/448 |

FOREIGN PATENT DOCUMENTS

| DE | 44 20 887 A1 | 12/1994 |
| EP | 0 594 550 A1 | 4/1994 |
| GB | 2 233 767 A | 1/1991 |

* cited by examiner

Primary Examiner—Jack Lavinder
Assistant Examiner—Benjamin Pezzlo
(74) Attorney, Agent, or Firm—Sughrue Mion, PLLC

(57) ABSTRACT

To provide a wheel support bearing assembly having a capability of detecting the number of revolutions of a wheel, having no risk of breaking of wire outside a vehicle body, capable of reducing the weight and cost of an automotive vehicle. This wheel support bearing assembly for rotatably supporting a wheel 13 relative to a vehicle body structure 12 includes an outer member 1 having its inner periphery formed with plural rows of raceways 6 and 7, an inner member 2 having raceways 8 and 9 confronting respectively to the raceways 6 and 7, and rows of rolling elements 3 accommodated respectively between the raceways. An electric generator 4 for generating an electric power as one of the outer and inner members 1 and 2 rotates relative to the other of the outer and inner members 1 and 2. A signal indicative of the number of revolutions of the wheel 13 outputted from the electric generator 4 is transmitted wireless by mean of a wireless transmitting means 5A.

25 Claims, 36 Drawing Sheets

FIG. 4A
FIG. 4B
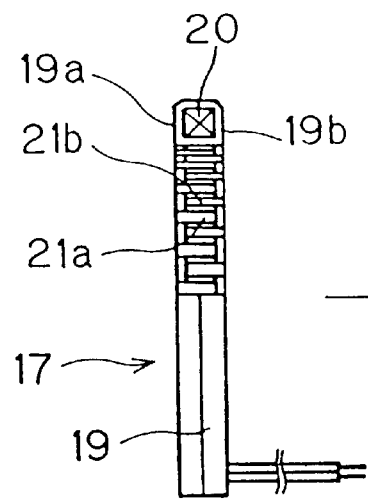
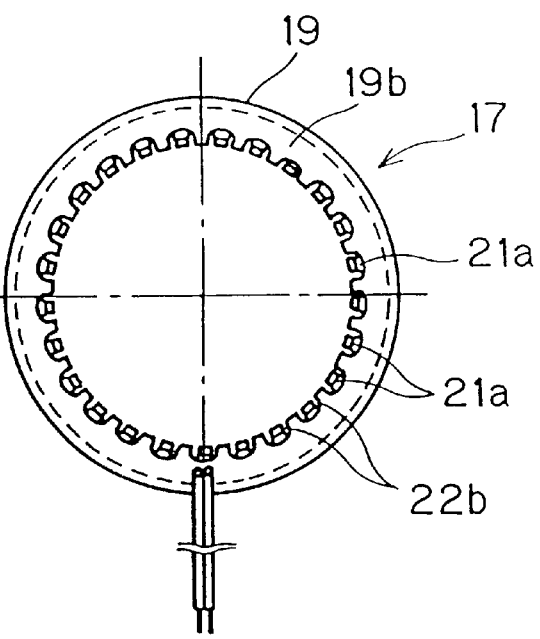
Fig.5A
Fig.5B
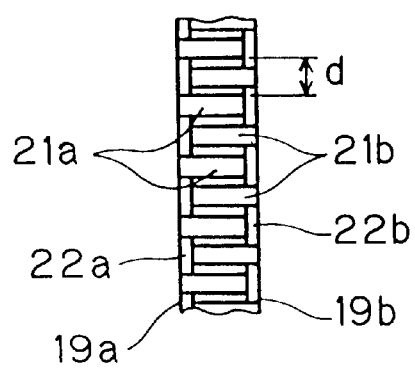
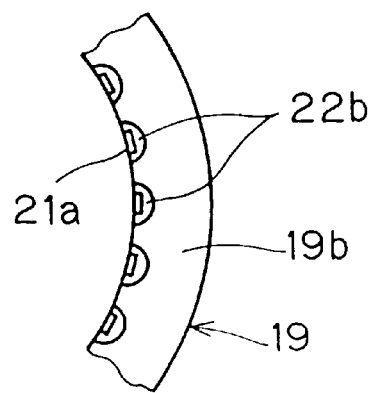

Charging Path During High Speed Run

Discharge Path During Low Speed Run

Constant Voltage Electric Generator
(Estimated DATA)

Generated Voltage Characteristic of Secondary Trial Electric Generator (Non-Load)

Generated Voltage Characteristic of Secondary Trial Electric Generator (200 Ω Load)

WHEEL SUPPORT BEARING ASSEMBLY AND ANTI-SKID BRAKE DEVICE USING THE SAME

BACKGROUND OF THE INVENTION

1. Field of the Invention

The present invention relates to a wheel support bearing assembly for use in an automotive vehicle or the like and including an electric generator that serves as a means for detecting the number of revolution for an anti-skid braking mechanism, and an anti-skid brake device using such wheel support bearing assembly.

2. Description of the Prior Art

An anti-skid brake device (ABS) is known as used for detecting the incipiency of a tire lock occurring on a low frictional road surface or at the time of a panic stricken braking so that braking can be relieved to secure a tire grip to thereby stabilize the steerability. A sensor for detecting the number of revolutions of wheel for detecting the incipiency of the tire being locked is provided in a wheel support bearing assembly. Generally a pulsar ring is provided at an end portion or the like of raceways in a bearing outside and a sensor portion is provided in face-to-face relation with the pulsar ring.

Also, as a wheel support bearing assembly having the sensor built therein, such a bearing assembly as shown in FIG. 49 has hitherto been suggested, which includes a sensor portion 57 incorporated in a bearing outer race 51 which serves as a stationary member. See, for example, the Japanese Laid-open Utility Model Publication No. 1-156464. This prior art bearing assembly includes an outer race 51 for securement to a vehicle body structure, an inner race 52 mounted on a shaft portion of a hub wheel 54, a plurality of rolling elements 53 interposed between the inner race 51 and the outer race 52, and a sealing member 60. The rotation sensor 55 is of a structure wherein the sensor portion 57 is inserted into a hole 58 defined in the outer race 51 so as to confront and align with the pulsar ring 56 provided in an outer peripheral surface of the inner race 52. The use of the sensor built in the bearing assembly is effective to reduce the size of the wheel support bearing assembly as compared with the arrangement in which the pulsar ring and the sensor portion are disposed at the end of the bearing outside.

The prior art wheel support bearing assembly having built therein the sensor for detecting the number of revolutions of the wheel is such that detection signals generated by the sensor and supply of an electric power to the sensor are interfaced with the vehicle body structure by means of a wiring. In the prior art shown in FIG. 49, signal interfacing and supply of the electric power are carried out by means of an electric line 59. As such, the prior art wheel support bearing assembly makes use of the electric wire for drawing a sensor output or the like, and this electric wire is exposed to the outside of the vehicle body structure at a location between the wheel support bearing assembly and the vehicle body structure. Because of this, the electric line is susceptible to breakage or the like by the effect of stones hitting and/or frozen snow within a tire housing. Also, in the case of a steering wheel, it is necessary for the electric wire to be twisted beforehand and often times a relatively large number of processing steps is required. The electric wire referred to above also requires sheathing thereof and, therefore, reduction in weight of an automotive vehicle tends to be hampered and, in view of the large number of steps of fixing the electric wire, a high cost tends to be incurred.

Also, although the conventional wheel support bearing assembly of the type in which the sensor is built therein as shown in FIG. 49 can be assembled relatively compact, servicing of the rotation sensor 55 requires dismantling of the outer and inner races 51 and 52 of the wheel support bearing assembly, resulting in a problem that the servicing cannot be performed efficiently. For this reason, once the rotation sensor 55 fails to operate, the wheel support bearing assembly as a whole would be required to replace with a new one. In addition, although the conventional wheel support bearing assembly shown in FIG. 49 is of the type wherein the rotation sensor is built therein, since a portion of the sensor portion 57 is exposed outside the bearing assembly, no sufficient reduction in size thereof is still achieved. Yet, the conventional wheel support bearing assembly shown in FIG. 49 has a problem in that sealing of a hole 58 defined in the outer race 51 for receiving the sensor portion 57 is difficult to achieve, making it difficult to prevent any ingress of foreign matter.

In order to alleviate the foregoing problems, it may be contemplated to install the electric generator, which generates an electric power by relative rotation of the inner and outer races, within an annular space delimited between the inner and outer races, in combination with a wireless transmitting means for transmitting wireless a signal outputted from the electric generator and indicative of the number of revolutions of the wheel.

However, cable connection between the stator coil of the built-in electric generator and the wireless transmitting means positioned outside the bearing assembly requires a complicated and time-consuming wiring job, posing a problem associated with increase of the number of assembling steps. Also, a complicated and time-consuming procedure would also be required to seal a hole for passage of the cable.

Also, in an anti-skid brake device, the use of a magnetic coupling may be contemplated for the wireless transmission discussed hereinabove. In other words, magnetic communication may be used with no field emissive antenna. Where a feeble radio wave is used, it may be contemplated to amplitude modulate a carrier wave of a low frequency of about 2 MHz with a signal generated from the sensor.

However, in the case where the carrier wave is amplitude modulated with the feeble radio wave, external electromagnetic disturbances may often enter a receiver as an amplitude signal.

Where the wireless transmitting and receiving means is operable relying on the magnetic coupling, there is a problem that it tends to be adversely affected by up and down bumping of the wheel although there is little influence brought about by peripheral equipments.

Also, it may be contemplated to form the rotation sensor with the electric generator and also to use it as an electric power source for the wireless transmitting means. In such case, however, the electric power generated by the electric generator tends to decrease when the number of revolutions of the wheel decrease as a result of a braking force applied to the wheel, failing to sufficiently drive a transmitting circuit of the wireless transmitting means.

SUMMARY OF THE INVENTION

An object of the present invention is to provide an improved wheel support bearing assembly having a capability of detecting the number of revolutions of a wheel, substantially free from wire breakage occurring outside a vehicle body, and capable of contributing to reduction in weight and cost of the automotive vehicle.

Another object of the present invention is to provide an improved anti-skid brake device wherein a detection signal indicative of the number of revolutions of the wheel can be transmitted and received wireless, and the possibility of wire breakage taking place outside the vehicle body is eliminated, and which is less sensitive to an influence brought about by noises and substantially free from an erroneous operation while allowing the automotive vehicle to be manufactured lightweight at a reduced cost.

A further object of the present invention is to provide an improved anti-skid brake device which is less sensitive to an influence brought about by peripheral equipments during wireless transmission and reception, and also to an influence which would be brought about by up and down bumping of the wheel.

According to one aspect of the present invention, there is provided a wheel support bearing assembly for rotatably supporting a wheel relative to an automotive body structure. This wheel support bearing assembly includes an outer member having an inner peripheral surface formed with plural rows of raceways; an inner member having raceways defined therein in face-to-face relation with the raceways in the outer member; and plural rows of rolling elements accommodated between the raceways in the outer and inner members. An electric generator for generating an electric power as one of the outer and inner members rotates relative to the other of the outer and inner members is uniquely provided in combination with a wireless transmitting means for transmitting wireless a signal indicative of a number of revolutions of the wheel that is outputted from the electric generator.

According to the structure, since the electric generator capable of generating an electric power as a relative rotation between the outer member and the inner member is employed, it is possible to detect the number of revolutions of the wheel by the utilization of an output of the electric generator as a signal indicative of the number of revolutions of the wheel. Also, since the use has been made of the wireless transmitting means for transmitting wireless the signal outputted from the electric generator, no electric wire for drawing the detection signal indicative of the number of revolutions of the wheel to a control unit is necessary. Since the electric generator is used as a sensor, no electric power supply wire for the supply of an electric power to the sensor is necessary. The electric power obtainable from the electric generator can be used also as an electric power for the wireless transmitting means. For these reasons, no electric wire is exposed to the outside of the vehicle body structure and there is no possibility of the wires being broken, thereby eliminating any complicated and time-consuming wiring job while contributing to reduction in weight and cost of the automotive vehicle.

The wireless transmitting means which can be employed in the practice of the present invention may not be always limited to a type utilizing radio waves, but may be of a type capable of transmitting by means of a magnetic coupling, infrared rays of light, ultrasonic waves or any other signal that can travel in the air.

According to a second aspect of the present invention, the present invention provides an anti-skid brake device provided with a wheel support bearing assembly of the structure herein provided in accordance with the first aspect of the present invention. In this anti-skid brake device, the electric generator includes a pulsar ring mounted on a rotary member of a wheel, and a sensor mounted on a wheel support member in face-to-face relation with the pulsar ring and wherein the transmitting means is installed on the wheel support member. The anti-skid brake device so structured is operable to control a braking force in response to a signal indicative of a number of revolutions of a wheel that has been detected. Specifically, this anti-skid brake device includes a control circuit installed on a vehicle body structure for controlling the braking force, and a wireless transmitting and receiving means including the transmitting means and a receiving means installed on the vehicle body structure for transmitting and receiving wireless a signal of the sensor. The transmitting means is capable of transmitting a feeble radio wave by frequency modulating a carrier wave with the signal of the sensor.

According to the above described structure of the anti-skid brake device, since the signal detected by the sensor and indicative of the number of revolutions of the wheel is transmitted wireless from the transmitting means in the wheel support member to the receiving means in the vehicle body structure, no electric wire for transmission of the sensor signal between the wheel support member and the vehicle body structure is exposed to the outside of the vehicle body structure. For this reason, there is no possibility of the electric wire being broken by stone hitting and/or frozen snow within the tire housing. Also, the use of any electric wire for transmission of the sensor signal between the wheel support member and the vehicle body structure can be dispensed with, thereby eliminating the need of a complicated and time-consuming wiring work while contributing to reduction in weight and cost of the automotive vehicle.

In addition, since the wireless transmitting means employed is of a type capable of transmitting the sensor signal by frequency modulating (FM) a carrier wave to provide a feeble radio wave, selection of the modulating method makes it difficult to be adversely affected by external electromagnetic disturbances.

Yet, according to a third aspect of the present invention, there is also provided an anti-skid brake device provided with a wheel support bearing assembly of the structure herein provided in accordance with the first aspect of the present invention. The electric generator employed in this anti-skid brake device includes a pulsar ring mounted on a rotary member of a wheel, and a sensor mounted on a wheel support member in face-to-face relation with the pulsar ring and wherein the transmitting means is installed on the wheel support member, said anti-skid brake device being operable to control a braking force in response to a signal indicative of a number of revolutions of a wheel that has been detected. This anti-skid brake device includes a control circuit installed on a vehicle body structure for controlling the braking force, and a wireless transmitting and receiving means including the transmitting means and a receiving means installed on the vehicle body structure for transmitting and receiving wireless a signal of the sensor, wherein the transmitting and receiving means is of a type capable of transmitting and receiving wireless by means of a magnetic coupling between the transmitting means and the receiving means. A transmitting coil of the transmitting means and a receiving coil of the receiving means are arranged such that respective centers of those coils lie at right angles to an axis of revolution of the wheel and horizontally.

Since the transmission system based on the magnetic coupling has a directivity, the influence brought about by peripheral equipments is minimal. For this reason, any possible erroneous operation resulting from external disturbances can be avoided.

In communication using magnetism, depending on the ratio between the diameter and the length of the transmitting coil and depending on the distance between the transmitting coil and the receiving coil, there is a case in which the transmitting coil and the receiving coil are to be arranged in parallel to each other or a case in which they are to be arranged in series with each other. Where the transmitting coil and the receiving coil are arranged on the wheel support member and the automotive body structure, respectively, the distance between these coils is too large and, therefore, the series arrangement is generally preferred. However, in such case, deviation would occur in axes of coil ends as a result of up and down bumping of the wheel, resulting in a considerable change in transmission efficiency.

For this reason, if the transmitting coil and the receiving coil are so arranged that these coils lie at right angle relative to the axis of revolution of the wheel and horizontally, change in magnetic field towards the receiving coil can be suppressed more than the series arrangement even though the wheel undergoes up and down bumping.

It is to be noted that in the case of the steering wheel, the reason that the receiving coil is arranged so as to be perpendicular to the axis of revolution of the wheel is relative to the axis of revolution in the case of a straight run in which the wheel is not tilted relative to the automotive body structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4A is a broken-out side view of a ring member forming a part of the electric generator;

FIG. 4B is a front elevational view of the ring member shown in FIG. 4A;

FIG. 5A is an enlarged view showing a portion of FIG. 4A;

FIG. 5B is an enlarged view showing a portion of FIG. 4B;

DETAILED DESCRIPTION OF THE EMBODIMENTS

Figure 1:
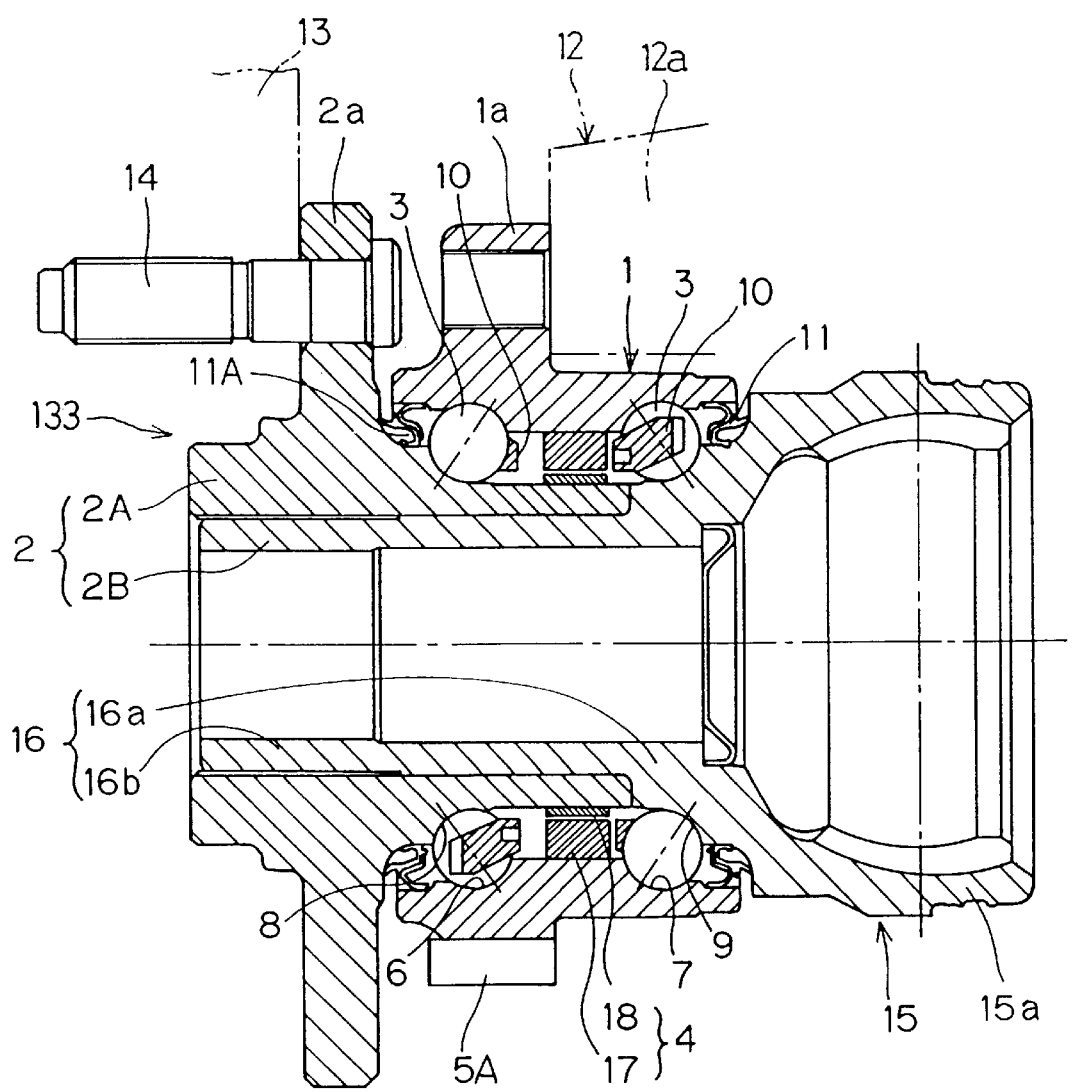
FIG. 1 is a sectional view of a wheel support bearing assembly according to a first preferred embodiment of the present invention.
Figure 2:
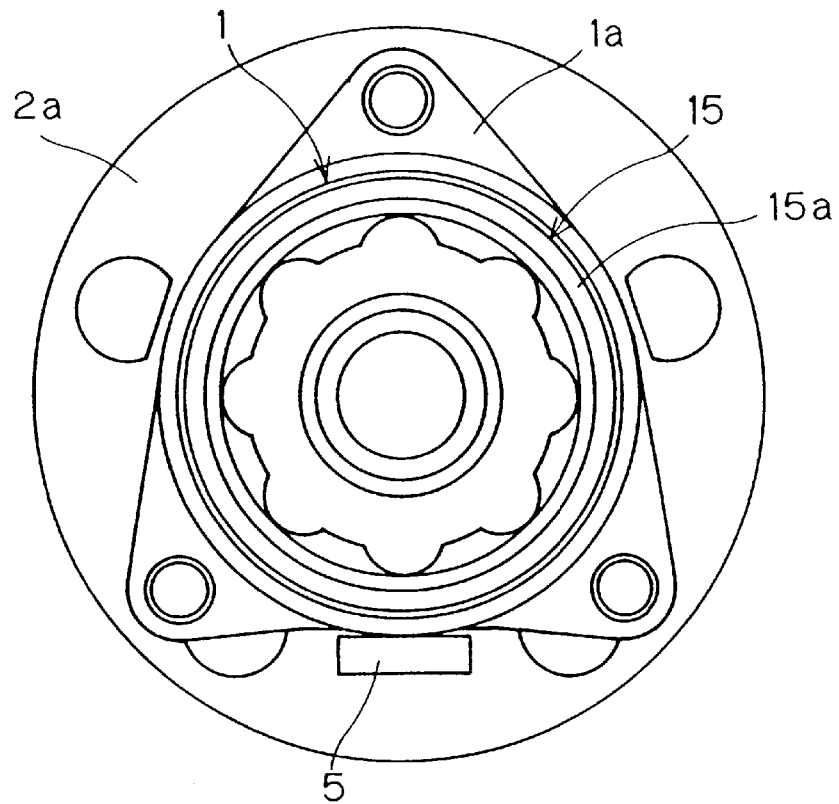
FIG. 2 is a side view of the wheel support bearing assembly as viewed from a direction of a constant speed joint employed therein.

A first preferred embodiment of the present invention will now be described with reference to FIGS. 1 to 5. This embodiment is directed to an inner race rotating type of the fourth generation and is illustrative of application to a bearing assembly for support of a drive wheel. This embodiment corresponds to the invention as defined in claim 5.

A wheel bearing assembly shown therein is of a design in which a plurality of rows of rolling elements 3 are rollingly interposed between an outer member 1 and an inner member 2, an electric generator 4 which concurrently serves as a rotation sensor is disposed within an annular space defied between the outer and inner members 1 and 2, and a transmitting means 5A is provided for transmitting wireless a rotational signal indicative of the number of revolutions outputted from the electric generator 4. The electric generator 4 is interposed between the two rows of the rolling elements 3 and 3.

The outer member has an inner peripheral surface formed with a plurality of rows of raceways 6 and 7, and raceways 8 and 9 opposed respectively to the raceways 6 and 7 are defined in an outer peripheral surface of the inner member 2. The rows of the rolling elements 3 are rollingly accommodated respectively between the raceways 6 and 8 and between the raceways 6 and 9. The wheel bearing assembly shown therein is of a type generally referred to as a double row angular contact ball bearing assembly, wherein the raceways 6 to 9 have their respective contact angles so defined as to achieve a back-to-back alignment. The rolling elements 3 are rollingly retained by retainers 10 employed one for each row of the rolling elements 3. Opposite ends of the inner and outer members 2 and 1 are tightly sealed by respective sealing members 11 and 11A.

The outer member 1 has one end formed with a radially outwardly extending vehicle body fitting flange 1a formed therewith for connection with an automotive body structure. Specifically, the vehicle body fitting flange 1a integral with the outer member 1 is adapted to be secured to a wheel bearing support member 12a such as, for example, a knuckle of the automotive body structure 12. It is to be noted that the outer member 1 is of one-piece structure including the vehicle body fitting flange 1a. On the other hand, the inner member 2 has a wheel fitting flange 2a protruding radially outwardly therefrom, to which fitting flange 2a is bolted a wheel 13 by means of a plurality of bolts 14.

The inner member 2 includes a hub wheel 2A formed integrally with the wheel fitting flange 2a and another inner race forming member 2B combined with the hub wheel 2A to define the inner member 2. The raceways 8 and 9 are formed on the hub wheel 2A and the inner race forming member 2B, respectively. The inner race forming member 2B is a member formed integrally with an outer race 15a of a constant speed joint 15, and an inner race (not shown) of the constant speed joint 15 is coupled with a drive shaft (not shown). The inner race forming member 2B has a shaft portion 16 extending integrally from the outer race 15a of the constant speed joint 15. The shaft portion 16 has a large diameter portion 16a adjacent the constant speed joint 15 and a reduced diameter portion 16b continued from the large diameter portion 16a through a radial step with the hub wheel 2A mounted on the reduced diameter portion 16b. The raceway 9 referred to hereinabove is formed on the large diameter portion 16a. The hub wheel 2A and the inner race forming member 2B are integrated together by means of a plastic coupling such as, for example, by the use of a staking technique.

The electric generator 4 is of a structure wherein a multi-pole magnet 18 is disposed radially inwardly of and in face-to-face relation with a ring-shaped coil/magnetic element combination 17 having a coil built therein. The coil/magnetic combination 17 is fitted to an inner peripheral surface of the outer member 1 which is a member on a stationary side and serves as a stator of the electric generator 4. The multi-pole magnet 18 is fitted to an outer peripheral surface of the inner member 2 which is a member on a rotatable side and, more specifically, to an outer peripheral surface of the hub wheel 2A and serves as a rotor of the electric generator 4.

The wireless transmitting means 5A is provided on a circumferential portion of the outer peripheral surface of the outer member 1 and includes a transmitter having electronic component parts enclosed within an outer casing. The outer casing referred to above is of a box-like configuration and is provided with a transceiver antenna (not shown) enclosed therein. This wireless transmitting means 5A is, for example, a transmitter capable of transmitting signals of feeble radio waves. The signal may be of a kind capable of turning on and off radio waves or of a kind capable of modulating a carrier wave on a frequency modulation scheme or the like. Other than that capable of transmitting radio waves, the wireless transmitting means 5A may be of a kind capable of transmitting by means of a magnetic coupling, transmitting light, for example, infrared rays of light, transmitting ultrasonic waves, or any other transmitter capable of transmitting signals in the air. For an electric power source of the wireless transmitting means 5A, the electric generator 4 is used. A receiving means (not shown) cooperable with the wireless transmitting means 5A is installed in, for example, a tire housing (not shown) in the automotive body structure, and signals can be transmitted to the receiving means to a control unit of an anti-skid brake system. The receiving means is fixed at a position within an unobstructed field of view of the transmitting means 5A with no metallic obstruction intervening therebetween, so that the signals such as radio waves transmitted from the transmitting means 5A can be efficiently received by the receiving means. Cables (not shown) for supplying an electric power generated from the electric generator 4 and also for outputting a rotation detection signal are connected between the transmitting means 5A and the coil of the coil/magnetic element combination 17 of the electric generator 4. These cables are passed through a cable hole formed in a peripheral wall of the outer member 1 so as to extend completely thereacross in a direction radially thereof with the cable hole being sealed by a sealant such as an elastic material or a wet-type sealant. It is, however, to be noted that as will become clear from subsequent embodiments of the present invention as will be described later connectors may be employed in place of the cables.

Figure 3A:
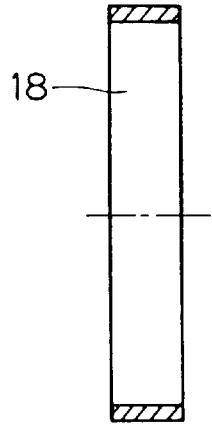
FIG. 3A is a sectional view of a multi-pole magnet of an electric generator.
Figure 3B:
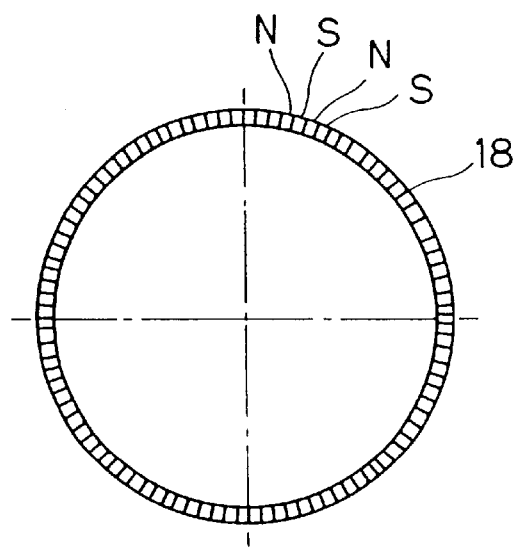
FIG. 3B is a front elevational view of the multi-pole magnet shown in FIG. 3A.

For the electric generator 4, that shown in, for example, FIGS. 3 to 5 is used. As shown in FIG. 3, the multi-pole magnet 18 is a ring-shaped member having N and S poles arranged alternately in a direction circumferentially thereof.

As shown in FIG. 4, the coil/magnetic element combination 17 is of a claw pole type. In other words, the coil/magnetic element combination 17 is of a design in which a plurality of magnetic poles made up of claws 21a and 21b of a pole shape are arranged alternately. FIGS. 5A and 5B are diagrams which show respective portions of FIGS. 4A and 4B on an enlarged scale.

More specifically, the coil/magnetic element combination 17 includes a ring member 19 made of a magnetic material and a coil 20 accommodated within the ring member 19. The ring member 19 has a sectional shape resembling to a groove shape oriented towards an inner periphery thereof, that is, the ring member 19 is of a generally U-shaped section opening radially inwardly having radially inwardly extending annular flanges 19a and 19b forming respective side walls of the ring member 19. Inner peripheral edges of the annular flanges 19a and 19b are formed with respective comb-shaped claws 21a and 21b so as to extend in respective directions opposed to each other such that the comb-shaped claws 21a integral with the annular flange 19a are interleaved with the comb-shaped claws 21b integral with the annular flange 19b in a direction circumferentially of the ring member 19, with all of those claws 21a and 21b being spaced an equal distance from each other in the circumferential direction of the ring member 19. Each of the comb-shaped claws 21a and 21b is of a rectangular shape having its longitudinal axis extending parallel to the direction of extension of such claws 21a and 21b. The neighboring claws 21a or 21b are spaced a gap d of a width that is chosen to be, for example, three times the width of each of the claws 21a and 21b.

The inner peripheral edge of each of the annular flanges 19a and 19b of the ring member 19 is formed with a cutout 22a or 22b that is defined between the neighboring claws 21a or 21b so that a free end of each opposite claw 21b or 21a can be positioned within the corresponding cutout 22a or 22b. Each of those cutouts 22a and 22b is preferably of a semicircular shape or a generally U-shape.

The ring member 19 of the structure described above can be prepared from a metal plate of a magnetic material such as, for example, stainless plate by the use of a press work.

It is to be noted that although the ring member is shown as divided into two components along a mid-center line passing intermediate of the width thereof, that is, at the center of a web, it may be of an integral part.

With the wheel bearing assembly of the structure described above, since the electric generator 4 is employed which generate electricity when one of the outer and inner members 1 and 2 rotates relative to the other of the outer and inner members 1 and 2, the number of revolutions of the wheel can be detected by utilizing an output from the electric generator 4 as a signal indicative of the number of revolutions of the wheel 13. Since the electric generator 4 is built in an annular space between the outer member 1 and the inner member 2, the bearing assembly can be assembled compact while securing a function of detecting the number of revolutions. Also, since the transmitting means 5A for transmitting wireless the detection signal indicative of the number of revolutions of the wheel that is outputted from the electric generator 4, no electric line which would be necessitated to supply the detection signal indicative of the number of revolutions to the control unit is needed. Also, an electric power generated by the electric generator 4 is used as an electric power source for the wireless transmitting means 5A and, therefore, no electric line for supplying the electric power from the automotive body structure 12 to the wireless transmitting means 5A is needed. For these reasons, no electric line is exposed outside the automotive body structure, there is no possibility of the electric line being broken, no complicated and time-consuming wiring job is required, the automobile can be manufactured lightweight and the cost thereof can be reduced. Also, since the electric generator 4 in its entirety is built in the annular space delimited between the outer and inner members 1 and 2, no hole which would be necessitated for exposure of a portion of the electric generator 4 to the outside is necessary, resulting in increase of the sealability. The hole through which the cable between the electric generator 4 and the wireless transmitting means 5A is passed would be required to be formed in the outer member 1, but since the hole for passage of an electric wire therethrough suffices to be a small hole, the sealing can be achieved easily.

Since the electric generator 4 is of the structure wherein the coil/magnetic element combination 17 includes the ring member 19 having the interleaved claws 21a and 21b, and the coil 20, which is used in combination with the ring-shaped multi-pole magnet 18, it is easy to attain multi-polarization and compactization and the efficient power generation excellent in efficiency of utilization of magnetic fluxes can be achieved. In particular, since the coil/magnetic element combination 17 is of the structure wherein the gaps between the interleaved claws 21a and 21b are chosen to be so large as to minimize leakage of magnetic fluxes from the neighboring magnetic poles, the efficiency of utilization of the magnetic fluxes can be high.

Figure 6A:
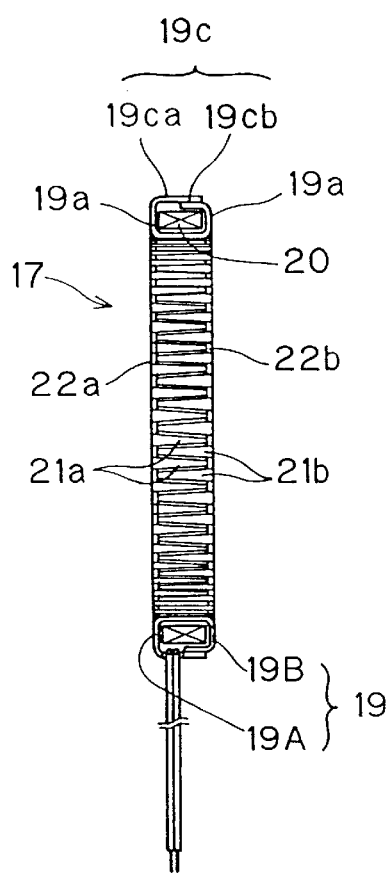
FIG. 6A is a broken-out side view showing a modification of the ring member used in the electric generator.
Figure 6B:
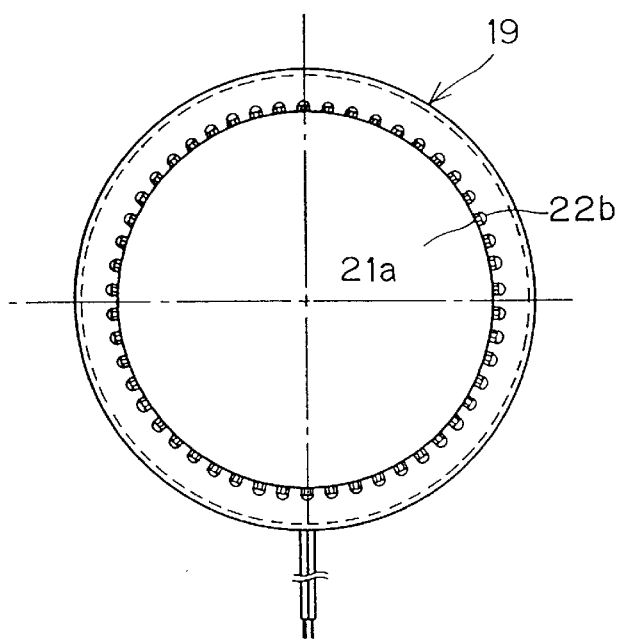
FIG. 6B is a front elevational view of the modified ring member shown in FIG. 6A.
Figure 6C:
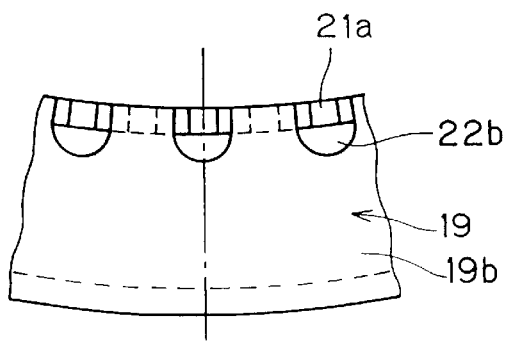
FIG. 6C is a enlarged view of a portion of the modified ring member shown in FIG. 6B.

In place of the structure discussed hereinabove, the electric generator 4 may be of a structure wherein the coil/magnetic element combination 17 is assembled as shown in FIG. 6. The coil/magnetic element combination 17 shown in FIG. 6 is featured in that each of the interleaved claws 21 and 21b of the ring member 19 is so shaped as to have its width progressively decreasing in a direction towards its free end, that is, outwardly tapered.

The ring member 19 is divided into and made up of a pair of ring member forming members 19A and 19B. Each of the ring member forming members 19A and 19B has the corresponding annular flange 19a or 19b and a plurality of web forming pieces 19ca or 19cb extending radially from an outer peripheral edge thereof, and the ring member forming members 19A and 19B are combined together with the web forming pieces 19ca and 19cb overlapped with each other partly in a widthwise direction thereof. Each of the ring member forming members 19A and 19B has its inner peripheral edge of the corresponding annular flange 19a or 19b formed with comb-shaped claws 21a or 21b that are bent to protrude in a direction perpendicular to the respective annular flange 19a or 19b. With the ring member forming members 19A and 19B combined together in the manner described, the comb-shaped claws 21a and 21b integral with the respective flanges 19a and 19b are interleaved with each other at intervals of a predetermined gap in a direction circumferentially thereof.

Other structural features of the coil/magnetic element combination 17 shown therein are substantially similar to those in the coil/magnetic element combination 17 shown in and described with reference to FIGS. 4 and 5.

Comparing the coil/magnetic element combination 17 having the rectangular claws 21a and 21b as shown in FIGS. 4 and 5 with the coil/magnetic element combination 17 having the tapering claws 21a and 21b as shown in FIG. 6, there is the following merits and demerits.

In the case of the coil/magnetic element combination 17 having the rectangular claws 21a and 21b as shown in FIGS. 4 and 5, it is considered best in terms of the efficiency of utilization of the magnetic fluxes, but the magnetic flux density at root portions of the claws 21a and 21b where the latter are bent from the associated annular flanges 19a and 19b tends to be high and, accordingly, they must have to a certain extend a sectional area enough to avoid magnetic saturation. For this reason, multipolarization and reduction in size are limited.

In the case of the coil/magnetic element combination 17 having the tapering claws 21a and 21b as shown in FIG. 6, no magnetic saturation occur at the root portions of the claws 21a and 21b and, therefore, multipolarization and reduction in size are possible. In other words, since the strength of the magnetic field between the neighboring N and S pole magnets represents a sinusoidal shape, the magnetic field at a transit point between the N pole and the S pole is very weak and, therefore, based on the assumption that no influence will be brought about even when leakage into the neighboring magnetic pole claws 21a and 21b, the claws 21a and 21b are tapered so that no magnetic saturation will occur at the root portions.

The reason that the ring member 19 is rendered to be a split type is only for the purpose of processing and, in the example shown in FIG. 6, the ring member 19 may be an integral part. Also, in the example as shown in FIG. 6, the ring member forming members 19A and 19B may be butted together by means of web portions 19c as is the case with that shown in FIGS. 4 and 5. Also, in the example shown in FIGS. 4 and 5, the ring member 19 may be of a split type with the web forming pieces partially overlapped with each other as is the case with that shown in FIG. 6.

In the foregoing embodiment, the electric generator 4 has been arranged between the plural raceways. However, the electric generator 4 may be provided at an open end between the inner and outer members 2 and 1 as shown in the following various embodiments as will be described later.

Also, in the foregoing embodiment, the wireless transmitting means 5A has been used in the form of a box-type transmitter provided in a portion of the circumferential direction, but the wireless transmitting means 5A may be in the form of an annular transmitter. In such case, the annular transmitter may be integrated together with the ring member 19 of the electric generator 4.

In the next place, various embodiments of the present invention will be described in which the electric generator 4 is used as a component part of the seal 11 and the wireless transmitting means 5A is employed in the form of an annular transmitter and is integrated together with the ring member 19 of the electric generator 4.

FIGS. 7 to 22 illustrates such other embodiments of the present invention, respectively. In the first place, what is common to those embodiments will be described. In each of those embodiments, the wheel support bearing assembly includes the outer member 1 having the double raceways 6 and 7 defined on the inner peripheral surface thereof, the inner member 2 having the raceways 8 and 9 opposed respectively to the raceways 6 and 7, and the rows of the rolling elements 3 rollingly accommodated between the raceways 6 and 7 and between the raceways 8 and 9, and is used to rotatably support the wheel relative to the automotive body structure 12. This wheel support bearing assembly is in the form of a double row angular ball bearing with the contact angles of the raceways 6 to 9 so defined as to achieve the back-to-back alignment. Each of the rows of the rolling elements 3 are rollingly retained in position by the corresponding retainer 10. The annular space defined between the inner and outer members 2 and 1 has opposite open ends sealed by respective sealing members 11 and 11A. The sealing member 11 is used to seal the open end on an inboard side whereas the sealing member 11A is used to seal the open end on an outboard side.

There is provided the electric generator 4 that generates an electric power upon rotation of one of the outer and inner members 1 and 2 relative to the other of the outer and inner members 1 and 2, and there is also provided the wireless transmitting means 5A for transmitting wireless the signal indicative of the number of revolutions of the wheel outputted from the electric generator 4.

The electric generator 4 is made up of the ring member 19 made of a magnetic material and accommodating the coil 20 and a ring-shaped multi-pole magnet 18. The ring member 19 is mounted on one of the outer member 1 and the inner member 2 whereas the multi-pole magnet 18 is mounted on the other of the outer member 1 and the inner member 2. The electric generator 4 may be either a thrust type in which the direction in which the coil/magnetic element combination 17 and the multi-pole magnet 18 are opposed to each other, that is, the direction in which magnetic poles are oriented lie in an axial direction of the bearing assembly, or of a radial type in which it lies in a radial direction of the bearing assembly as shown in the first embodiment.

At least one of the ring member 19 and the multi-pole magnet 18 is formed integrally with a sealing member which forms a part of the sealing member 11 used to close the open end between the outer and inner members 1 and 2.

The transmitting means 5A is constituted by an annular transmitter 5A, and this transmitter 5A is integrated together with the ring member 19 forming the electric generator 4. The transmitter 5A and the coil 20 are connected together by means of an electric wire or a connection connector (not shown).

Hereinafter, the various embodiments of the present invention will be described.

Figure 7A:
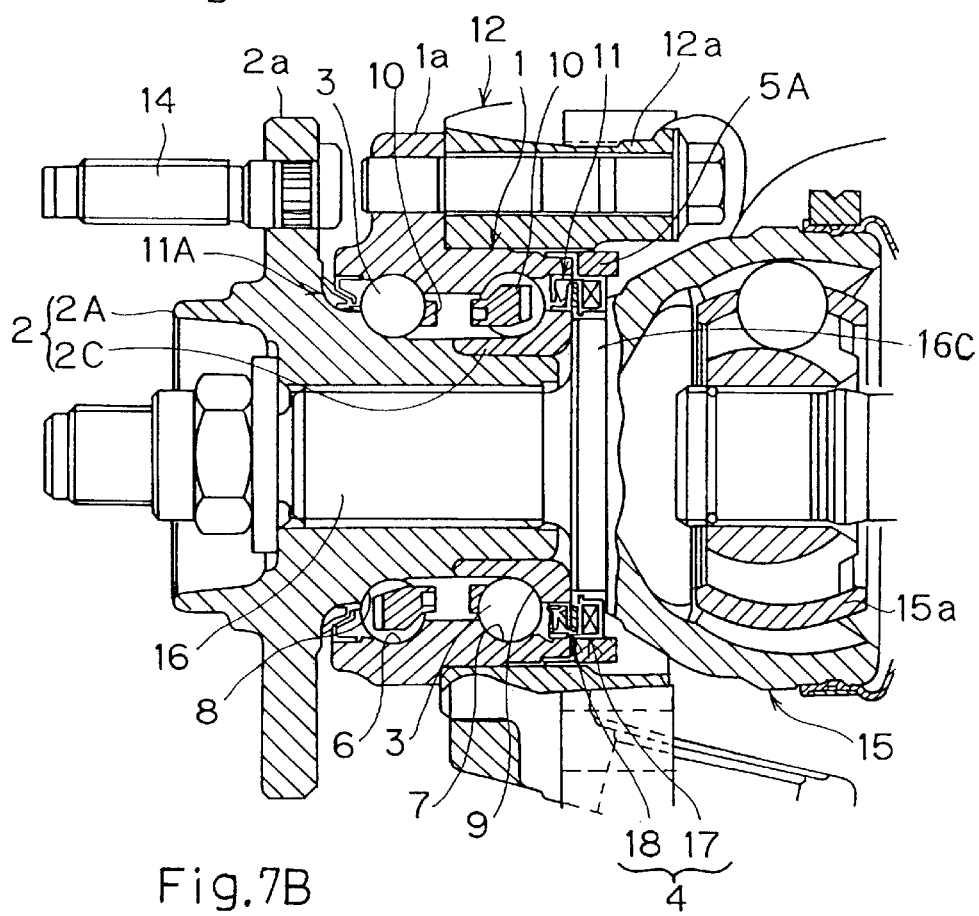
FIG. 7A is a sectional view of the wheel support bearing assembly according to a second preferred embodiment of the present invention.

FIG. 7 illustrates a second preferred embodiment of the present invention. The wheel support bearing assembly according to this embodiment is an inner race rotating type of a third generation and is used for the support of the drive axle. The electric generator 4 is the thrust type. This second embodiment corresponds to the invention of claim 13.

The outer member 1 has a vehicle body fitting flange 1a which is, as is the case with the first embodiment, to the automotive body structure, adapted to be fitted to a wheel bearing support component 12a such as, for example, knuckle of the automotive body structure 12. The inner member 2 includes a hub wheel 2A, and a separate inner race forming member 2C mounted on an outer periphery of the end of the hub wheel 2A. The hub wheel 2A has a wheel fitting flange 2a formed integrally therewith. The raceways 8 and 9 on the inner member 2 are formed on the hub wheel 2A and the inner race forming member 2C, respectively.

The inner member 2 is coupled with an outer ring 15a of the constant speed joint 15 that is manufactured separate from the wheel support bearing assembly. The outer ring 15a of the constant speed joint 15 has a shaft portion 16 formed integrally therewith so as to extend from outer bottom portion thereof, which shaft portion 16 is inserted into an inner peripheral surface of the hub wheel 2A and is then fixed in position by means of a nut fastened thereto to thereby connect it with the inner member 2. A flat step 16c formed in the outer bottom portion of the outer ring 15a of the constant speed joint 15 so as to orient axially thereof is held in abutment with an end face of the inner race forming member 2C to lock the inner race forming member 2C in position.

Figure 7B:
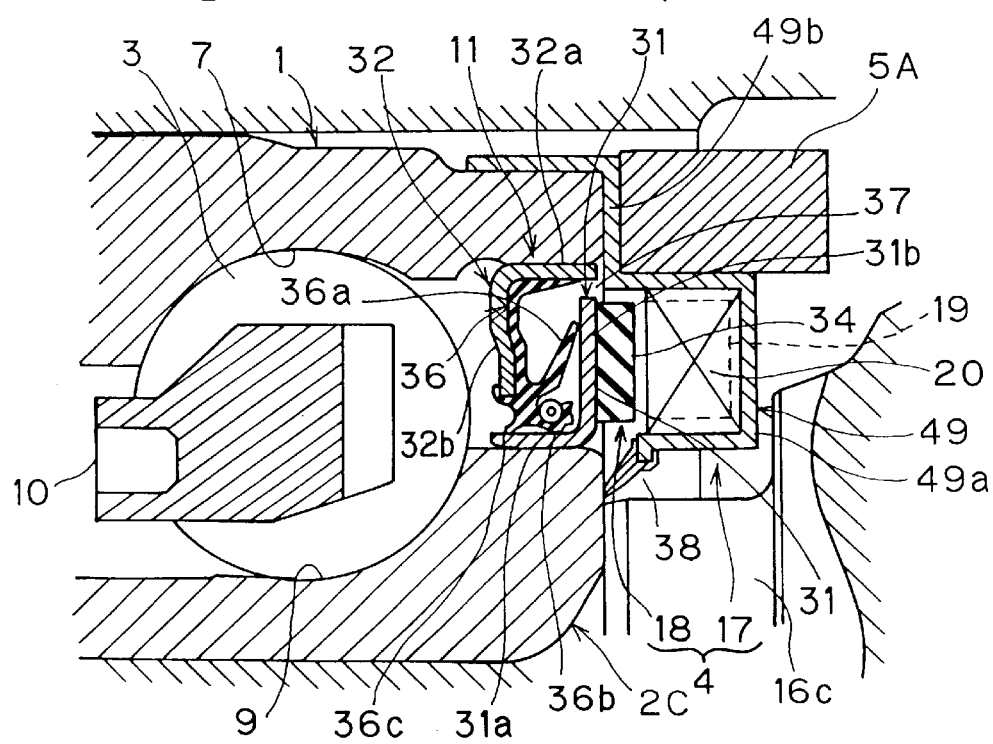
FIG. 7B is an enlarged sectional view showing a portion of the wheel support bearing assembly shown in FIG. 7A.

The sealing member 11 on the bearing backside includes, as shown in FIG. 7B on an enlarged scale, first and second annular sealing members 31 and 32 fitted to the inner and outer members 2 and 3, respectively. These seal members 31 and 32 are fitted in position as press-fitted into the inner and outer members 2 and 3, respectively. Each of the sealing members 31 and 32 is in the form of a plate-like member and is formed so as to represent a generally L-sectioned shape having a cylindrical portion 31a or 32a and an upright plate portion 31b or 32b, with the sealing members 31 and 32 opposing to each other.

Figure 8:
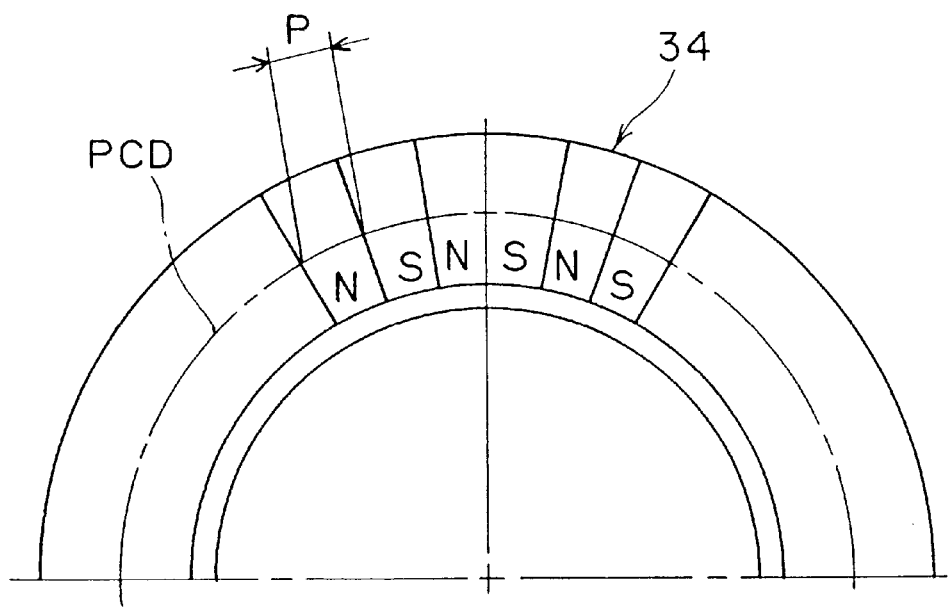
FIG. 8 is a fragmentary front elevational view of an elastic member which forms the multi-pole magnet of the electric generator used in the bearing assembly.

The first sealing member 31 is mounted on the inner member 2 which is a member on a rotating side of the inner and outer members 2 and 1. The upright plate portion 31b of the first sealing member 31 is arranged outwardly of the bearing assembly and has an outer side face thereof provided with a magnet member 34 of the multi-pole magnet 18. This magnet member 34 forms the multi-pole magnet 18 of the electric generator 4 together with the first sealing member 31, and the first sealing member 31 is made of a magnetic material. The magnet member 34 is formed with magnetic poles N and S alternating in a circumferential direction thereof as shown in FIG. 8, and the magnetic poles N and S are arranged in a circle having a pitch circle diameter (PCD) and spaced at intervals of a predetermined pitch p. By disposing the coil/magnetic element combination 17 in face-to-face relation with the magnet member 34 of the multi-pole magnet 18 as shown in FIG. 7B, the electric generator 4 concurrently serving as a rotation sensor can be formed.

The magnet member 34 of the multi-pole magnet 18 is made of an elastic member mixed with a powder of magnetic material and is vulcanized to be bonded to the first sealing member 31 to form a so-called rubber magnet. It is, however, to be noted that instead of vulcanization the magnet member 34 of the multi-pole magnet 18 may be prepared by hardening a mass of magnetic powders with the use of a bonding material (neodymium bond magnet), which may be subsequently bonded and fixed in position to the first sealing member 31.

The second sealing member 32 has formed integrally therewith a side lip 36a, slidingly engaged with the upright plate portion 31b of the first sealing member 31, and radial lips 36b and 36c slidingly engaged with the cylindrical portion 31a of the first sealing member 31. These lips 36a to 36c are provided as respective portions of the elastic member 36 vulcanized to be bond to the second sealing member 32. The cylindrical portion 32a of the second sealing member 32 and a free end of the upright plate portion 31b of the first sealing member 31 are spaced radially a slight distance to define a labyrinth seal 37.

The coil/magnetic element combination 17 includes the ring member 19 made of a magnetic material and accommodating the coil 20. The ring member 19 is identical with the ring member 19 used in the coil/magnetic element combination 17 described in connection with the first embodiment with reference to FIGS. 4 and 5, except that the different direction of orientation of the magnetic polarities is used. In other words, the ring member 19 shown in FIG. 7 has a cross sectional shape similar to a groove as is the case with the ring member 19 in the example of FIGS. 4 and 5 and has a plurality of comb-shaped claws 21a and 22a that are bent from respective open edges of side face of the groove in a direction conforming to the opposite side faces so that the claws 21a and 22a can be alternately interleaved with each other in a direction circumferential of the ring member 19. It is, however, to be noted that the coil/magnetic element combination 17 used in the embodiment of FIG. 7 has, unlike that in FIGS. 4 and 5, the groove opening oriented axially thereof and the magnetic poles defined by the interleaved claws 21a and 22a are oriented axially accordingly. Even in the ring member 17 used in the embodiment of FIG. 7, the interleaved claws 21a and 22a may be tapered as is the case with those shown in FIG. 6.

Referring now to FIG. 7B, the coil/magnetic element combination 17 is fitted to a fitting ring 49 through the ring member 19, and the annular transmitter 5A in the transmitting means 5A is fitted to this fitting ring 49. Thus, when the transmitter 5A and the ring member 19 of the coil/magnetic element combination 17 are fitted to the same fitting ring 49, the transmitter 5A and the ring member 19 of the coil/magnetic element combination 17 can be integrated together. The annular transmitter 5A is arranged on an outer periphery of the ring member 19.

The fitting ring 49 is a molded component of metal and has a transversely oriented groove-shaped portion 49a, in which the coil/magnetic element combination 17 is engaged, and a reverse L-shaped portion 49b extending radially outwardly from an outer peripheral open edge of the groove-shaped portion 49a and extending in the same direction as in which the groove-shaped portion 49a opens. This fitting ring 49 is fitted to the outer member 1 with the reverse L-shaped portion 49b press-fitted into an outer peripheral surface of an end portion of the outer member 1. By this press-fitting, the coil/magnetic element combination 17 can be positioned in face-to-face relation with the open end between the outer member 1 and the inner member 2 and, hence, in face-to-face relation with the multi-pole magnet 18 while the transmitter 5A is positioned in face-to-face relation with an end face of the outer member 1.

This fitting ring 49 substantially enclose the end opening between the outer member 1 and the inner member 2 and concurrently serves as a sealing means for this end opening, and a sealing member 38 for covering the remaining gap between the fitting ring 49 and the inner member 2 is fitted to an inner peripheral open edge of the groove-shaped portion 49a of the fitting ring 49. The sealing member 38 is made of an elastic material such as, for example, rubber and is held in sliding engagement with the end face of the inner member 2. This sealing member 38 is used to prevent foreign matter from entering into a gap between the ring member 19 forming a part of the coil/magnetic element combination 17 and the magnet member 34 of the multi-pole magnet 18, to thereby avoid damages to the electric generator 4. It is to be noted that the sealing member 38 corresponds to a sealing member referred to in claim 7.

In this embodiment, the following functions and effects can be obtained. Since the electric generator 4 is disposed in the open end portion between the outer member 1 and the inner member 2, unlike the case in which the electric generator 2 is disposed inside the bearing assembly such as in the first embodiment, the electric generator 4 can be removed or mounted with no need to dismantle the outer member and the inner member 2 of the bearing assembly and, therefore, the electric generator 4 can easily be maintained and serviced. Also, since the multi-pole magnet 18 of the electric generator 4 is formed integrally with the sealing member 31 at the open end portion between the outer member 1 and the inner member 2, the electric generator 4 can be assembled compact with minimized number of component parts, thereby exhibiting an excellent assemblability.

Since the transmitting means 5A is constituted by the annular transmitter 5A, the transverse section of the transmitter 5A can be reduced and can, therefore, be disposed in a limited space available in the vicinity of the bearing assembly. In other words, where the box-shaped transmitting means 5A is employed as is the case with the first embodiment, the transmitting means 5A is so bulky that the surroundings of the wheel support bearing assembly must be so designed as to provide a space for installation of the box-shaped transmitting means 5A. However, where the annular transmitter 5A is employed, the space generally available around the wheel support bearing assembly can be utilized for installation of the transmitter 5A. As can readily be understood from FIG. 7, the space generally available around the wheel support bearing assembly, particularly that available in the vicinity of the open end portion is often a very limited small space since it is surrounded by the constant speed joint 15 and the fitting member 12a of the wheel support bearing assembly. Even this very small adjacent space can accommodate the transmitter 5A if the latter is rendered to be annular in shape. In particular, since the constant speed joint 15 is positioned close to such adjacent space, such adjacent space is of a shape that can provide a room in a radial direction rather than in an axial direction. Then, in the illustrated embodiment, the transmitter 5A is arranged in overlapping relation with the outer periphery of the coil/magnetic element combination 17 and, therefore, it can be effectively and snugly accommodated within such adjacent space as compared with the case in which the both are arranged axially.

Also, in the illustrated embodiment, since the annular transmitter 5A and the ring member 19 of the electric generator 4 are integrated together, the combination of the transmitter 5A and the electric generator 4 can be further compactized, enabling a space for installation to be easily secured and the number of component parts can also be reduced further.

Since the fitting ring 49 used to secure the coil/magnetic element combination 17 and the transmitter 5A covers the multi-pole magnet 18 and, also, since the sealing member 38 is employed to seal between the fitting ring 49 and the inner member 2, undesirable ingress of foreign matter into the gap between the multi-pole magnet 18 and the coil/magnetic element combination 17 can be avoided. By this fitting ring 49 and the sealing member 38, damage to the electric generator 4 which would result from ingress of the foreign matter can be prevented.

The sealing member 11 provides a sealability at the bearing end portion because of the sliding engagement between the seal lips 36a to 36c, provided in the second sealing member 32, and the first sealing member 31 and also because of the presence of the labyrinth seal 37.

Figure 9A:
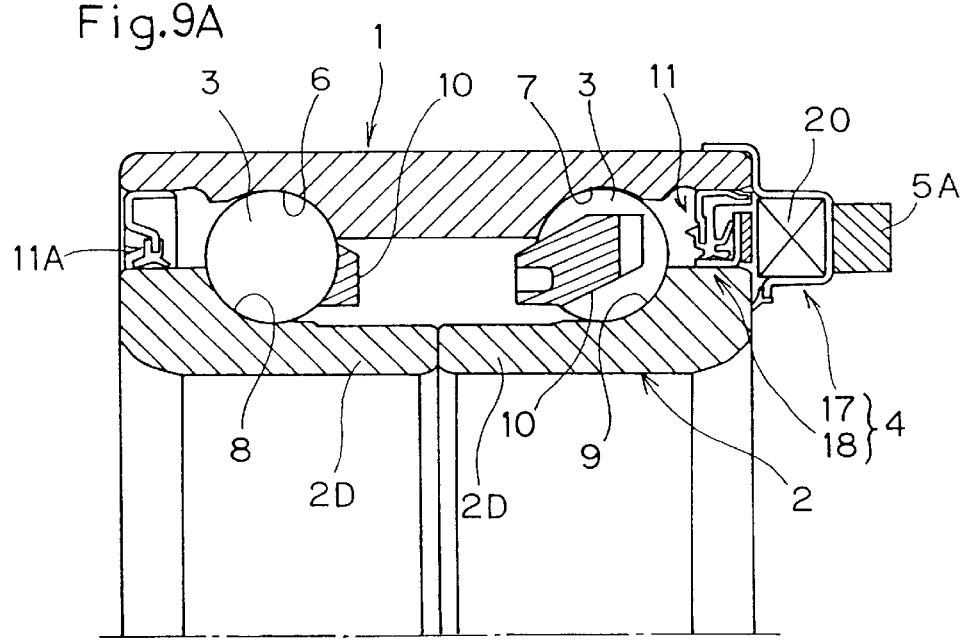
FIG. 9A is a sectional view of the wheel support bearing assembly according to a third preferred embodiment of the present invention.
Figure 9B:
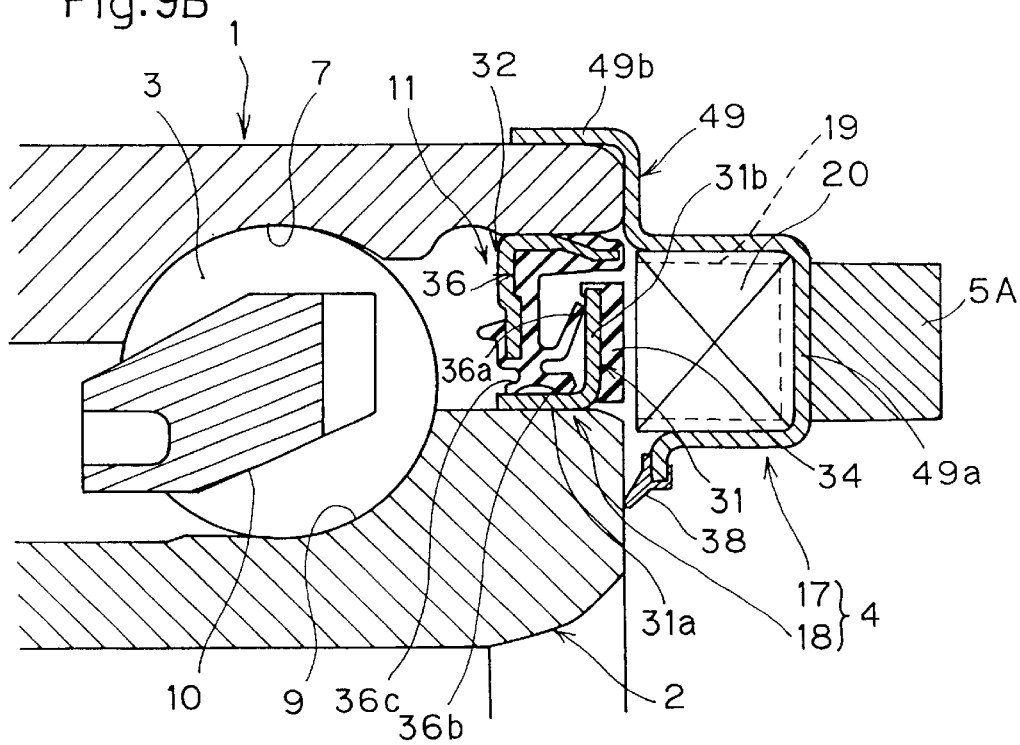
FIG. 9B is an enlarged sectional view of a portion of the wheel support bearing assembly shown in FIG. 9A.

FIG. 9 illustrates a third embodiment of the present invention. This embodiment is directed to a first generation of the wheel support bearing assembly of the inner race rotating type wherein the electric generator 4 serving as the rotation sensor is a thrust type.

The outer member 1 serves as a member on a stationary side and is in the form of an independent bearing outer race. The inner member 2 serves as a member on a rotational side and is made up of two bearing inner races 2D arranged axially. None of the outer member 1 and the inner member 2 is provided with any wheel fitting flange and a vehicle body fitting flange.

The sealing member 11 provided at the open end adjacent the backside of the bearing assembly is of the same construction as the sealing member used in the second embodiment (FIG. 7) and includes the first and second sealing members 31 and 32. Even the electric generator 4 is of the same structure as that in the second embodiment and the multi-pole magnet 18 used therein is provided integrally on the first sealing member 31. The coil/magnetic element combination 17 of the electric generator 4 is, as is the case with the second embodiment, fitted to the outer member 1 with the ring member 19 coupled with the fitting ring 49. The fitting ring 49 is of the same structure as that used in the second embodiment and is provided with the sealing member 38.

The transmitting means 5A is, as is the case with that in the second embodiment, in the form of the annular transmitter 5A, but is positioned axially of the coil/magnetic element combination 17. This annular transmitter 5A is fitted to an outer bottom face of the groove-shaped portion 49a of the fitting ring 49.

Even in this embodiment, since the multi-pole magnet 18 of the electric generator 4 is used as a component part of the sealing member 11 and the wireless transmitting means 5A is employed in the form of the annular transmitter 5A which is in turn integrated together with the ring member 19 of the electric generator 4, there is such advantages that the electric generator 4 can be maintained excellently and the space for installation of both the electric generator 4 and the transmitting means 5A can be minimized. These advantages can be equally obtained even in the embodiments which will hereinafter be described.

Figure 10:
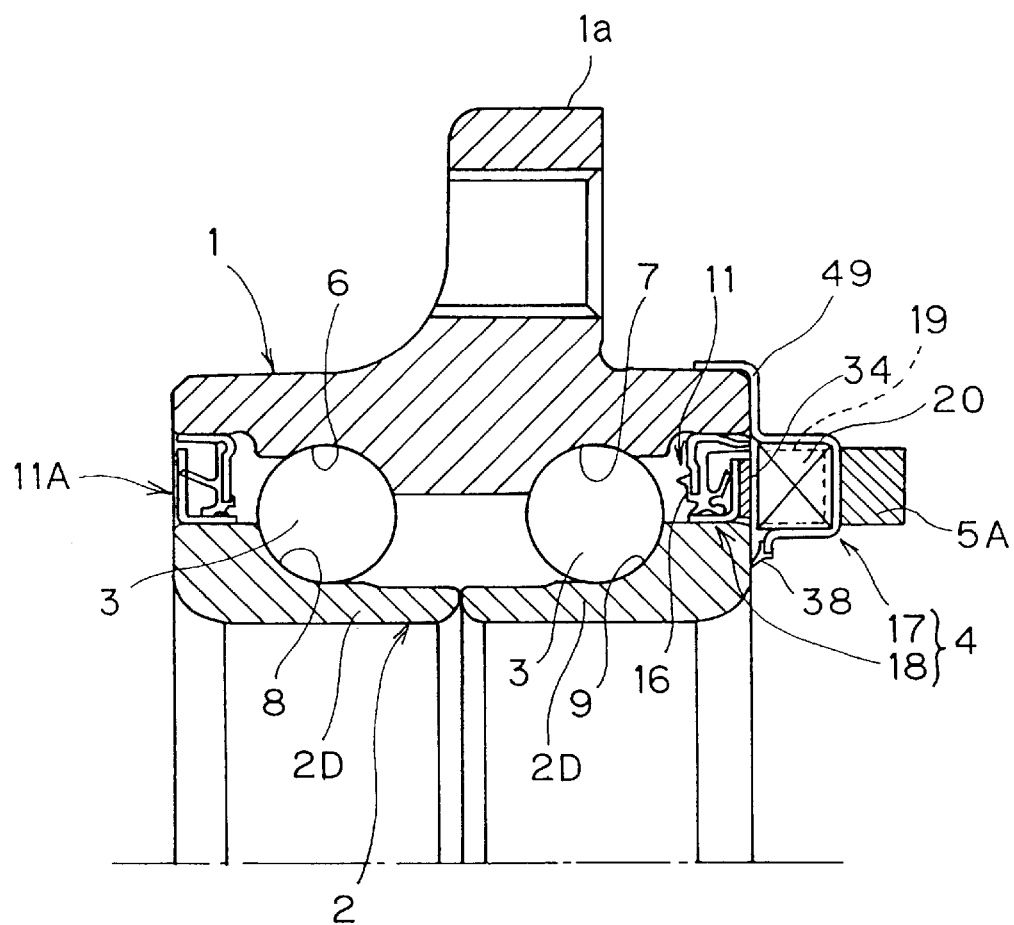
FIG. 10 is a sectional view of the wheel support bearing assembly according to a fourth preferred embodiment of the present invention.

FIG. 10 illustrates a fourth embodiment of the present invention. The wheel support bearing assembly in this embodiment is a wheel support bearing assembly of the inner race rotating type of a second generation and the electric generator 4 serving as the rotation sensor is the thrust type.

In this embodiment, the vehicle body fitting flange 1a is provided in the outer member 1, and other structural features thereof are similar to those shown in and described in connection with the third embodiment with reference to FIG. 9.

Figure 11:
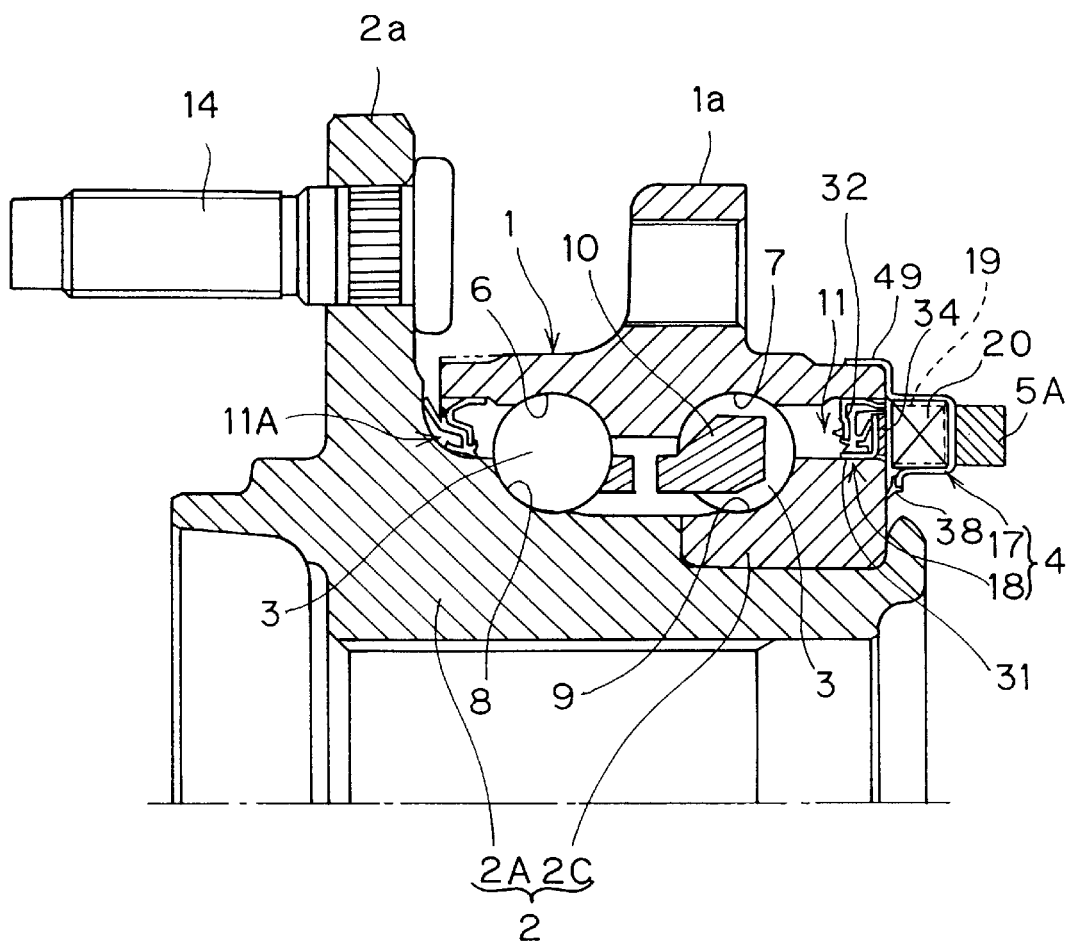
FIG. 11 is a sectional view of the wheel support bearing assembly according to a fifth preferred embodiment of the present invention.

FIG. 11 illustrates a fifth embodiment of the present invention. The wheel support bearing assembly in this embodiment is a wheel support bearing assembly of the inner race rotating type of a third generation and is used for rotatably supporting the drive axle.

According to this embodiment, in the wheel support bearing assembly of the third generation, the electric generator 4 of the thrust type which concurrently serves as the rotation sensor is incorporated in the sealing member 11, and the ring member 19 of the electric generator 4 is arranged axially of the annular transmitter 5A. The sealing member 11, the electric generator 4 and the transmitting means 5A are, unless otherwise specified, similar to those used in the second embodiment described with reference to FIG. 7. Briefly speaking, the multi-pole magnet 18 is fixed on the inner member 2 together with the first sealing member 31. The coil/magnetic element combination 17 is fixed on the outer member 1 through the fitting ring 49 to which the ring member 19 is fitted. The annular transmitter 5A is fixed on the fitting ring 49 and positioned on one side of the fitting ring 49 opposite to the coil/magnetic element combination 17.

The outer member 1 is a member of one piece structure including the vehicle body fitting flange 1a. The inner member 2 is made up of the hub wheel 2A and a separate inner race forming member 2C mounted on an outer periphery of one end of the hub wheel 2A. The inner race forming member 2C is fixed on the hub wheel 2A by axially fastening a fastening portion provided in the hub wheel 2A. The inner member 2 has a wheel fitting flange 2a, and the inner member 2 is fixed with a shaft portion of the constant speed joint (not shown) inserted through an inner peripheral hole thereof.

Figure 12:
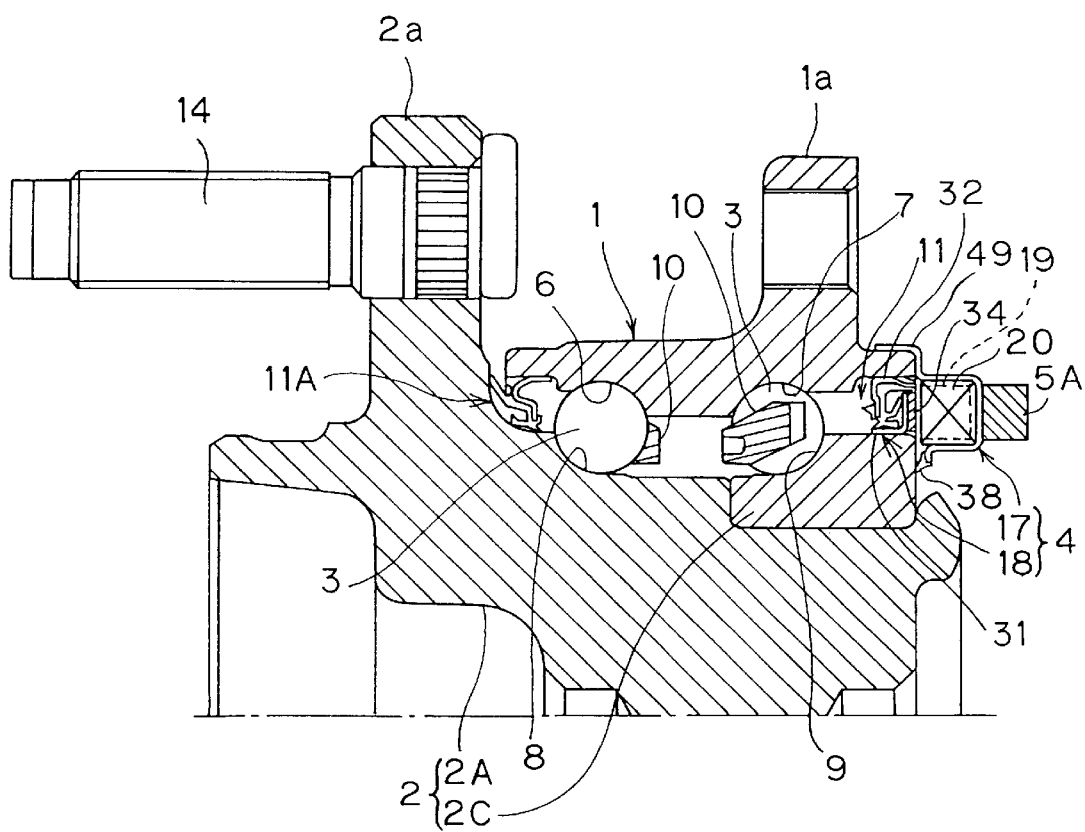
FIG. 12 is a sectional view of the wheel support bearing assembly according to a sixth preferred embodiment of the present invention.

FIG. 12 illustrates a sixth embodiment of the present invention. The wheel support bearing assembly of this embodiment is the inner race rotating type of a third generation and is used to support a driven axle. The electric generator 4 concurrently serving as the rotation sensor is the thrust type.

Since this embodiment is for the support of the driven axle, the inner member 2 is of a shape having no inner peripheral hole. Other structural features thereof are substantially similar to those described in connection with the fifth embodiment with reference to FIG. 5.

Figure 13:
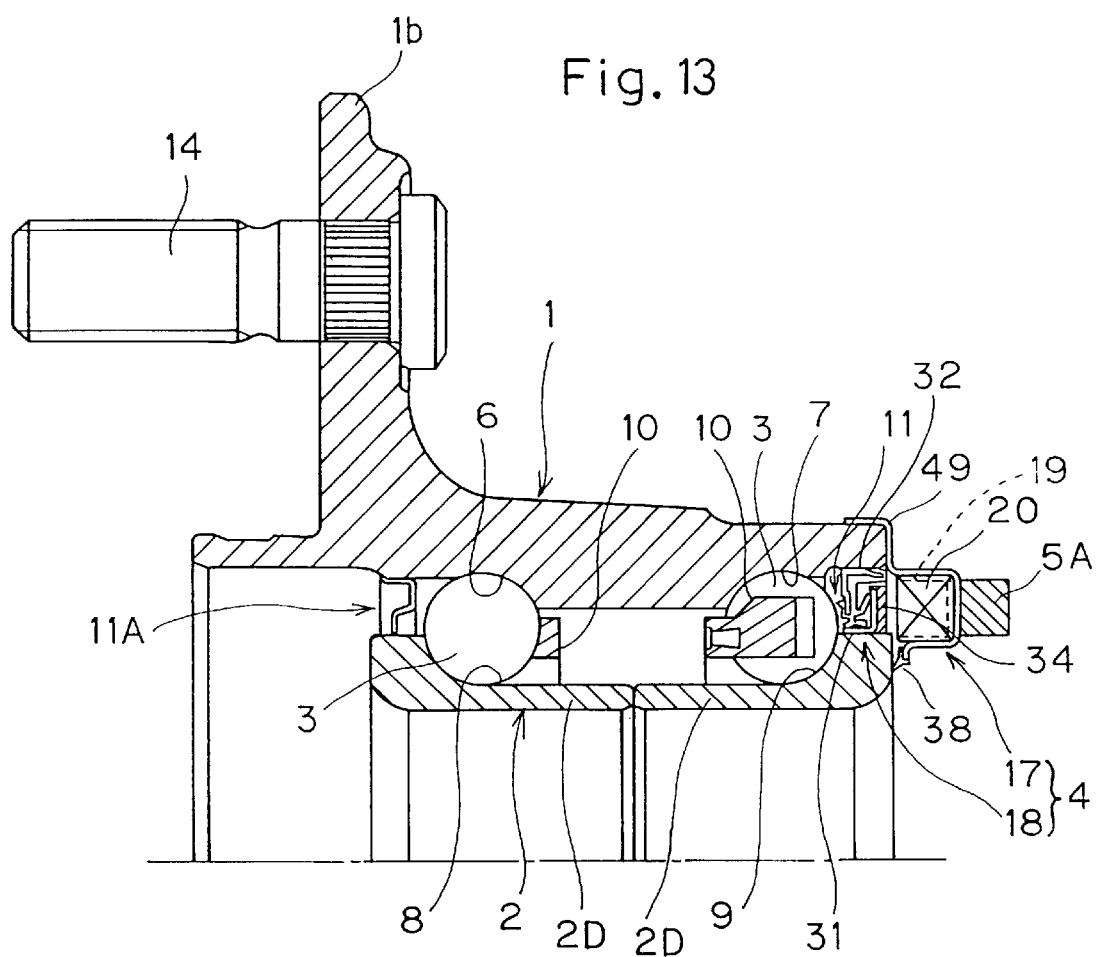
FIG. 13 is a sectional view of the wheel support bearing assembly according to a seventh preferred embodiment of the present invention.

FIG. 13 illustrates a seventh embodiment of the present invention. The wheel support bearing assembly according to this embodiment is an outer race rotating type of a second generation, wherein the electric generator 4 serving as the rotation sensor is the thrust type.

The outer member 1 has a wheel fitting flange 1b at one end thereof which defines a front surface thereof. The inner member 2 is of a split type in which two bearing inner races 2D are arranged axially. The sealing member, the electric generator 4 and the transmitting means 5A are similar to those described in connection with the third embodiment with reference to FIG. 9. In the case of this embodiment, the outer member 1 serves as a member on a rotating side and, therefore, the transmitter 5A forming the transmitting means 5A fitted to the outer member 1 rotates together with the outer member 1. However, since the transmitter 5A used therein is of an annular configuration, rotation of the transmitter 5A will not adversely affect as a variation in detection signal on a receiving side.

Figure 14:
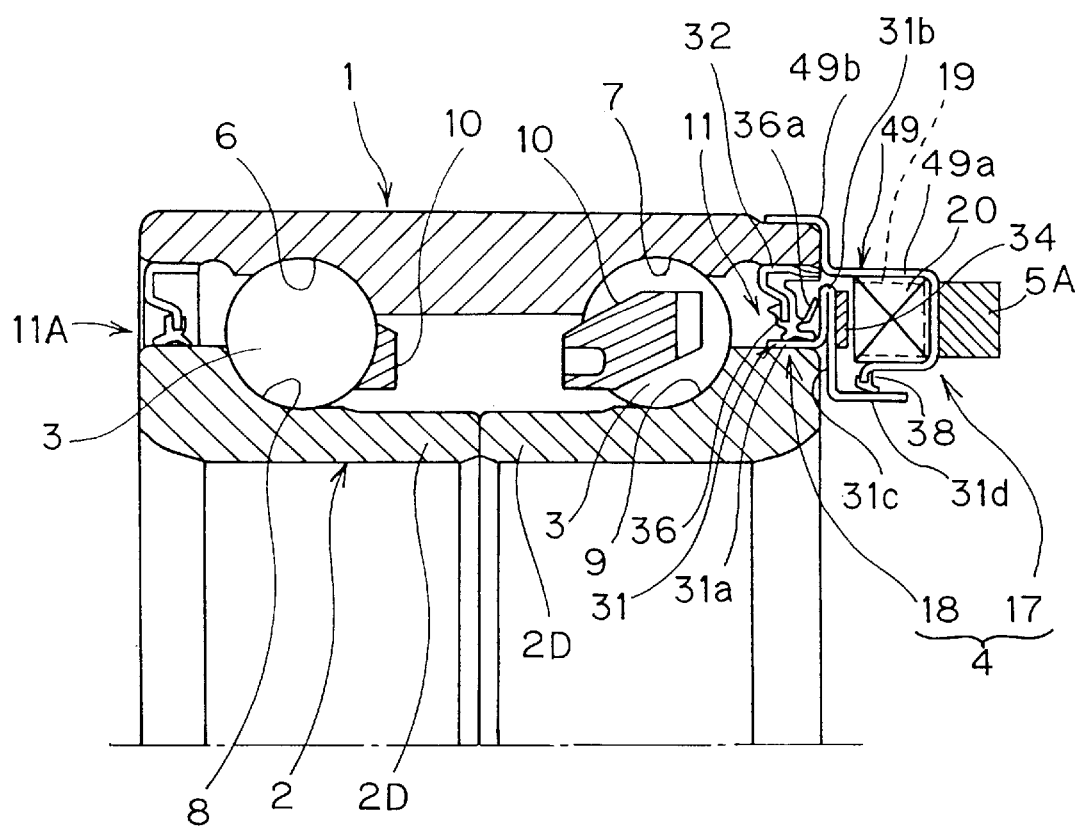
FIG. 14 is a sectional view of the wheel support bearing assembly according to an eighth preferred embodiment of the present invention.

FIG. 14 illustrates an eighth embodiment of the present invention. The wheel support bearing assembly according to this embodiment is an inner race rotating type of a first generation, wherein the electric generator 4 serving as the rotation sensor is the thrust type.

The outer member 1 serves as a member on the stationary side and is constituted by an independent bearing outer race. The inner member 2 serves as a member on the rotating side and includes two bearing inner races 2D arranged axially. The outer member 1 and the inner member 2 have no wheel fitting flange and vehicle body fitting flange.

The sealing member 11, the electric generator 4 and the transmitting means 5A are, except for the following features, similar to those described in connection with the third embodiment with reference to FIG. 9. In the illustrated embodiment, the first sealing member 31 of the sealing member 11 includes a cylindrical portion 31a, an upright plate portion 31b bent radially outwardly from the cylindrical portion 31a, a buck-turned upright plate portion 31c turned radially inwardly from a free end of the upright plate portion 31b, and an outer cylindrical portion 31d bent from a radially inner end of the back-turned upright plate portion 31c so as to extend outwardly from the bearing assembly. The back-turned upright plate portion 31c extends a further radially inwardly than the cylindrical portion 31a. The magnet member 34 of the multi-pole magnet 18 is disposed on a side face of the back-turned upright plate portion 31c facing outwardly of the bearing assembly. The sealing member 31 is press-fitted into an outer peripheral surface of one end portion of the inner member 2, while the back-turned upright plate portion 31c has an inner peripheral portion positioned outside the end face of the inner member 2.

Although the coil/magnetic element combination 17 of the electric generator 4 is fitted to the outer member 1 by means of the fitting ring 49 which is the same as that used in the third embodiment, the sealing member 38 provided on an inner peripheral portion of this fitting ring 49 defines an outer peripheral surface of the outer cylindrical portion 31d of the first sealing member 31.

In the case of this embodiment, as compared with the third embodiment, although a combination of the sealing member 11, the electric generator 4 and the transmitter 5A may have an increased axial length, the sealing member 38 is held in contact with the outer peripheral surface of the outer cylindrical portion 31d and, therefore, no sealing function will decrease even if the position at which the first sealing member 31 is fitted axially changes to a certain extent.

Figure 15A:
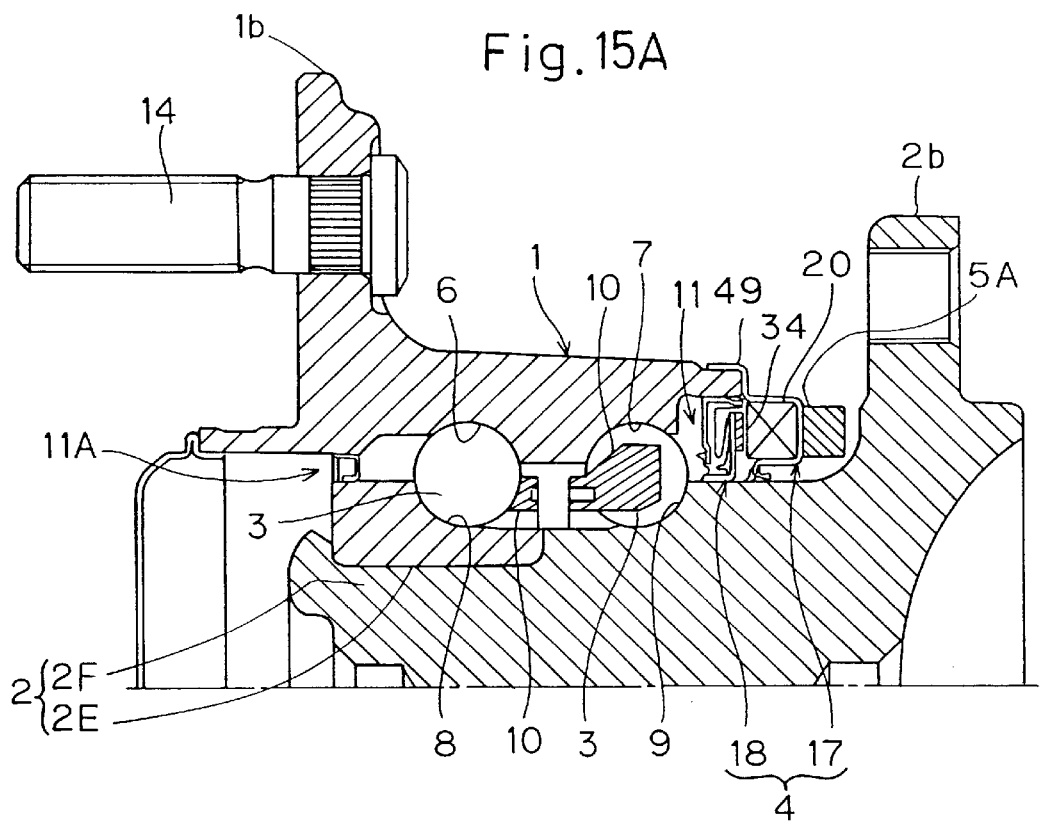
FIG. 15A is a sectional view of the wheel support bearing assembly according to a ninth preferred embodiment of the present invention.
Figure 15B:
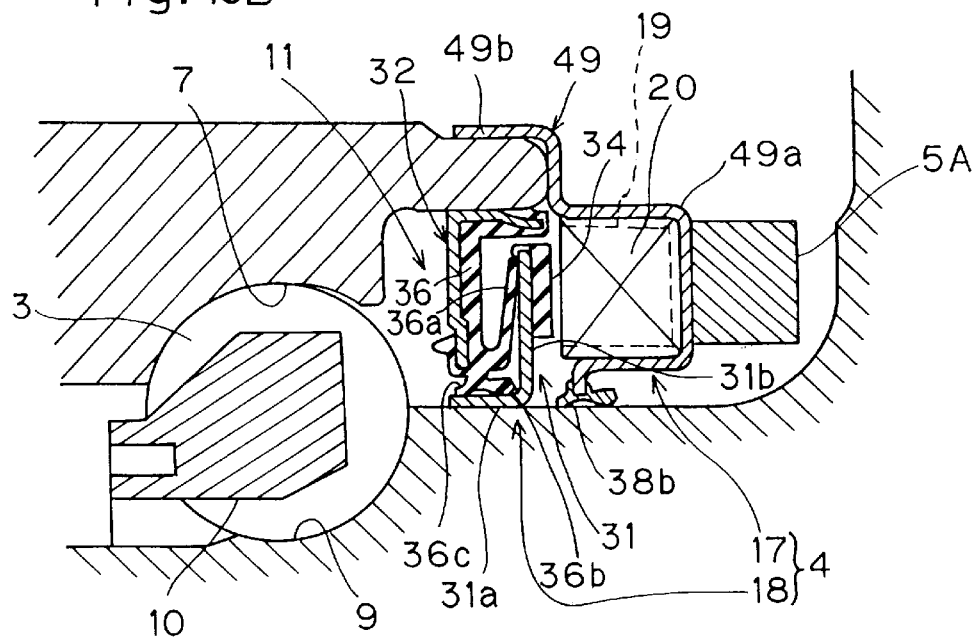
FIG. 15B is an enlarged sectional view of a portion of the wheel support bearing assembly shown in FIG. 15A.

FIG. 15 illustrates a ninth embodiment of the present invention. This embodiment is an outer race rotating type of a third generation and is used to support the driven axle. The electric generator 4 that serves as the rotation sensor is the thrust type.

The outer member 1 has one end on a front side where the wheel fitting flange 1b is formed. The inner member 2 is made up of two inner race forming members 2E and 2F, the inner race forming member 2F being formed with the vehicle body fitting flange 2b. The vehicle body fitting flange 2b is positioned on one side of the rear end portion of the outer member 1 adjacent the rear surface. The inner race forming member 2E is arranged at one end adjacent the front surface and is fixed by means of a fastening portion provided in the inner race forming member 2F.

The sealing member 11, the electric generator 4 and the transmitting means 5A are, except for the following features, similar to those described in connection with the third embodiment with reference to FIG. 9. In this embodiment, the first sealing member 31 of the sealing member 11 is press-fitted and mounted in a portion between the raceway 9, defined on the outer peripheral surface of the inner member 2, and the vehicle body fitting flange 2b. The coil/magnetic element combination 17 of the electric generator 4 and the transmitter 5A are fitted to the outer member 1 by means of the same fitting ring 49 as that used in the third embodiment, but the sealing member 38 provided in the inner peripheral portion of this fitting ring 49 is held in sliding engagement with the outer peripheral surface of the inner member 2.

In the case of this embodiment, although in the outer periphery of the inner member 2, a groove-shaped space is created between the end portion of the outer member 1 and the vehicle body fitting flange 2b, such outer peripheral space of the inner member 2 is effectively utilized to accommodate the electric generator 4 and the transmitter 5A since the electric generator 4 and the annular transmitter 5A overlap with each other in the axial direction.

Figure 16A:
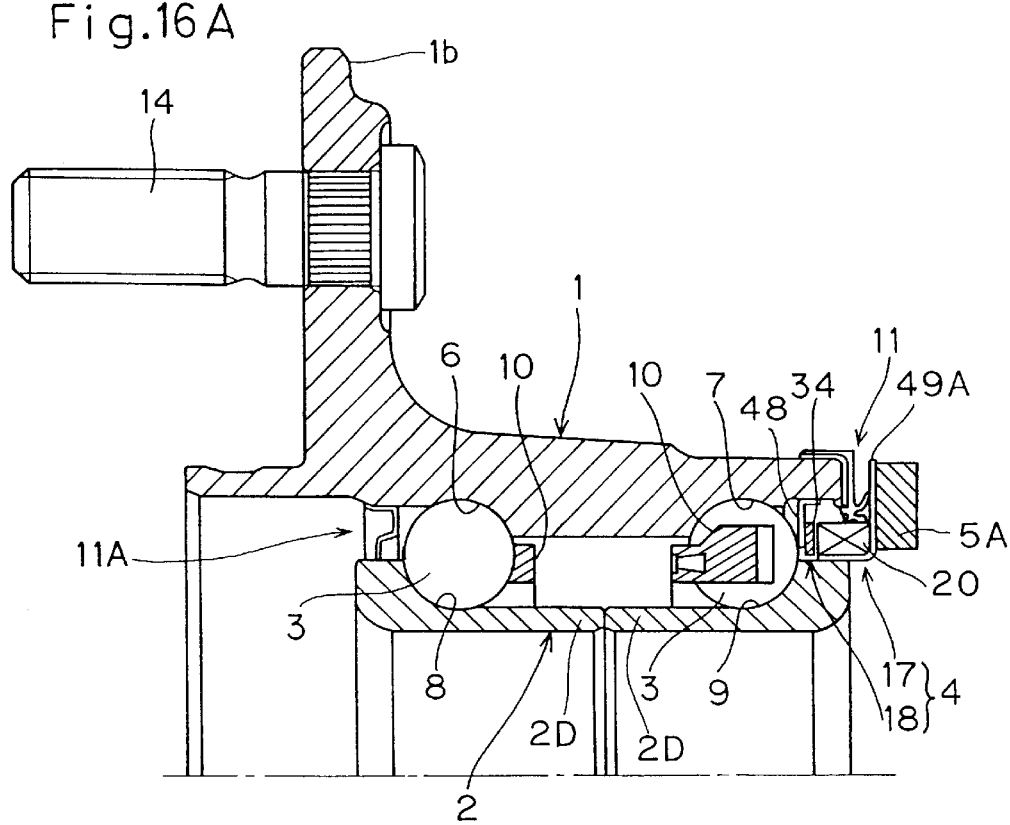
FIG. 16A is a sectional view of the wheel support bearing assembly according to a tenth preferred embodiment of the present invention.
Figure 16B:
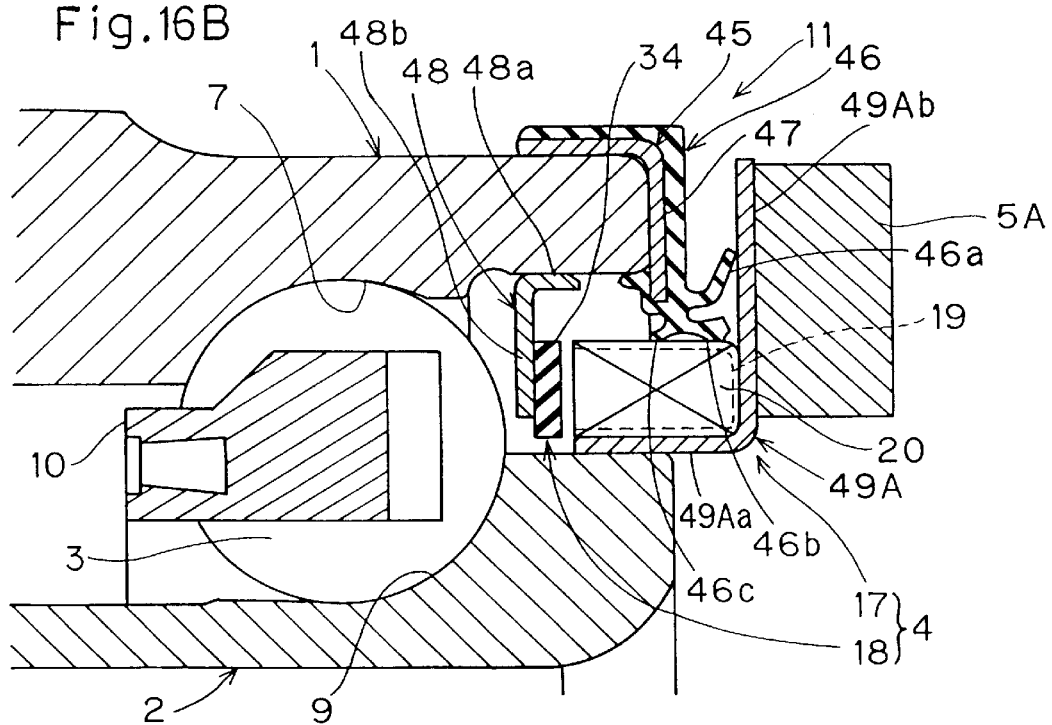
FIG. 16B is an enlarged sectional view of a portion of the wheel support bearing assembly shown in FIG. 16A.

FIG. 16 illustrates a tenth embodiment of the present invention. The wheel support bearing assembly in this embodiment is the outer race rotating type of a second generation, in which the thrust type electric generator 4 is employed as the rotation sensor. This embodiment corresponds to the invention as set forth in claim 14.

The outer member 1 is a member on the rotating side and has a wheel fitting flange 1b formed at one end thereof adjacent the front surface. The inner member 2 is a member on the stationary side and is of a split type including two bearing inner races 2D arranged axially.

The transmitting means 5A is constituted by an annular transmitter 5A. This transmitter 5A is integrated together with the ring member 19 of the coil/magnetic element combination 17 by securing it to the fitting ring 49A that is common to the coil/magnetic element combination 17 forming a part of the electric generator 4. The fitting ring 49 is a generally L-sectioned member including a cylindrical portion 49Aa and an upright plate portion 49Ab, with the coil/magnetic element combination 17 fitted around an outer periphery of the cylindrical portion 49Aa, and the annular transmitter 5A is fitted to an outer side face of the upright plate portion 49Ab. The fitting ring 49A is mounted on an outer peripheral surface of the inner member 2 having been press-fitted into the cylindrical portion 49Aa, wherefore the ring member 19 of the coil/magnetic element combination 17 and the transmitter 5A are mounted on an outer periphery of one end of the inner member 2.

The electric generator 4 is comprised of the multi-pole magnet 18 and the coil/magnetic element combination 17 that face with each other, with the multi-pole magnet 18 fitted to an inner peripheral surface of the outer member 1. The multi-pole magnet 18 is comprised of a ring-shaped substrate 48 and a magnet member 34. The ring-shaped substrate 48 is of a generally reversed L-section including a cylindrical portion 48a and an upright plate portion 48b and is mounted with the cylindrical portion 48a press-fitted into an inner peripheral surface of the outer member 1. The magnet member 34 is fixed to the ring-shaped substrate 48 and, except for this feature, this magnet member 34 is the same as the magnet member 34 which has been shown in and described with reference to FIG. 8.

The coil/magnetic element combination 17 is the same as the coil/magnetic element combination 17 used in the embodiments shown in FIG. 7, et seq. and includes the coil 20 accommodated within the groove-shaped ring member 19. Although the coil/magnetic element combination 17 has a generally flattened sectional shape in which the width thereof in the axial direction is larger than the width in the radial direction, but it may not be always flat in sectional shape.

The sealing member 11 includes a sealing member 45 fitted to the outer member 1 and held in sliding engagement with an outer peripheral surface which is a groove side wall portion of the groove-shaped ring member 19. The sealing member 45 is comprised of a core metal 47 and an elastic member 46 formed integrally with the core metal 47. The core metal 47 is formed to represent a generally reverse L-sectional shape and mounted as press-fitted into the outer periphery of one end of the outer member 1. The elastic member 46 includes lips 46b and 46c held in sliding engagement with an outer peripheral surface of the ring member 19 of the coil/magnetic element combination 17 and a lip 46a held in sliding engagement with the upright plate portion 49Ab of the fitting ring 49A.

In this structure, since sealing is achieved by causing the sealing member 45 to contact the ring member 19 accommodating the coil 20 of the electric generator 4, the ring member 19 itself functions as a sealing member and, therefore, the structure for sealing can further be compactized. Also, not only the multi-pole magnet 18 of the electric generator 4, but also a portion of the coil/magnetic element combination is arranged in between the outer member 1 and the inner member 2 and, therefore, protruding portions of the electric generator 4 and the transmitter 5A that protrude outwardly from the bearing assembly are reduced, thereby further reducing the space for installation.

Figure 17:
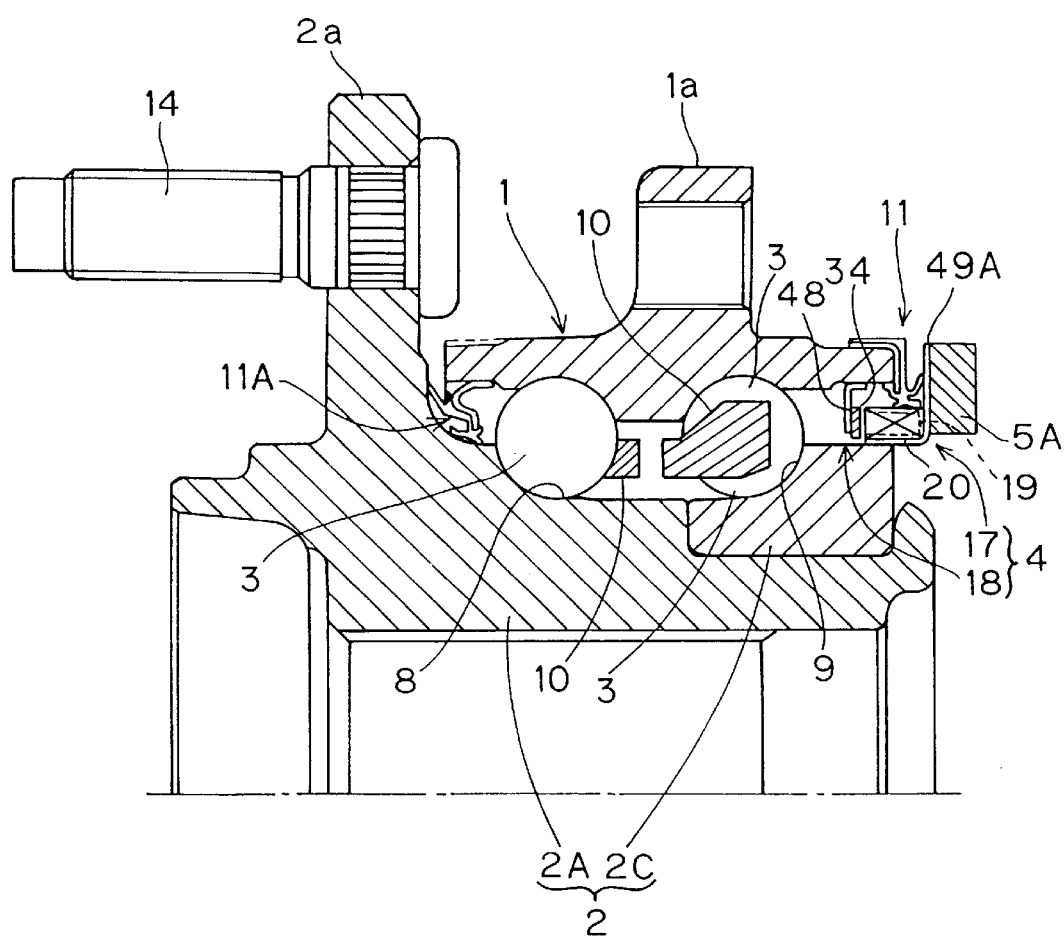
FIG. 17 is a sectional view of the wheel support bearing assembly according to an eleventh preferred embodiment of the present invention.

FIG. 17 illustrates an eleventh embodiment of the present invention. The wheel support bearing assembly according to this embodiment is the inner race rotating type of a third generation and is used for the support of the drive axle. The electric generator 4 used therein which serves as the rotation sensor is the thrust type.

The outer member 1 is of one piece structure including the vehicle body fitting flange 1a. The inner member 2 includes a hub wheel 2A and a separate inner race forming member 2B mounted on an outer periphery of one end of the wheel hub 2A. The inner race forming member 2B is fixed axially on the hub wheel 2A by fastening a fastening portion provided in the hub wheel 2A. The inner member 2 has the wheel fitting flange 2a and is fixed in position with the shaft portion of the constant speed joint (not shown) inserted into an inner peripheral hole of the inner member 2.

The sealing member 11, the electric generator 4 and the transmitting means 5A are substantially similar to those employed in the tenth embodiment shown in FIG. 6. It is, however, to be noted that contrary to the tenth embodiment, since the inner member 2 is on the rotating side, the transmitter 5A of the transmitting means 5A is on the rotating side.

Figure 18A:
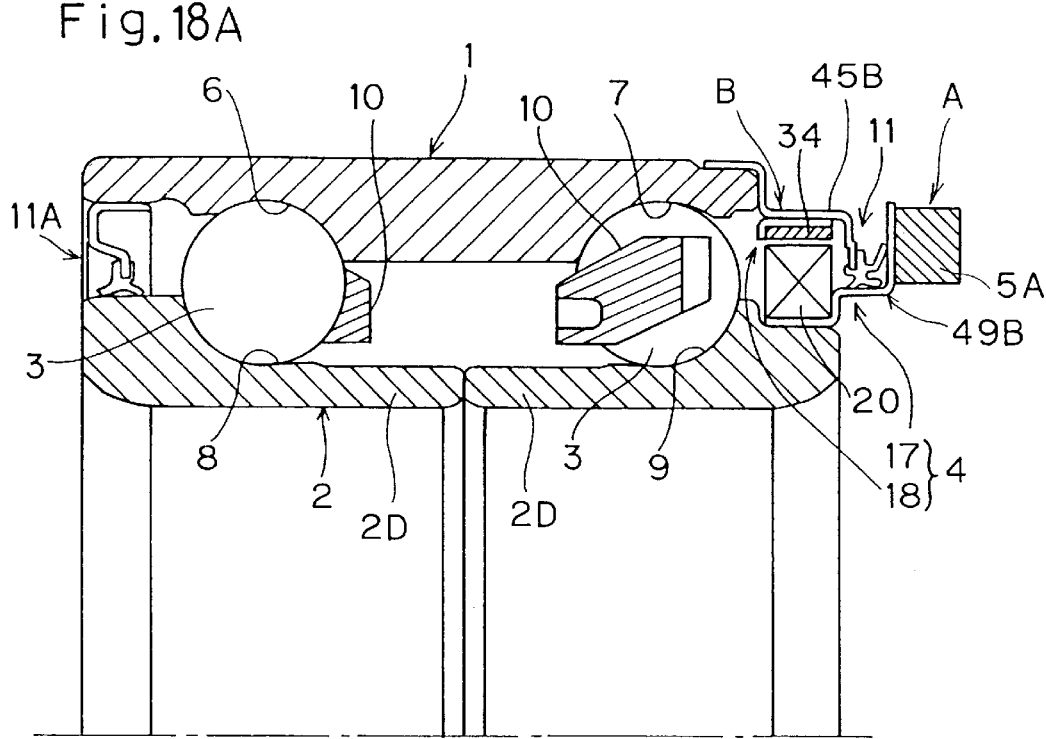
FIG. 18A is a sectional view of the wheel support bearing assembly according to a twelfth preferred embodiment of the present invention.
Figure 18B:
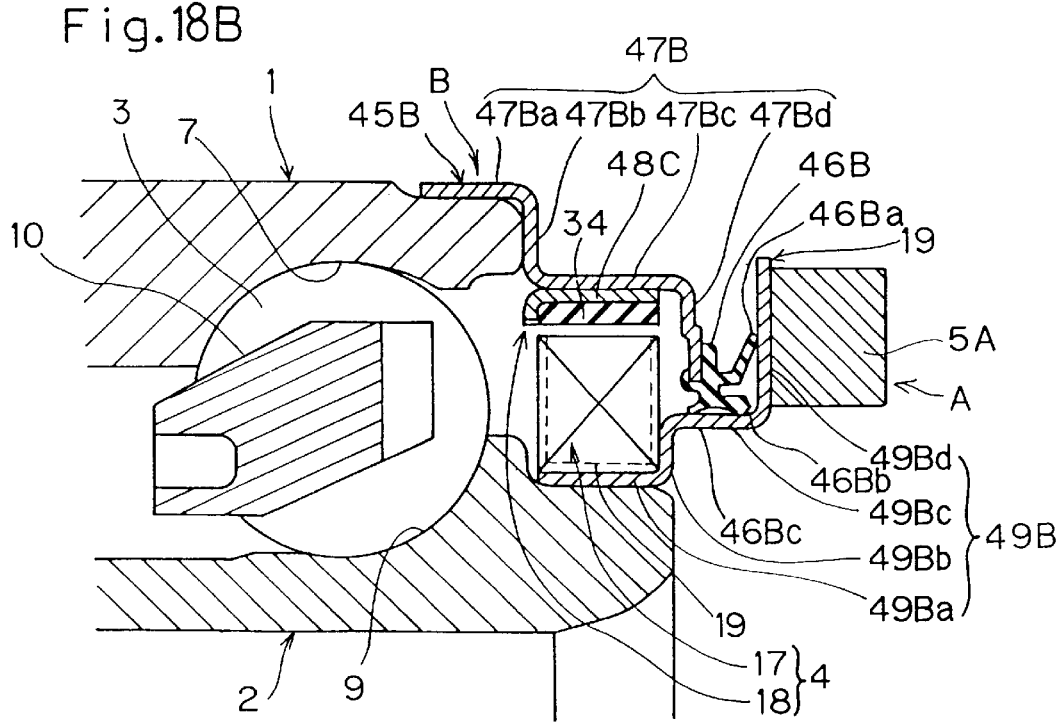
FIG. 18B is an enlarged sectional view of a portion of the wheel support bearing assembly shown in FIG. 18A.

FIG. 18 illustrates a twelfth embodiment of the present invention. The wheel support bearing assembly used in this embodiment is the inner race rotating type of a first generation, wherein the electric generator 4 serving as the rotation sensor is the radial type.

In this embodiment as well as the embodiments that follow, two components, that is, an assembly A comprised of the transmitter 5A and the ring member 19 and an assembly B comprised of the multi-pole magnet 18 and the sealing member 45B are utilized to seal the open end between the outer member 1 and the inner member 2.

In the twelfth embodiment shown in FIG. 18, the outer member 1 serves as a fixed side member and is made up of a single bearing outer race. The inner member 2 serves as a rotating side member and is made up of two bearing inner races 2D arranged axially. The outer member 1 and the inner member 2 do not have any wheel fitting flange and any vehicle body fitting flange.

The transmitter 5A and the ring member 19 of the coil/magnetic element combination 17 are fitted to the same fitting ring 49, the transmitter 5A and the ring member 19 of the coil/magnetic element combination 17 can be integrated together. What has been integrated together in this way is the assembly A on a side adjacent the coil. The sealing member 11 for sealing the open end includes a sealing member 45B to which the multi-pole magnet 18 of the electric generator 4 is fitted. The sealing member 45B includes a sealing core metal 47B and an elastic member 46B with the elastic member 46B held in sliding contact with the fitting ring 49B. The sealing member 45B and the multi-pole magnet 18 altogether constitute the assembly B. The ring member 19 of the coil/magnetic element combination 17 is fitted to an outer peripheral surface of one end portion of the inner member 2 through the fitting ring 49B, and the end of the outer member 1 is located at a potion retracted axially inwardly of the inner member 2 towards an intermediate portion of the bearing assembly a distance about equal to the width of the coil/magnetic element combination 17.

The fitting ring 49B includes a first cylindrical portion 49Ba having one end portion formed with a first upright plate portion 49Bb extending radially outwardly, a second cylindrical portion 49Bc, and a second upright plate portion 49Bd extending radially outwardly therefrom. The coil/magnetic element combination 17 is fitted to the fitting ring 49B with the ring member 19 mounted on the outer peripheral surface of the first cylindrical portion 49Ba of the fitting ring 49B and held in contact with the first upright plate portion 49Bb. The annular transmitter 5A is fitted to an outer side face of the second upright plate portion 49Bd of the fitting ring 49B. The fitting ring 49B is fitted to the outer peripheral surface of the end of the inner member 2 by press-fitting into the first cylindrical portion 49Ba.

The sealing core metal 47B is of a shape including a first cylindrical portion 47Ba having one end formed with a first upright plate portion 47Bb extending radially inwardly, a second cylindrical portion 47Bc and a second upright plate portion 47Bd extending radially inwardly therefrom. This sealing core metal 47B is fitted in position with the first cylindrical portion 47Ba press-fitted into the outer peripheral surface of the end of the outer member 1. The elastic member 46B includes a plurality of lips 46Ba to 46Bc slidingly engaged with the second cylindrical portion 49Bc and the second upright plate portion 48Bd of the fitting ring 49B.

Although as is the case with that in the first embodiment shown in FIGS. 1 to 5 the electric generator 4 is the radial type, contrary to the first embodiment the multi-pole magnet 18 is positioned on the side of the outer periphery whereas the coil/magnetic element combination 17 is positioned on the side of the inner periphery.

The multi-pole magnet 18 is comprised of a cylindrical substrate 48C and a magnet member 34 and fitted as engaged in an inner diametric surface of a second cylindrical portion 47Bc of a sealing core metal 47B. The magnet member 34 is similar to the magnet member 34 shown in and described with reference to FIG. 3, except that it is fixed on the cylindrical substrate 48C.

The coil/magnetic element combination 17 is made up of the ring member 19 made of a magnetic material and accommodating the coil 20. The ring member 19 is substantially the same as the ring member 19 of the coil/magnetic element combination 17 which has been described in connection with the first embodiment (FIG. 1) with reference to FIGS. 4 and 5, except that the orientation of magnetic polarity is different. In other words, the ring member 19 shown in the example of FIG. 18 has a sectional shape which is groove-shaped as is the case with the ring member 19 used in the example of FIGS. 4 and 5 and includes a plurality of interleaved claws 21a and 22a bent from open edges of the side faces of the groove in respective directions opposed to each other and alternating in a direction circumferentially thereof. It is, however, to be noted that the coil/magnetic element combination 17 used in the embodiment of FIG. 18 is, unlike that in the example shown in FIGS. 4 and 5, has its groove opening oriented in a direction radially outwardly with respective magnetic poles defined by the interleaved claws 21a and 22a oriented radially outwardly. Even in the ring member 19 used in the example shown in FIG. 18, the interleaved claws 21a and 22a may be tapered as is the case with the example shown in FIG. 6.

In the structure described above, since the sealing member 11 and the electric generator 4 and the transmitting means 5A are constituted by the two assemblies, the number of component parts is small and assemblability is excellent.

Figure 19:
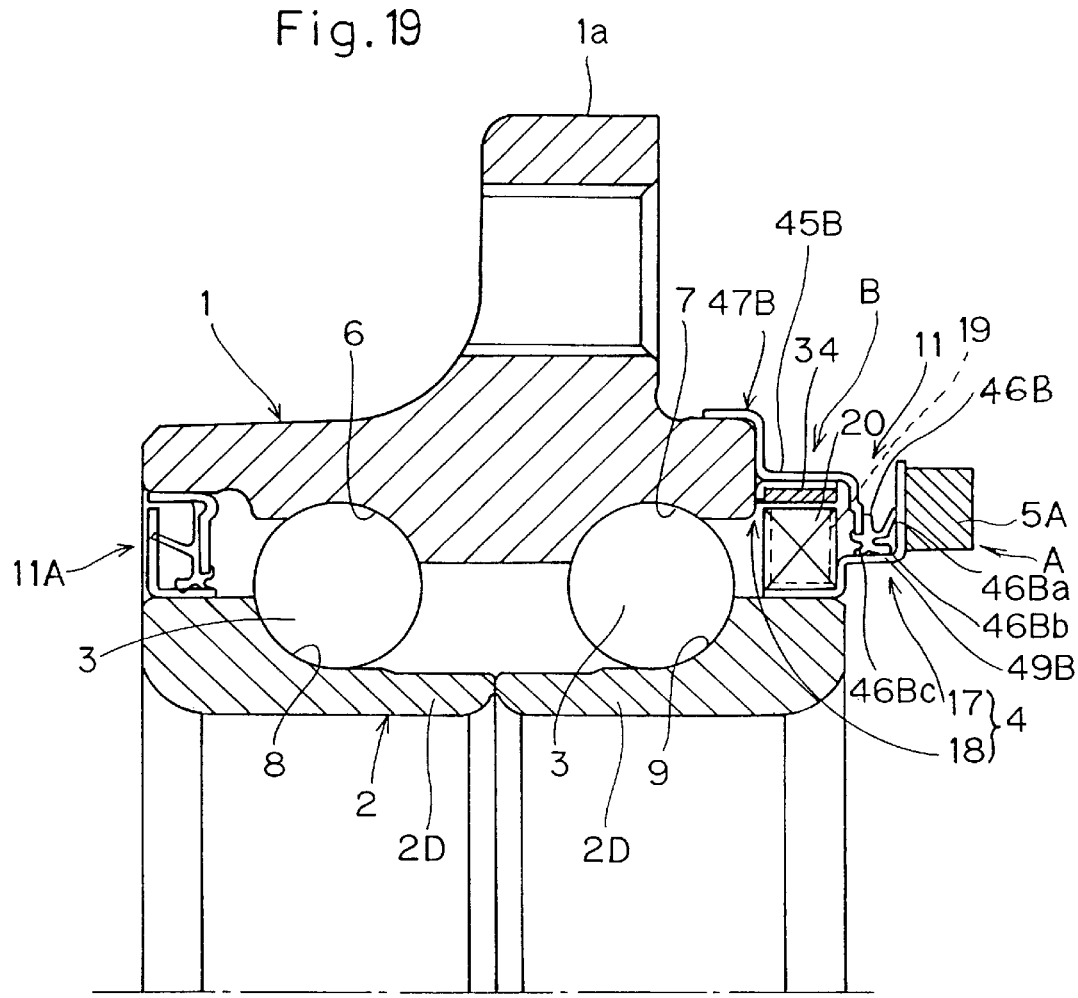
FIG. 19 is a sectional view of the wheel support bearing assembly according to a thirteenth preferred embodiment of the present invention.

FIG. 19 illustrates a thirteenth embodiment of the present invention which is directed to the wheel support bearing assembly of the inner race rotating type of a second generation. In this wheel support bearing assembly, the electric generator 4 which serves as the rotation sensor is the radial type.

The outer member 1 is of one piece structure including the wheel fitting flange 1a on the outer periphery thereof. The inner member 2 includes two bearing inner races 2D arranged axially.

The sealing member 11, the electric generator 4 and the transmitting means 5A are substantially the same as those used in the twelfth embodiment described with reference to FIG. 18 and are constituted by the two assemblies A and B.

Figure 20:
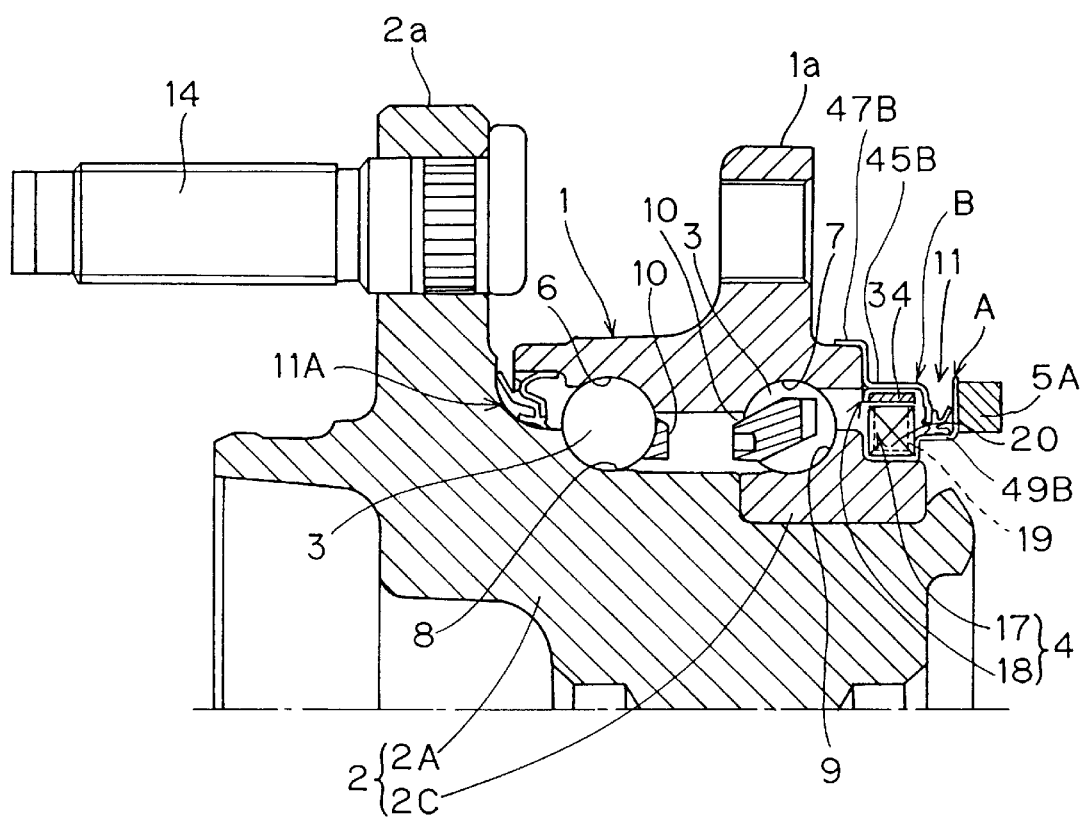
FIG. 20 is a sectional view of the wheel support bearing assembly according to a fourteenth preferred embodiment of the present invention.

FIG. 20 illustrates a fourteenth embodiment of the present invention which is directed to the wheel support bearing assembly for the support of a driven axle. This wheel support bearing assembly is the inner race rotating type of a third generation and the electric generator 4 serving as the rotation sensor is the radial type.

The outer member 1 is of one piece structure including the vehicle body fitting flange 1a. The inner member 2 is constituted by the hub wheel 2A and the separate inner race forming member 2C mounted on the outer periphery of the end of the hub wheel 2A. The inner race forming member 2C is fixed in position by fastening a fastening portion, provided in the hub wheel 2A, to connect it to the hub wheel 2A axially. The inner member 2 is a non-perforated member having no inner bore and has the wheel fitting flange 2a at one end thereof.

The sealing member 11, the electric generator 4 and the transmitting means 5A are substantially the same as those used in the twelfth embodiment shown in FIG. 18 and are constituted by the two assemblies A and B.

Figure 21:
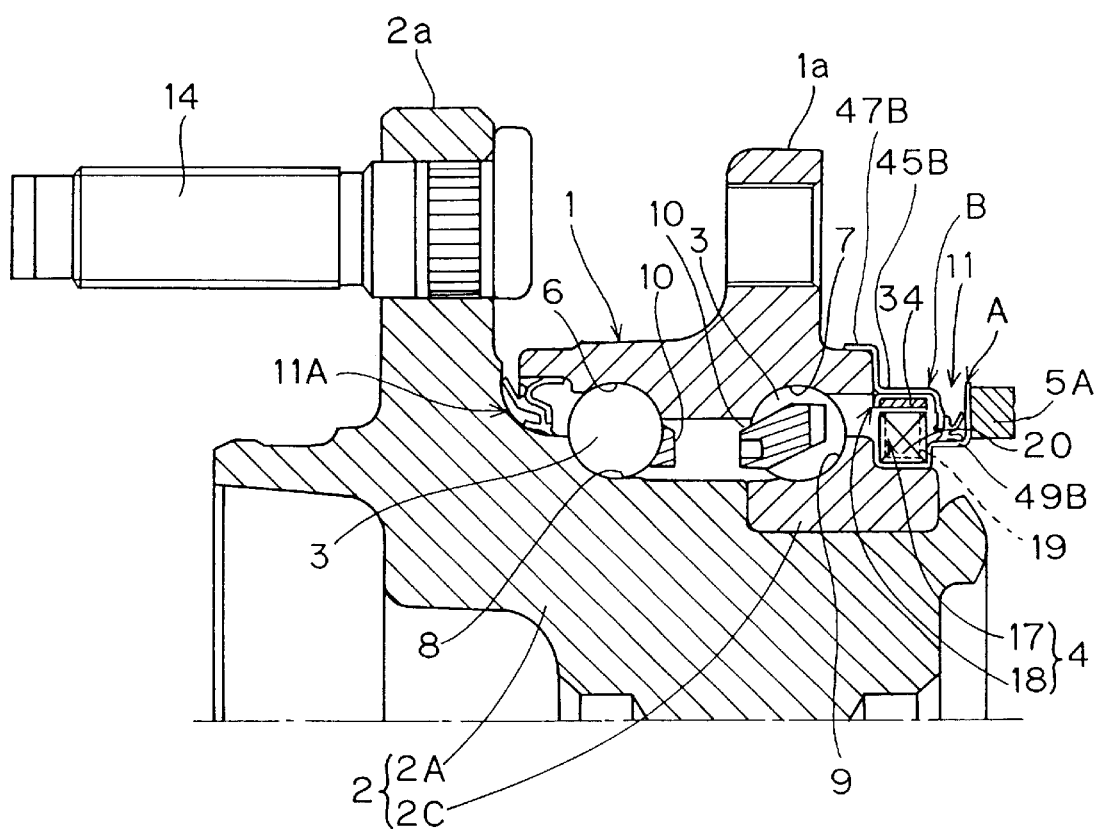
FIG. 21 is a sectional view of the wheel support bearing assembly according to a fifteenth preferred embodiment of the present invention.

FIG. 21 illustrates a fifteenth embodiment of the present invention. The wheel support bearing assembly according to this embodiment is for the support of a drive axle and is the inner race rotating type of a third generation. The electric generator 4 that serves as the rotation sensor is the radial type.

In this embodiment, the inner member 2 has an inner diametric hole 2h. Other structural features thereof are substantially similar to those in the fourteenth embodiment shown in FIG. 20.

Figure 22:
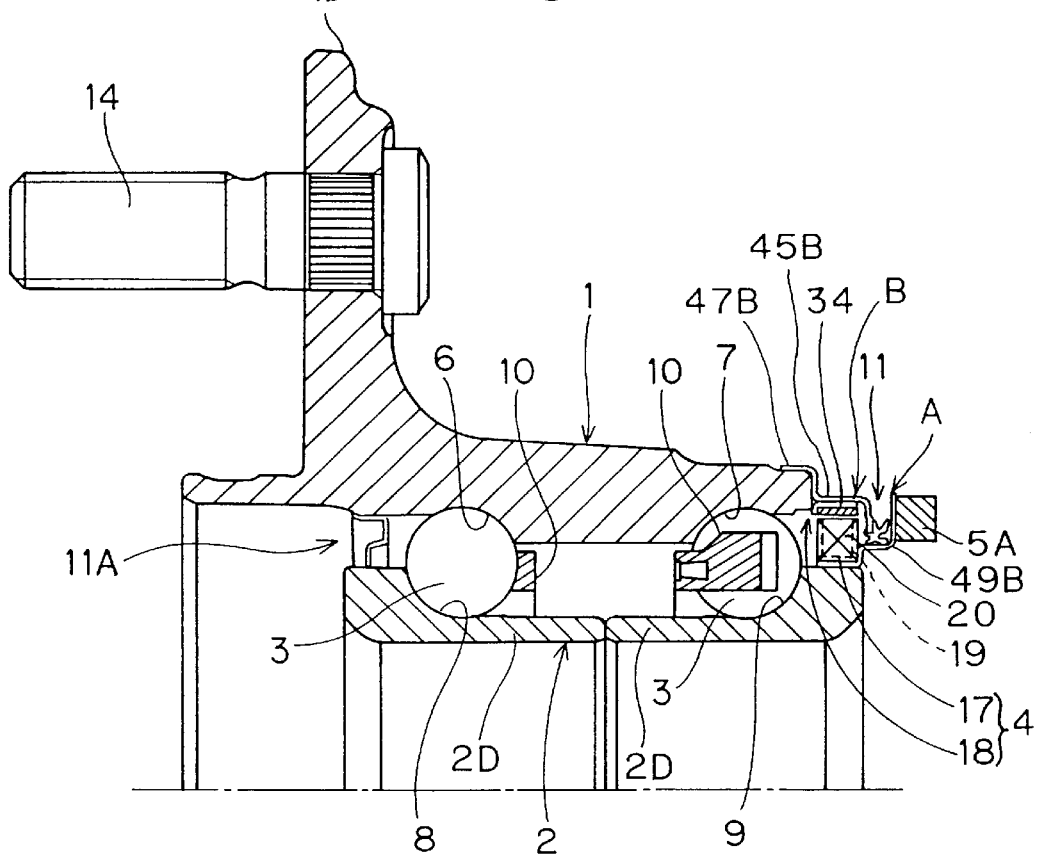
FIG. 22 is a sectional view of the wheel support bearing assembly according to a sixteenth preferred embodiment of the present invention.

FIG. 22 illustrates a sixteenth embodiment of the present invention. The wheel support bearing assembly according to this sixteenth embodiment is the outer race rotating type of a second generation and the electric generator 4 that serves as the rotation sensor is the radial type.

The outer member 1 is of one piece structure including the wheel fitting flange 1a on the outer periphery thereof. The inner member 2 includes the two bearing inner races 2D arranged axially thereof.

The sealing member 11, the electric generator 4 and the transmitting means 5A are substantially similar to those in the twelfth embodiment shown in FIG. 18 and are constituted by the two assemblies A and B.

Figure 24:
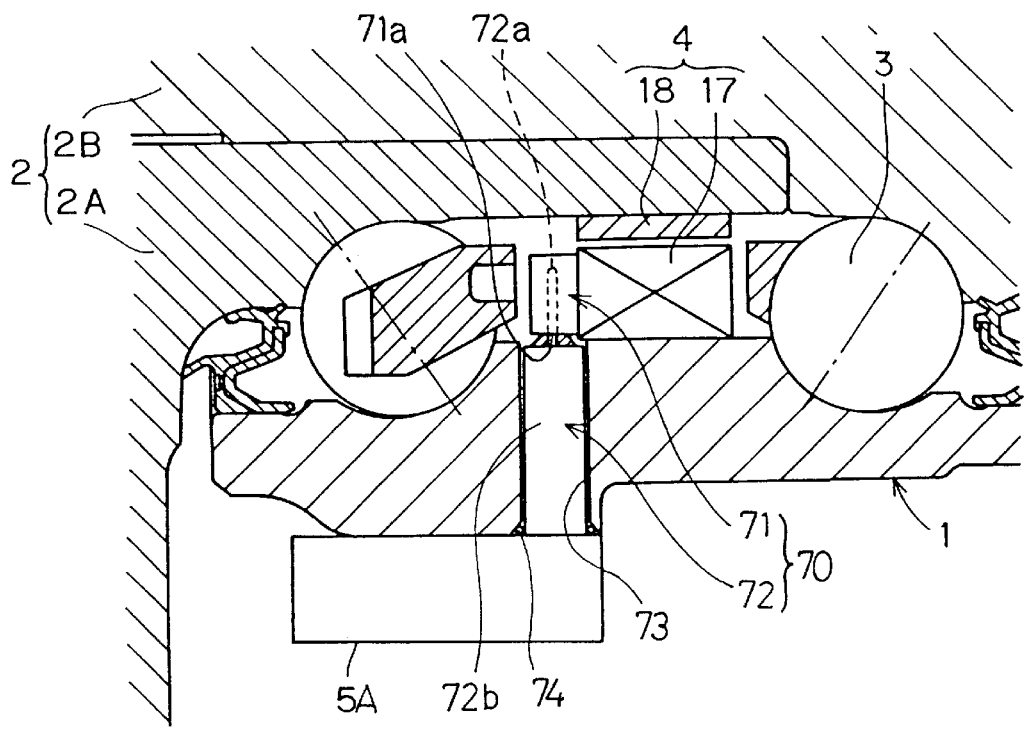
FIG. 24 is an enlarged sectional view of a portion of the wheel support bearing assembly shown in FIG. 23.
Figure 25:
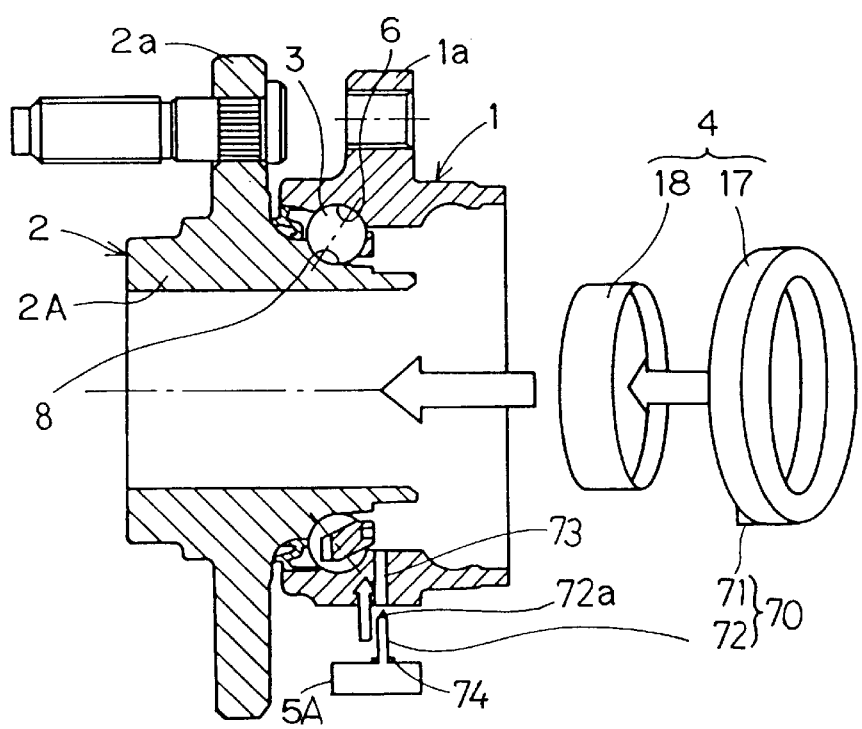
FIG. 25 is an explanatory diagram showing a method of assembling the wheel support bearing assembly shown in FIG. 23.

Further preferred embodiments of the present invention will now be described with reference to FIGS. 23 to 25 in combination with FIG. 6. The wheel support bearing assembly disclosed therein is basically the same structure as, and brings about the same effects as those brought by, the wheel support bearing assembly which has been shown in and described with reference to FIGS. 1 to 3 and 5 in connection with the first embodiment of the present invention, but the former differ from the latter in that the stator 17 and the transmitting means 5A are connected with each other by means of a plug-in connector assembly 70.

The connector assembly 70 is made up of a plug-in socket 71 and a plug 72 that can be plugged in to the socket 71. As shown in FIG. 24 on an enlarged scale, the plug-in socket 71 is provided in the stator 17 and has its plug-in opening 71a oriented radially outwardly. A socket-side contact element (not shown) is disposed inside the plug-in opening 71a. The plug-in socket 71 is provided on a side face of the stator 17 which is a portion of the circumferential direction of the stator 17.

The plug 72 is provided in the transmitting means 5A and has a plug base 72b of a generally rod-like shape protruding outwardly from a rear surface of a casing for the transmitting means 5A, and a pin-shaped contact element 72a secured to a front end of the plug base 72b. The contact elements 72a are inserted and connected into the plug-in opening 71a of the plug-in socket 71. The outer member 1 has a radial hole 73 defined therein so as to extend from inner to outer surfaces, while the transmitting means 5A has been positioned at a proper position on the outer member 1, the plug-in plug 72 extends through the radial hole 73. More specifically, the rod-shaped plug base 72b of the plug 72 are inserted into the radial hole 73 with the pin-shaped contact element 72a protruding radially inwardly from the radial hole 73. On an outer periphery of a base end of the plug 72, there is provided a ring-shaped sealing means 74 such as, for example, an elastic sealing member. This sealing means 74 while the transmitting means 5A is mounted on the outer member 1 seals an opening of the radial hole 73.

The manner in which the wheel support bearing assembly of the structure described above will now be described in sequence. As shown in FIG. 25, outer member 1 and the flanged member of the inner member 2 are assembled together through one row of the rolling elements 3. In this condition, the stator 17 and the rotor 18 of the electric generator 4 are incorporated onto the inner peripheral surface of the outer member 1 and the outer peripheral surface of the flanged member 2A, respectively. Thereafter, the inner race forming member 2B of the inner member 2 is assembled together with the remaining row of the rolling elements 3.

Then, the transmitting means 5A is so installed that the plug 72 can be inserted into the radial hole 73 of the outer member 1. In this way, the contact element 72a of the plug 72 is inserted into the plug-in opening 71a of the plug-in socket 71 of the stator 17 to establish the connector assembly 70. In this way, the transmitting means 5A and the stator 17 can be connected on a one-touch basis and in a cableless manner, with the number of assembling steps consequently reduced.

Also, when the plug 72 is inserted into the radial hole 73 in the outer member 1 until the connector 70 assumes a connected condition, a sealing means 74 at a base end of the plug 72 seals an inlet opening of the radial hole 73. Accordingly, any possible ingress of dusts and water can be prevented. Thus, mere installation of the transmitting means 5A having the sealing means 74 is effective to complete a sealing, thus resulting in number of assembling steps.

It is to be noted that a job of connecting the connector assembly 70 incident to installation of the transmitting means 5A may be performed prior to assemblage of the inner race forming member 2B to the outer member 1.

The radial hole 73 into which the plug 72 is plugged in has to be formed in the outer member 1, but this hole 73 may be a small hole and can be sealed by the sealing means 74 together with the installation of the transmitting means 5A in the manner described hereinbefore.

Figure 26:
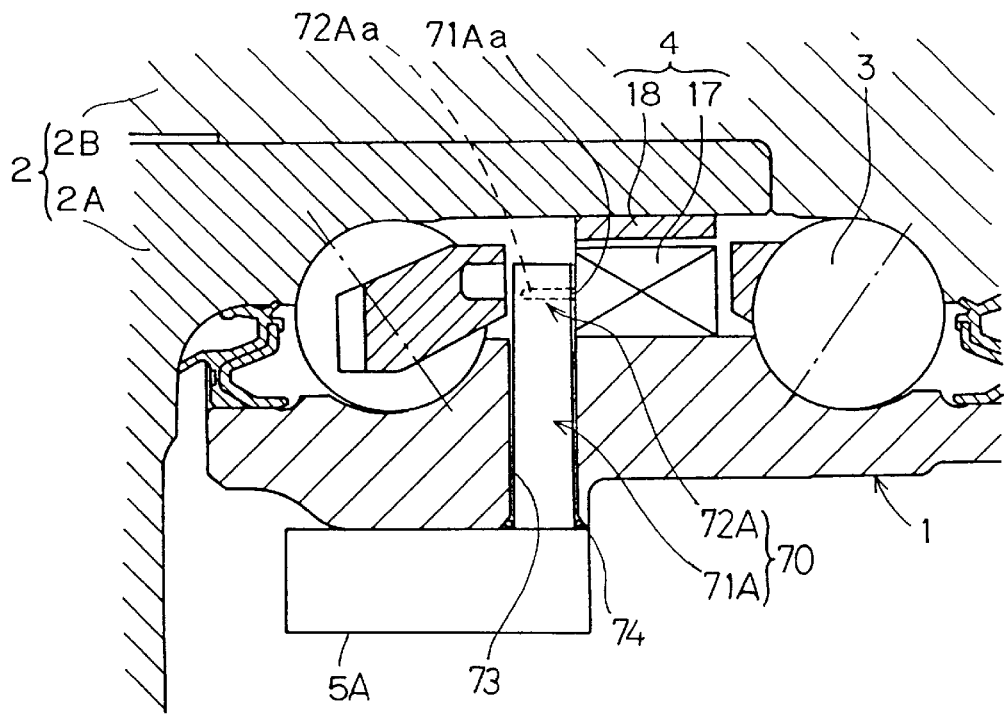
FIG. 26 is an enlarged sectional view of a portion of the wheel support bearing assembly according to a further preferred embodiment of the present invention.
Figure 27:
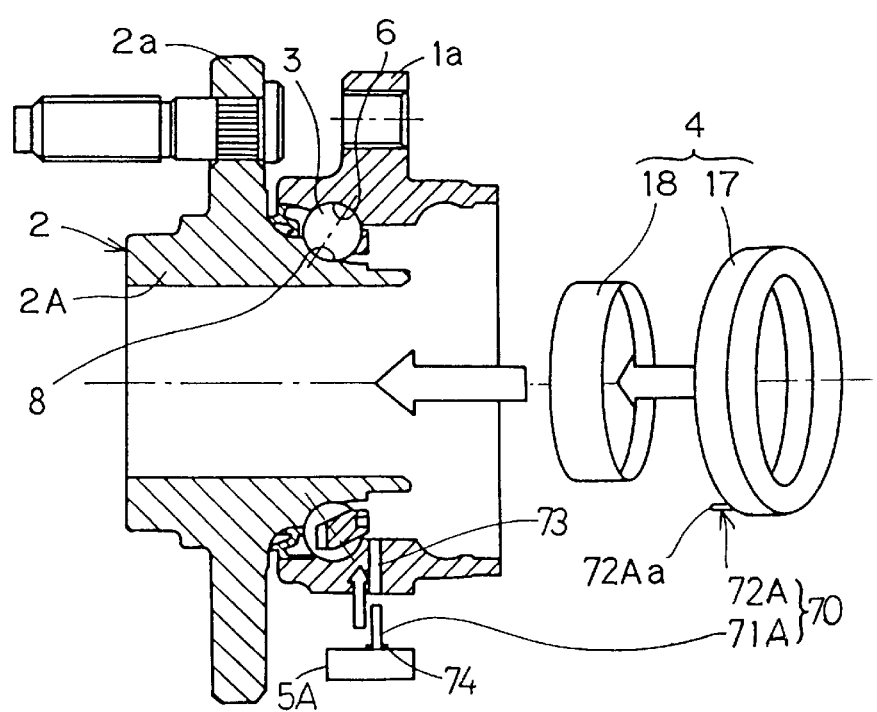
FIG. 27 is an explanatory diagram showing the method of assembling the wheel support bearing assembly shown in FIG. 26.

Although in the foregoing embodiment the plug-in socket 71 has been provided on the stator 17 and the plug 72 has been provided on the transmitting means 5A, the plug-in socket 71A may be provided on the transmitting means 5A as shown in FIGS. 26 and 27 in a manner contrary to the foregoing embodiment. This plug-in socket 71A is formed to represent a rod shape that extends radially inwardly of the radial hole 73 of the outer member, with an axially oriented plug-in opening 71Aa defined at a free end thereof. The plug 72A is provided on the stator 17 and includes pin-like contact element 72Aa that is inserted and connected into the plug-in opening 71Aa of the plug-in socket 71A. A base end of the plug-in socket 71A is provided with a sealing means 74 for closing an opening of the radial hole 73.

In this structure, the sequence of assemblage of the transmitting means 5A and the stator 17 is reversed. In other words, after the transmitting means 5A has been installed with its plug-in socket 71A inserted into the radial hole 73 of the outer member 1, the stator 17 is inserted axially through the outer member 1. By this insertion, the plug 72A of the stator 17 is inserted and connected into the plug-in socket 71A. For this reason, even in this case, the connector assembly 70 can be plugged in and connected on a one-touch basis, with the number of assembling steps consequently reduced.

Figure 28:
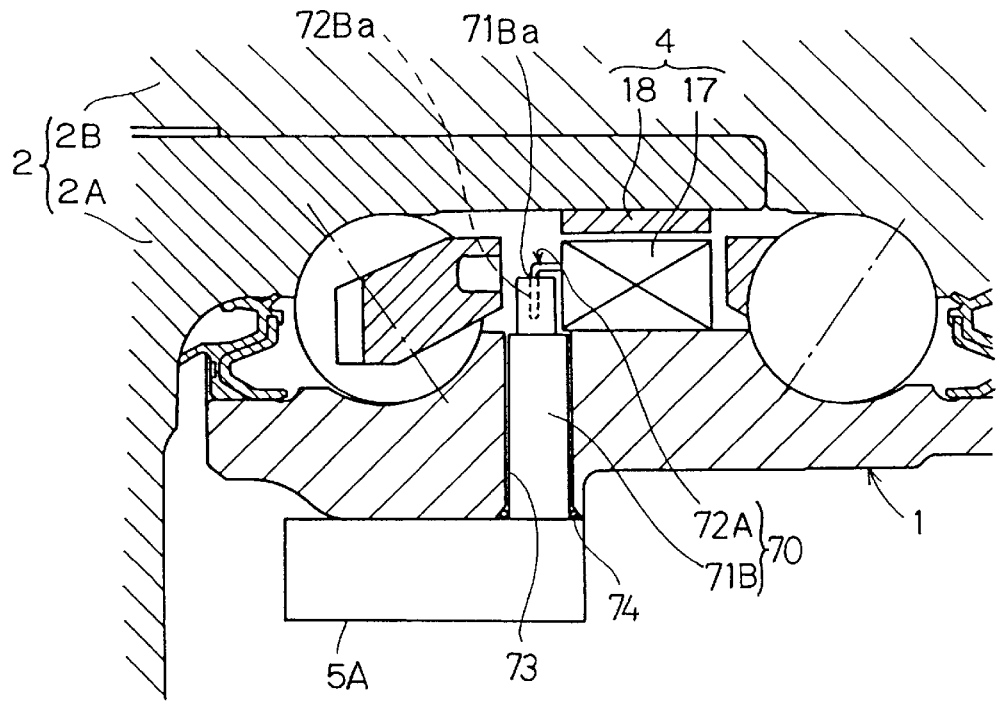
FIG. 28 is an enlarged sectional view of a portion of the wheel support bearing assembly according to a still further preferred embodiment of the present invention.

Also, the connector assembly 70 may be so structured as shown in FIG. 28, other than that described above. In the example shown in FIG. 28, the plug-in socket 71B is provided on the transmitting means 5A and has a plug-in opening 71Ba defined at a free end face thereof. The plug 72B is provided on the stator 17 with its contact element 72Ba oriented radially outwardly. In the case of this structure, the sequence of assemblage is such that after the stator 17 has been installed on the outer member 1, the transmitting means 5A is installed.

Figure 23:
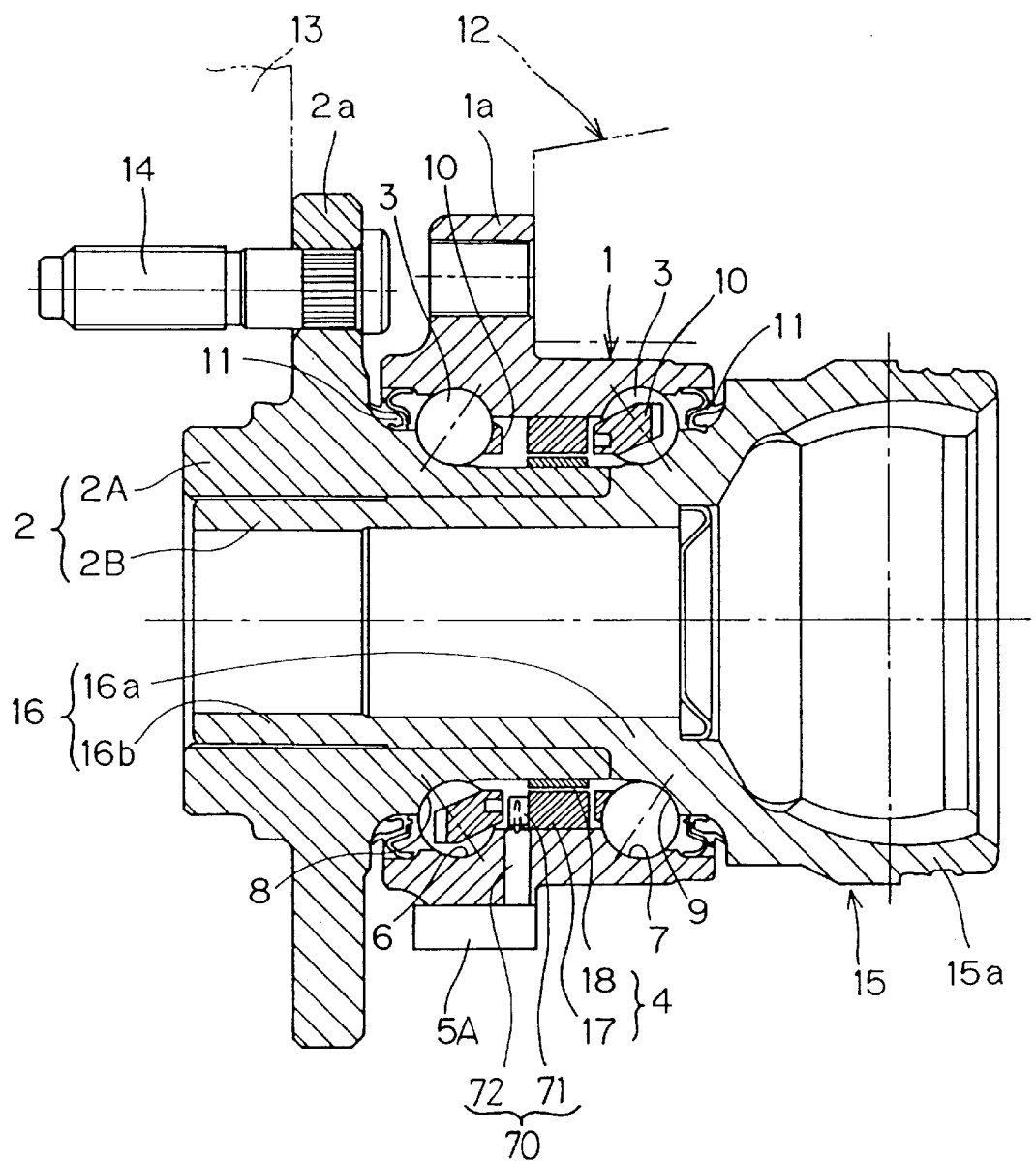
FIG. 23 is a sectional view of the wheel support bearing assembly according to another preferred embodiment of the present invention.

It is to be noted that in the respective examples shown in FIGS. 26 and 27 and FIG. 28, other than those specifically described are substantially the same as in the embodiment shown in FIG. 23.

Figure 29:
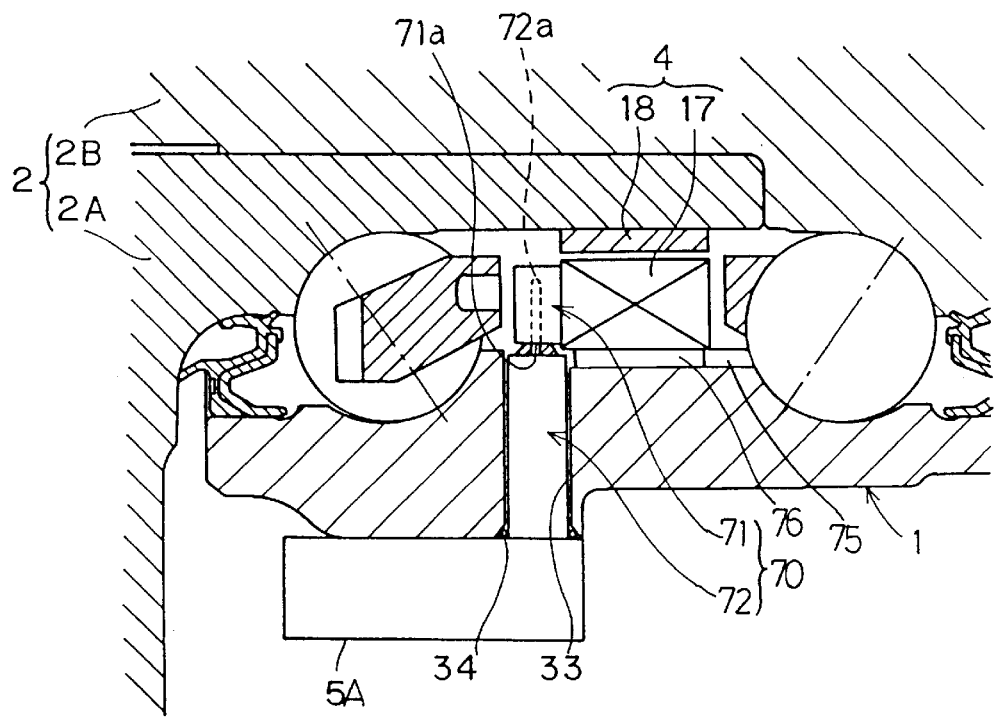
FIG. 29 is an enlarged sectional view of a portion of the wheel support bearing assembly according to a still further preferred embodiment of the present invention.
Figure 30:
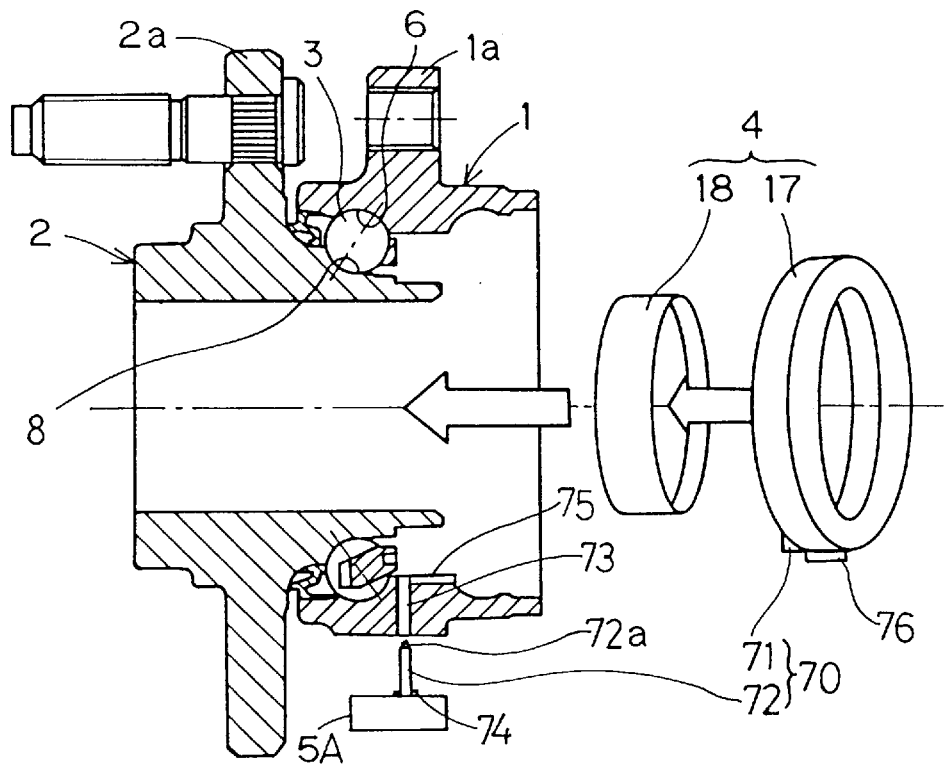
FIG. 30 is an explanatory diagram showing the method of assembling the wheel support bearing assembly shown in FIG. 29.
Figure 31:
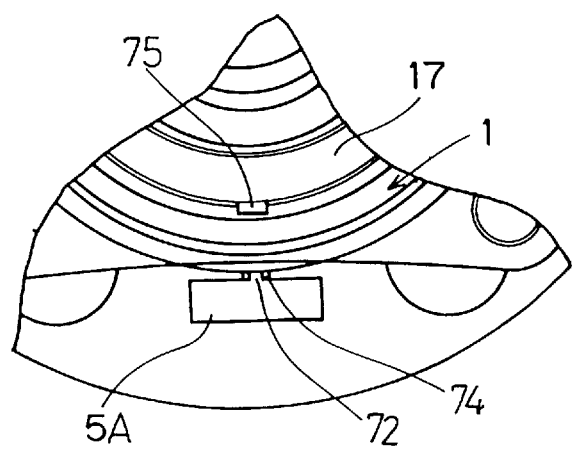
FIG. 31 is an enlarged rear view of a portion of the wheel support bearing assembly shown in FIG. 30.

FIGS. 29 to 31 illustrate the example in which in the embodiment shown in FIG. 23, a positioning engagement portion 75 is provided at a location circumferentially of the inner diametric surface of the outer member 1, and an engaged potion 76 engageable with this engagement portion 75 is provided in the outer diametric surface of the stator 17. The engagement portion 75 is in the form of a groove extending axially, while the engaged portion 76 is in the form of a projection extending axially.

In the case of this structure, the following functions and effects can be obtained. By way of example, with the embodiment shown in FIG. 23, when the stator 17 is to be mounted on the outer member 1, the position of the radial hole 73 in the outer member 1 is difficult to locate and, therefore, the circumferential position of the plug-in socket 71 tends to be displaced, making it difficult to insert and connect the plug 72 into the plug-in socket 71. However, if the engagement portion 75 and the engaged portion 76, which engage with each other, are provided on the outer member 1 and the stator 17 as is the case with the example shown in FIGS. 29 to 31, alignment of the engagement portion 75 and the engaged portion 76 with each other is effective to properly position the circumferential position of the plug-in socket 71 with the plug-in socket 71 and the plug 72 consequently connected together on a one-touch basis. Also, this engagement serves to prevent the stator 17 from being rotated with a fastening margin minimized, resulting in increase of the workability.

The engagement portion 75 and the engaged portion 76 may be such that, other than the design in which as described hereinbefore the engagement portion 75 is in the form of a groove and the engaged portion 76 is in the form of a projection, the engagement portion 75 may be a projection whereas the engaged portion 76 may be a groove, or each of those projection may be any other simple projection. It is, however, that the engagement portion 75 and the engaged portion 76 are preferably of a design in which the both can be axially separable.

Also, the engaged portion 76 provided in the stator 17 may be formed in a component part of the connector assembly 70 provided on the stator 17, for example, the plug-in socket or the plug 17. The stator 17 is generally formed of a core of a steel plate and a coil and, therefore, provision of it on the component part of the connector assembly 70 is particularly advantageous in that the manufacture thereof can be simplified.

Figure 32:
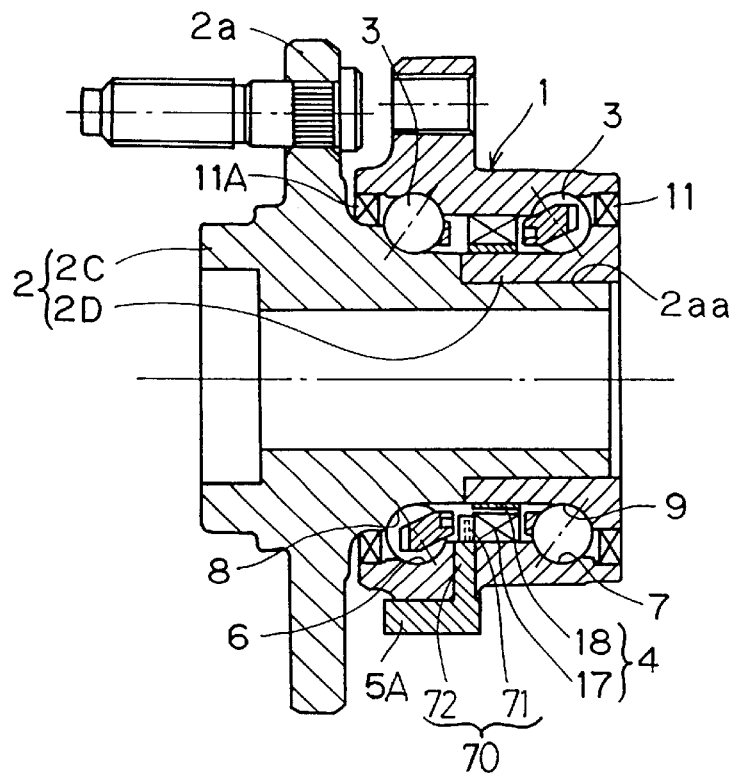
FIG. 32 is an sectional view of the wheel support bearing assembly according to a still further preferred embodiment of the present invention.
Figure 33:
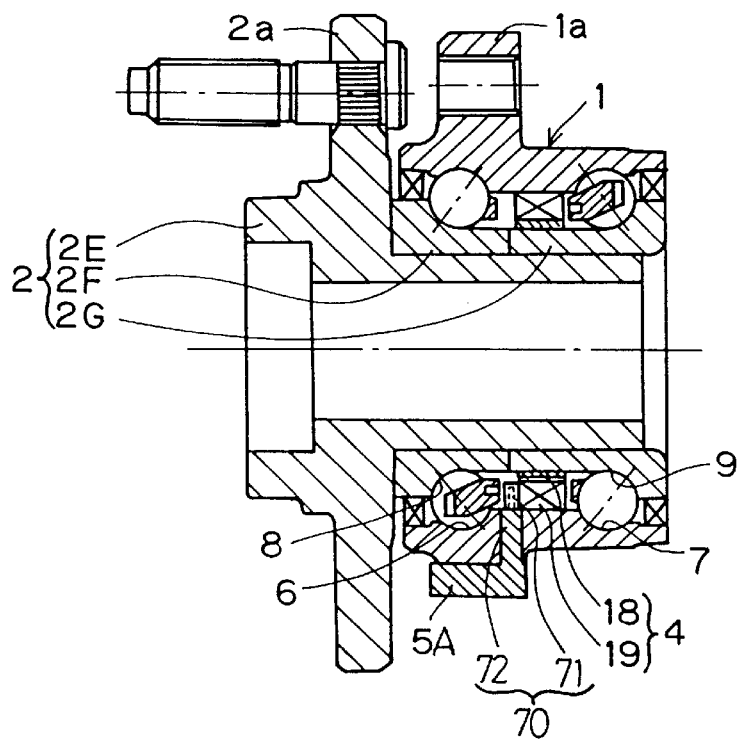
FIG. 33 is an sectional view of the wheel support bearing assembly according to a still further preferred embodiment of the present invention.

FIGS. 32 and 33 illustrates respective modifications in which the manner of combining the inner member is changed. In the modification shown in FIG. 32, the inner member 2 is a combination of the flanged member 2C having the wheel fitting flange 2a and other members 2D which are rendered to be an inner race which is a component part dedicated to formation of the raceway 9. The flanged member 2C will become a hub wheel and is formed with a reduced diameter portion 2aa, reduced in diameter by means of a step, on an outer peripheral surface of a portion opposite to the end where the wheel fitting flange 2a is formed, and the other member 2D which will become the inner race as described above is press-fitted. Also, of the dual rows of the raceways 8 and 9 on the inner member 2, the raceway 8 is formed on the flanged member 2C and the other raceway 9 is formed on the other member 2D. The rotor 18 of the electric generator 4 is provided on the other member 2D.

The electric generator 4, the transmitting means 5A and the connector assembly 70 may be those shown in and described with reference with reference to FIGS. 23 to 31.

In the modification shown in FIG. 33, the inner member 2 is an assembly of three component parts, that is, a flanged member 2E having the wheel fitting flange 2a and two other members 2F and 2G. The other members 2F and 2G are inner races which are component members dedicated for the raceway formations formed with the raceways 8 and 9 of the dual rows of the raceways 8 and 9, both of which are press-fitted on the outer peripheral surface of the flanged member 2E. The flanged member 2E eventually forms a hub wheel.

Even in this example, the electric generator 4, the transmitting means 5A and the connector assembly 70 may be those shown in and described with reference with reference to FIGS. 23 to 31.

An anti-skid brake device according to further embodiments of the present invention will now be described with reference to FIG. 34 and other drawings. The anti-skid brake device referred to above is an apparatus wherein the braking force of a brake 132 is controlled by detecting the number of revolutions of a wheel 13 and in response to a detection signal thereof. Each wheel 13 is rotatably supported by the automotive body structure 12 through the wheel support bearing assembly 133. The wheel support bearing assembly 133 employed is in the form of the wheel support bearing assembly described with reference to and shown in FIGS. 1 to 6 in connection with the first embodiment of the present invention, and is of the design in which the rolling elements 3 are interposed between a wheel support member 1, which serves as the outer member, and a rotary member 2 which serves as the inner member. The wheel support member 1 is supported by a suspension system (not shown), protruding downwardly from the automobile body structure 12, by means of a knuckle 12a. The rotary member 2 includes the wheel fitting flange 2a formed on an outer periphery of one end thereof, to which the wheel 13 is fitted. The wheel 13 is, so far shown therein, a front (steering) wheel, and the rotary member 2 of the wheel support bearing assembly 133 has the opposite end connected to an axle (not shown) through the constant speed joint 15.

It is to be noted that although this embodiment is of a type so-called a fourth generation in which the wheel support bearing assembly and the constant speed joint are integrated together, the present invention is not always limited to the specific bearing type nor to the specific type of constant speed joint.

A pulsar ring 18 which is a multi-pole magnet is mounted on the rotary member 2, and a sensor 17 which is a coil/magnetic element combination for detection of the number of wheel revolutions is mounted on the wheel support member 1 in opposition to the pulsar ring 18. The pulsar ring 18 and the sensor 17 altogether constitute the electric generator 4 and define the rotor and the stator of the electric generator 4, respectively. The detection signal from the sensor 17 is supplied through the wireless transmitting and receiving means 5 to a control circuit 136 installed on the automobile body structure 12. The control circuit 136 is a means for controlling the braking force of the brake 132. The wireless transmitting and receiving means 5 includes the transmitting means 5A mounted on the wheel support member 1 and a receiving means 5B mounted on the automobile body structure 12. The receiving means SB is installed within, for example, a tire housing 12b defined in the automobile body structure 12.

The brake 132 is used to brake the wheel 13 by engagement with a frictional member (not shown) such as, for example, a brake drum or a brake disc provided on the wheel 13 and includes a hydraulic cylinder or the like. Operation of a brake operating member 137 such as, for example, a brake pedal is converted into a hydraulic pressure by means of a converting means 138 and is then transmitted to the brake 132 after having increased in pressure.

A braking force regulating means 139 is a means for regulating the braking force of the brake 132 and regulates the braking force according to a command from the control circuit 136. The braking force regulating means 139 is provided on a hydraulic circuit at a location between the brake 132 and the converting means 138.

The control circuit 136 is, more specifically, a means for applying a braking force regulating command to the braking force regulating means 139 according to the number of wheel revolutions detected by the rotation sensor 17 and is constituted by an electronic circuit such as, for example, a microcomputer.

The details of the wheel support bearing assembly 133 are those discussed as the wheel support bearing assembly 133 according to the first embodiment of the present invention with reference to FIGS. 1 to 6.

The claw-pole type electric generator 4 used in this anti-skid brake device can assume a structure effective to provide an induction voltage sufficient to drive the transmitting means 5A from a small number of revolution (20 rpm) if an optimum design is applied thereto. Also, it will become the high performance electric generator that can be compactized and low-priced.

The electric generator 4 will be optimally designed if the following specification is met, when the number of poles of the sensor 17 which is the stator is chosen to be 50 or 100 poles.

| In the case of 50 poles | |
|---|---|
| Pole Pitch: | 2.75 mm |
| Air Gap: | 0.5 mm |
| Coil Turn No.: | 200 turns |
| Coil Diameter: | 0.32 mm |
| Magnet: | Neodymium magnet |
| In the case of 100 poles | |
| Pole Pitch: | 1.0 mm |
| Air Gap: | 0.5 mm or smaller |
| Coil Turn No.: | 200 turns or greater |
| Coil Diameter: | 0.32 mm or smaller |
| Magnet: | Neodymium magnet |

In place of the foregoing structure, the electric generator 4 may be of a structure in which the sensor 17 serving the stator is of the structure shown in FIG. 6.

Figure 34:
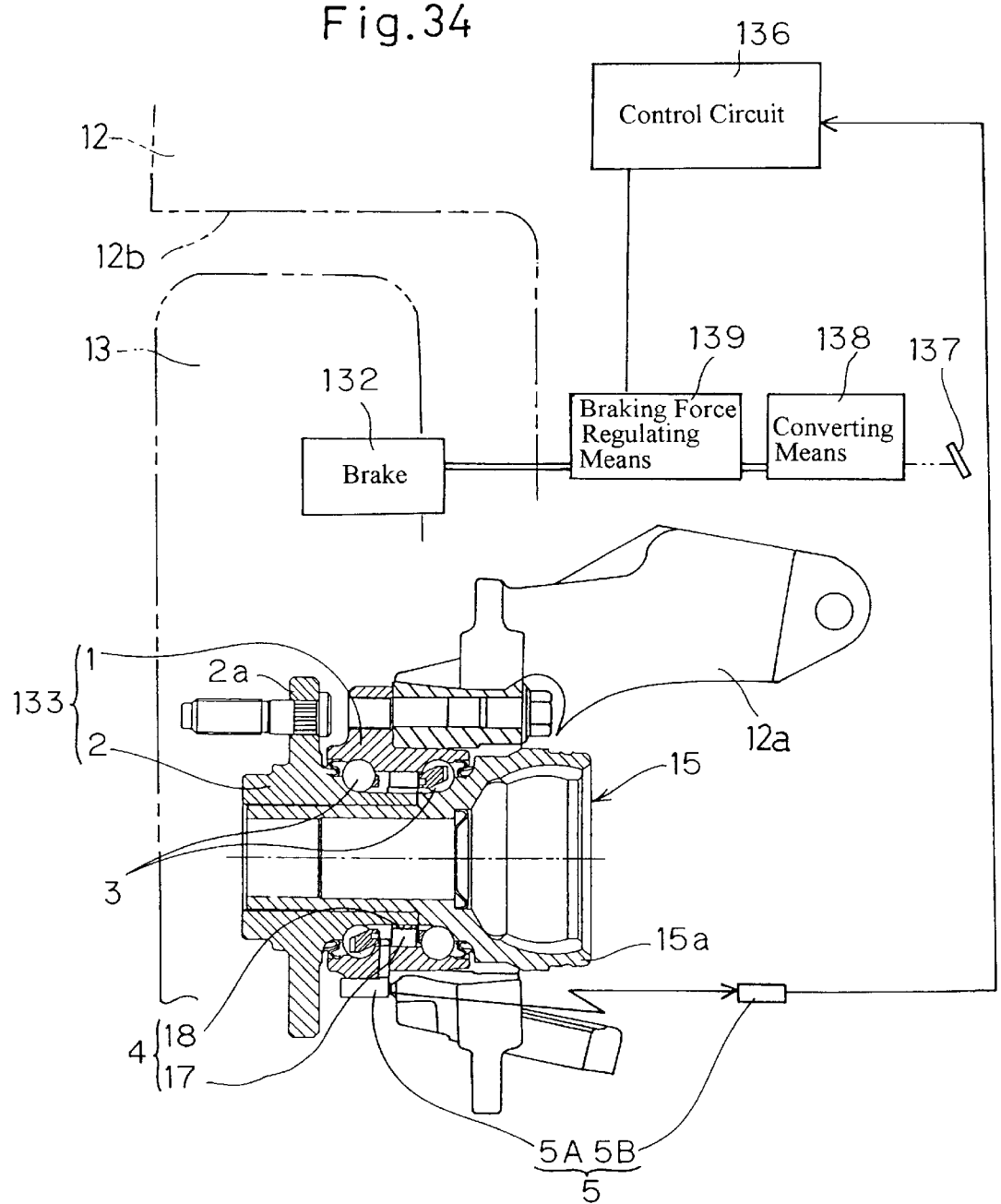
FIG. 34 is an explanatory diagram showing an conceptual structure of an anti-skid brake device according to a still further preferred embodiment of the present invention.
Figure 35:
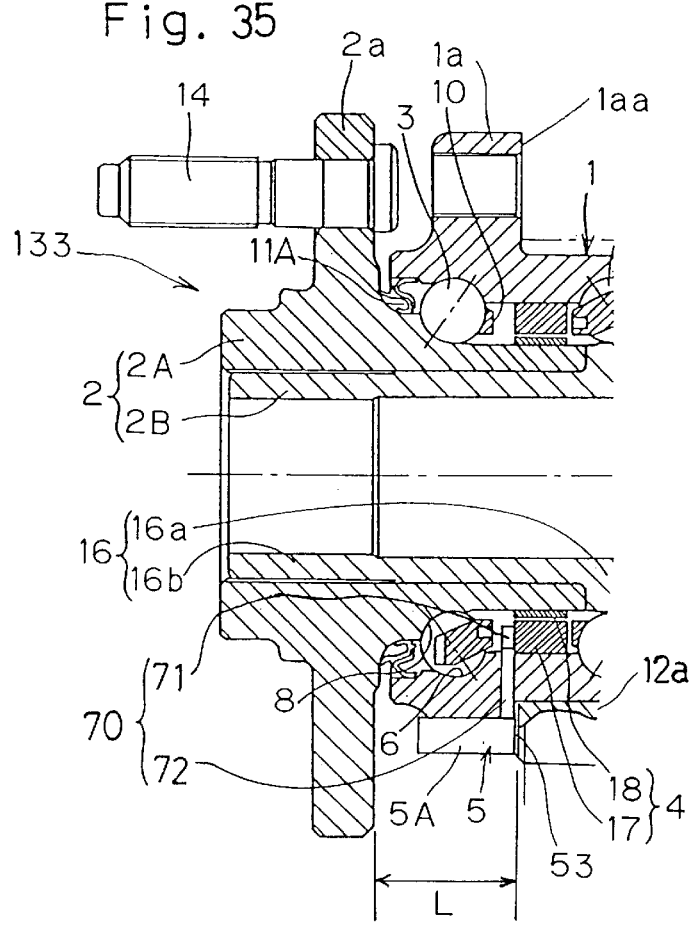
FIG. 35 is a sectional view showing a portion where a transmitting means is arranged in the wheel support bearing assembly employed in the anti-skid brake device shown in FIG. 34.

Referring to FIG. 34, a wireless transmitting and receiving means 5 is provided on a portion of the outer peripheral surface of the wheel support member 1 and is connected through a connector assembly 70 as shown in FIG. 35. The connector assembly 70 includes connector forming components 71 and 72 provided in the sensor 17 and the transmitting means 5A, respectively. One of the connector forming components 71 and 72 is rendered to be a socket and the other thereof is rendered to be a plug. The connector forming component 72 provided in the transmitting means 5A extends through a radial hole defined in the wheel support member 1. The transmitting means 5A is comprised of a transmitter including an outer casing in which electronic component parts are accommodated.

The position at which the transmitting means 5A is fitted is preferably at a location outwardly from an inner widthwise face 1aa of the vehicle body fitting flange 1a provided in the wheel support member 1 of the wheel support bearing assembly 133. In other words, the transmitting means 5A is arranged in a space of a distance L defined between the inner widthwise face 1aa and the wheel fitting flange 2a of the rotary member 2.

Positioning of the transmitting means 5A in this space facilitates an easy removal of the rotary member 2 while the transmitting means 5A remains fitted to the wheel support member 1 which serves as an outer race, thus rendering the maintenance to be excellent. If the distance L of the space is chosen to be, for example, about 25 mm, the transmitting means 5A has a size that is preferably 20×20 mm or smaller.

The transmitting means 5A is preferably provided with an electrode-equipped aluminum plate 153 at a contact portion with the knuckle 12a. This electrode-equipped aluminum plate 153 is used to input a sinusoidal wave, generated by the sensor 17 which is the stator of the electric generator 4, to the transmitting means 5A. Thus, the provision of the electrode-equipped aluminum plate 153 is effective to avoid anode corrosion between dissimilar materials.

In the conventional wheel support bearing assembly, at the contact portion between the outer race made of steel and the knuckle made of aluminum or the like, rusting, that is, anode corrosion tends to occur as a result of a potential difference by the effect of an ion difference. For this reason, an anti-rusting measures such as an expensive treatment in which a dacrotized film is formed on a surface of the outer race has been practiced.

In contrast thereto, where the electrode-equipped aluminum plate 153 is provided in the transmitting means 5A in the manner described above, since the aluminum plate 153 and the knuckle 12a or the like are both made of the aluminum material, no potential difference occur. Accordingly, by allowing a feeble electric current to flow in the aluminum material, it is possible to eliminate the potential difference between the dissimilar materials. Consequently, it is possible to allow the feeble electric current to flow between the wheel support member 1, which serves as the outer race, and the knuckle 12a or the like made of aluminum, thereby making it possible to eliminate the potential difference between the dissimilar materials. With this structure, possible generation of rust can be eliminated advantageously.

Also an expensive treatment in which a dacrotized film is formed on a surface of the wheel support member 1 which serves as an outer race can be eliminated advantageously, cost and time for the assembly can be reduced.

Figure 36:
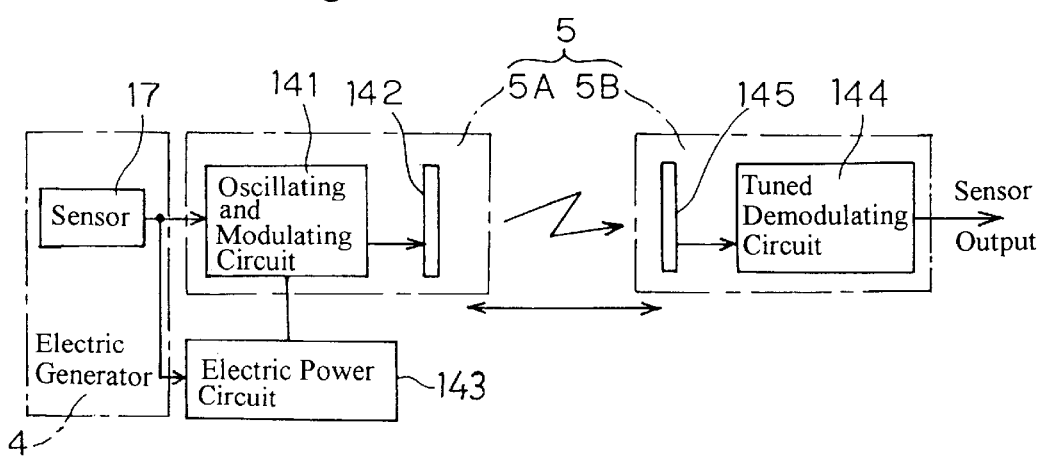
FIG. 36 is a block diagram showing a wireless transmitting and receiving means.

The wireless transmitting and receiving means 5 may be used of a type operable with a feeble radio wave or with a magnetic coupling. The wireless transmitting and receiving means operable with the feeble radio wave will first be described. FIG. 36 illustrates an example of the wireless transmitting and receiving means 5 operable with radio waves. The transmitting means 5A transmits a feeble radio wave by frequency modulating a carrier wave with a signal from the sensor 17. The transmitting means 5A is comprised of an oscillating and modulating circuit 141 and a transmitting antenna 142. The oscillating and modulating circuit 141 is made up of an oscillator for oscillating a carrier wave of a predetermined frequency and a modulator for modulating the carrier wave, oscillated therefrom, with the output from the sensor 17. A crystal oscillator is used for the oscillator of the oscillating and modulating circuit 141. The frequency of the carrier wave is so relatively high as to facilitate the frequency modulation and has the highest field strength, permitted according to the radio wave regulations, which lie within a relatively high frequency region in order to increase the field strength. More specifically, the frequency of the carrier wave is preferably chosen to be within a frequency region from which, in order to suppress any adverse influence brought about by external electromagnetic disturbances disturbance waves are excluded by the radio wave regulations. Specifically, in the case of the territory of Japan, the frequency of the carrier wave is allocated to the frequency region of 283 to 322 MHz.

The sensor 17 forms a part of the electric generator 4 as hereinbefore described and an electric power for the oscillating and modulating circuit 141 is available from an electric power circuit 143 that utilizes an electric power generated by the electric generator 4.

The receiving means 5B includes the antenna 145 and a tuned demodulating circuit 144 for tuning to and demodulating a received signal.

Figure 37:
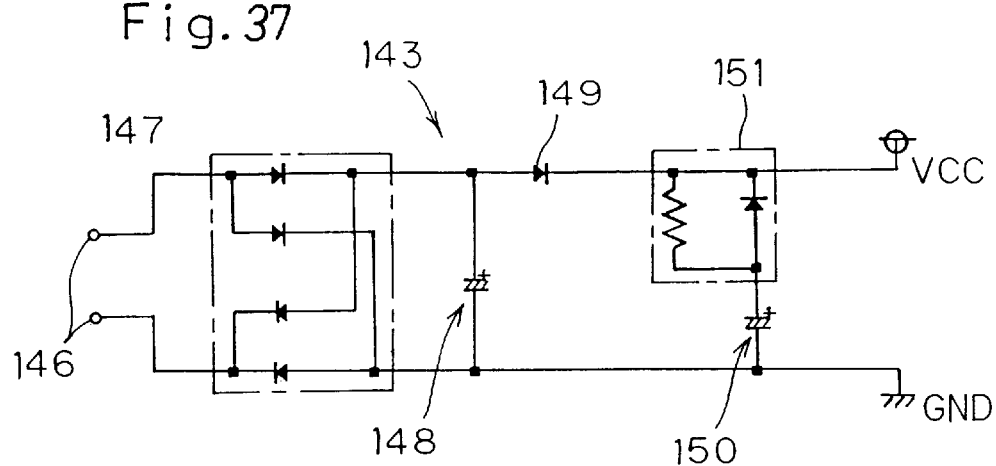
FIG. 37 is a circuit diagram showing an electric power circuit.

The electric power circuit 143 makes use of an electric power generated from an alternating current power generator 4 in which the sensor 17 is used as a stator and is of the structure as shown in FIG. 37. An input to an electric generator input terminal 146 is rectified and smoothed by a rectifying bridge 147 and a smoothing capacitor 148 and is then outputted from an electric power output terminal VCC through a diode 149. At a stage following the diode 149 and between the plus-side electric power output terminal VCC and a terminal GND on earth side, a super capacitor 150 is intervened. This super capacitor 150 is used in the form of a capacitor having a capacitance of 0.1 F. A parallel circuit 151 including a diode and a resistor is intervened between a plus side of the super capacitor 150 and the output electric power terminal VCC. It is to be noted that, in place of the parallel circuit 151 of the diode and the resistor, a Zener diode (not shown) may be connected parallel to the super capacitor 150.

Hereinafter, the structure described hereinabove will be described. Referring to FIG. 34, a signal indicative of the number of revolutions of the wheel detected by the sensor 17 is transmitted wireless from the transmitting means 5A of the wheel support member 1 to the receiving means 5B on the side of the automobile body structure 12 and, therefore, no electric wire for transmitting and receiving the sensor signal is exposed between the wheel support member 1 and the automobile body structure 12. For this reason, there is no possibility of the electric wire being broken as a result of stone hitting and/or frozen snow within the tire housing 12b. Also, the use of the electric wire between the wheel support member 1 and the automobile body structure 5 for transmission of the sensor signal is eliminated, along with elimination of the necessity to perform a complicated and time-consuming wiring work and, accordingly, an automobile can be manufactured lightweight at a reduced cost.

Since the wireless transmitting and receiving means 5 is of the type capable of transmitting the feeble radio waves by frequency modulating (FM) the carrier wave with the signal from the sensor 17 and the frequency of the carrier wave is chosen to be equal to or lower than 322 MHz, it is less sensitive to the external electromagnetic disturbances due to the selection of the frequency region to be used and the modulating method.

While in the FM the frequency of oscillation of the transmitting means 5A is changed. However, since in view of the property of a quartz oscillating circuit used as a source of oscillation the frequency variable range is within about a few plus and minus percent of the reference frequency, no large frequency shift cannot be obtained at a low frequency. For this reason, it is necessary to essentially increase the frequency, but it must be a feeble radio wave that do not violate the radio wave regulations. It is, however, to be noted that in terms of circuit fabrication it is easy if the frequency is lower.

According to the radio wave regulations, the feeble radio wave that can be used freely is defined to have the following field strength for a particular frequency region.

| Frequency | Field Strength (at Location 3 meters away) |
|---|---|
| 322 MHz and less | 500 $\mu$ V/m and less |
| over 322 MHz to 10 GHz | 35 $\mu$ V/m and less |
| over 10 GHz to 150 GHz | 35 f$\mu$ V/m and less (provided that 500 $\mu$ V/m and less. f: Frequency) |
| over 150 GHz | 500 $\mu$ V/m and less |

Thus, according to the radio wave regulations, when the frequency is not greater than 322 MHz, the limit of the output is not so severe and a relatively strong field strength can be obtained. For this reason, if the frequency as high as possible within the range not greater than 322 MHz is employed, a sufficient frequency shift can be obtained during the frequency modulation and, also, a sufficient output within the limit of the radio wave regulations can be used to achieve a secure signal transmission. In particular, the frequency of the carrier wave is preferably within the range of 283 to 322 MHz. Since this frequency region is used in an aeronautical radio, the disturbance wave is excluded for securement of the safety and this frequency region is the one in which the external electromagnetic disturbances are minimized according to the radio wave regulations. Also, the aeronautical radio make use of an AM at steps of 0.1 MHz (the occupied bandwidth is so low as about plus and minus 3 kHz relative to the reference frequency) and, accordingly, if the FM system is used for modulation system, both the frequency and the modulation system can have a property robust to the external disturbances.

By setting the frequency of the carrier wave to a high value, that is, to a value as high as possible, but not exceeding 322 MHz, the following additional effects can also be obtained.

(1) Reduction in size of the tuning circuit of the receiving means 5A and shortening the antenna are possible and, hence, the antenna can be formed on a substrate in the form of a patterned electroconductive foil, making it possible to reduce in size of the circuit and also to reduce the price.

(2) Since increase of the frequency of the carrier wave results in shortening of the wavelength, tuning is possible even with a compact antenna, resulting in increase of the antenna efficiency. By way of example, considering that the wavelength of 2 MHz is 150 m, and that of 300 MHz is 1 m, the 300 MHz region allows the use of a ¼ wavelength antenna of 25 cm that is formed on the substrate in the form of a patterned electroconductive foil.

Since the antenna efficiency increases, the electric power required to transmit can be reduced, accompanied by reduction in the power consumption of the circuits.

(3) Since the high frequency wave has a strong directionality and the transmitting means can suppress an electromagnetic output to somewhere other than the receiving means whereas the receiving means can suppress reception of electromagnetic waves from a direction other than the transmitting means, the robust property to the external noise disturbances can be increased.

It is to be noted that although in this embodiment the frequency has been described as modulated, if the frequency of the carrier wave is chosen to be of a high value regardless of the modulation system, not only can an efficient antenna be fabricated, but a high S/N ration can also be obtained. For this reason, substantially without being adversely affected by noises, detection of the signal is possible. In the case of the frequency modulation, the influence which would be brought about by the noises can further be minimized.

Where an amplitude modulation (AM) is employed for the transmitting means 5A, the transmitting means 5A can have such a circuit structure as shown in FIG. 39. In the example shown in FIG. 39, wireless transmission is made from a transmitting coil 156 by turning on and off a carrier wave of a few hundreds MHz, oscillated by the oscillating circuit 152, by means of an output on and off transistor 155 with the use of pulses from the sensor 17 inputted from a sensor input unit 154, to thereby generate a modulated signal.

Figure 39A:
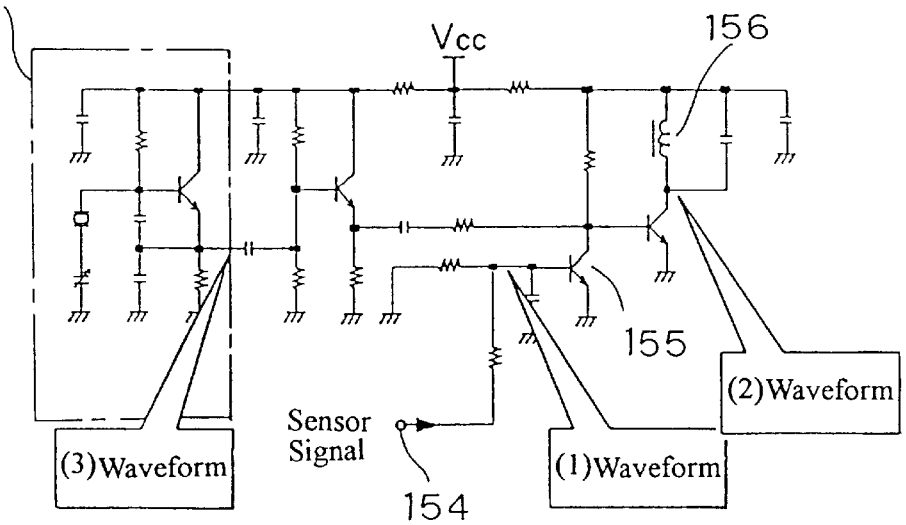
FIG. 39 is an electric circuit diagram of the wireless transmitting and receiving means used for reference purpose and an explanatory diagram showing waveforms appearing therein.
Figure 39B:
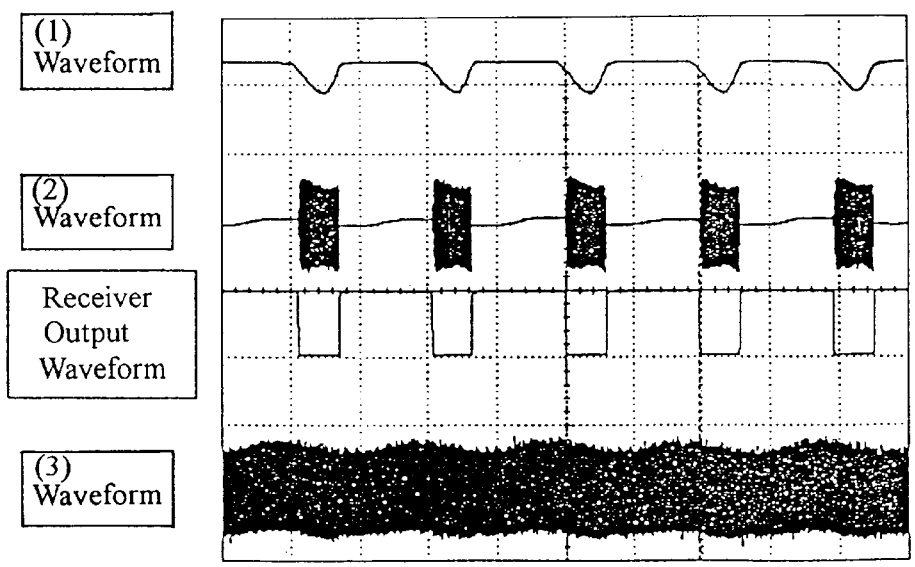
Figure 40:
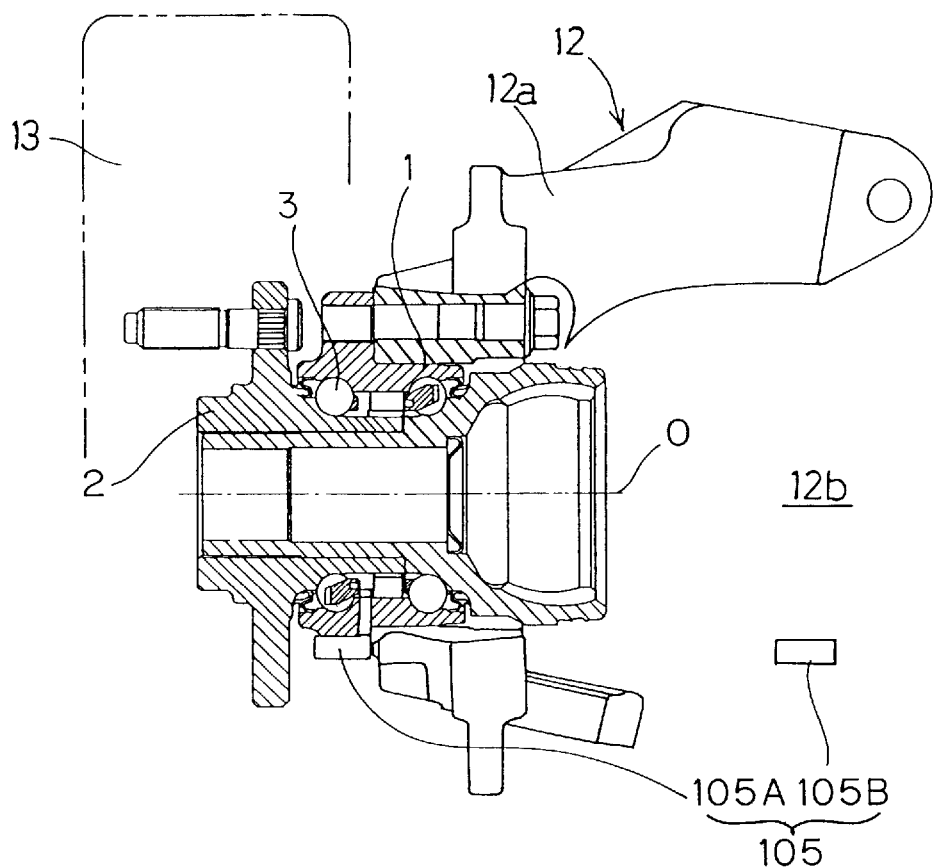
FIG. 40 is a sectional view showing the wheel support bearing assembly used in the anti-skid brake device according to the embodiment in which the wireless transmitting and receiving means utilizes a magnetic coupling, shown together with a transmitting means.
Figure 41:
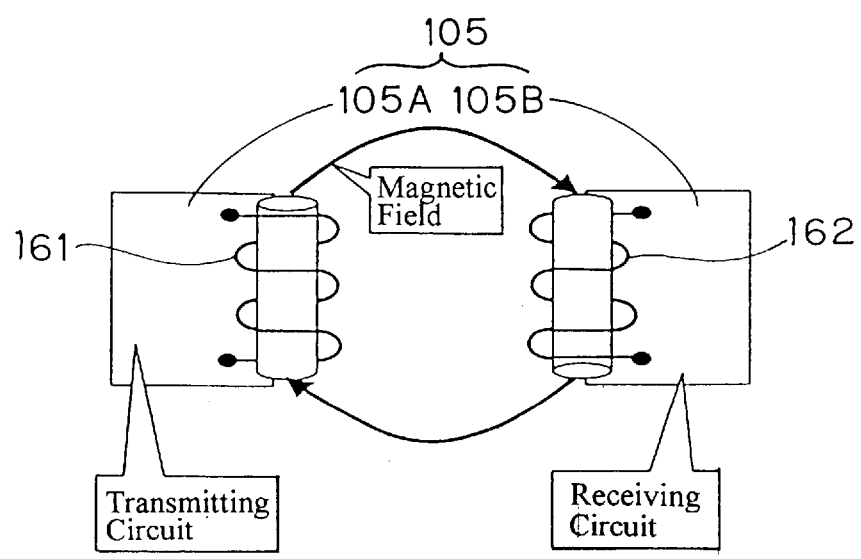
FIG. 41 is an explanatory diagram showing the wireless transmitting and receiving means used therein.

Waveforms of various portions (1), (2) and (3) shown in FIG. 39A and an output waveform of the receiving means are such as shown in FIG. 39B.

If the carrier wave is chosen to have a few hundreds MHz, a high S/N ratio can be secured. Thus, reception of an erroneous signal under the influence of noises does hardly occur and, for this reason, even though the transmitting means 5A and the receiving means 5B are housed within the tire housing while spaced a transmittance distance of 200 mm or longer, the signal from the sensor 17 can be received.

The function of the electric power circuit 143 shown in FIG. 37 will now be described. The claw-pole electric generator 4 such as used in the embodiment of FIGS. 4 and 5 and the embodiment of FIG. 6 can be rendered to be an electric generator capable of being compactized and multi-polarized as hereinbefore described, but it has the following demerits. In other words, at a low speed of rotation, the electric power generated is small and without taking any measure, drive of a transmitting circuit of the transmitting means 5A would become instable. Transmission of the sensor signal and operation of the transmitting circuit are possible when the number of revolutions is equal to or higher than 40 rpm (the vehicle speed is 5 km/h).

However, during deceleration at which the anti-skid brake device works, the sensor signal indicative of the number of revolutions of the wheel must be capable of being transmitted even when the number of revolutions is equal to or lower than 20 rpm (vehicle speed is 2 to 3 km/h).

In view of this, this embodiment makes use of the super capacitor 150 shown in FIG. 37 as an electric power circuit 143 for the transmitting means 5A of a type utilizing the claw-pole type electric generator 4. Because of this, it is possible to charge an electric power, generated during running, in a few seconds. In general, the length of time that takes before the braking is effected would require 0.8 second, the length of time that takes during an idle run would require 0.8 second, and the length of braking time would require 0.2 second (Braking Initial Speed: 5 km/h, Braking Distance: 5 m). If the electric power charged by the super capacitor 150 is used, the circuits of the transmitting means 5A can be driven for 10 seconds or longer. For this reason, even if the number of revolutions decreases to 20 rpm (vehicle speed is 2 to 3 km/h) and below, the electric power for driving the circuits can be supplied and the sensor signal indicative of the number of revolutions detected by the sensor 17 can be detected by means of a control circuit 136 (FIG. 34) until the number of revolutions attains 0 rpm (vehicle speed is 0 km/h).

Figure 38A:
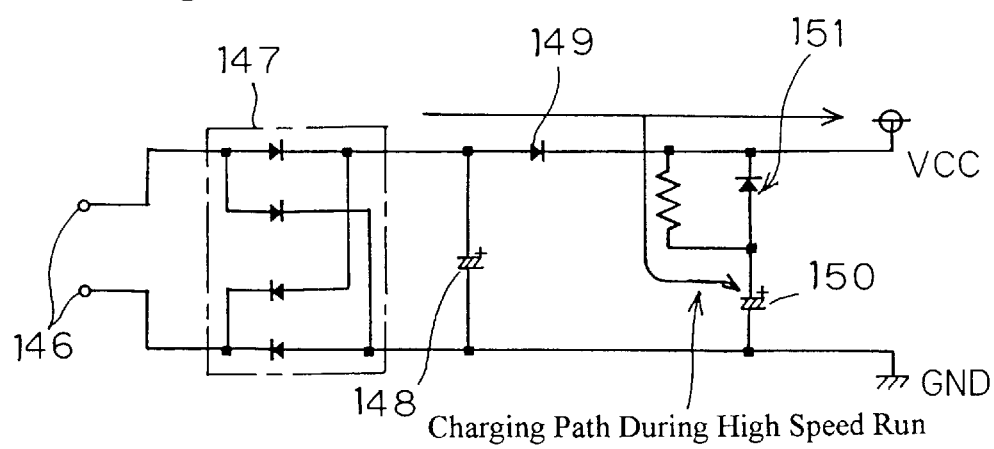
FIG. 38 is an explanatory diagram showing a circuit operation of the electric power circuit shown in FIG. 37.
Figure 38B:
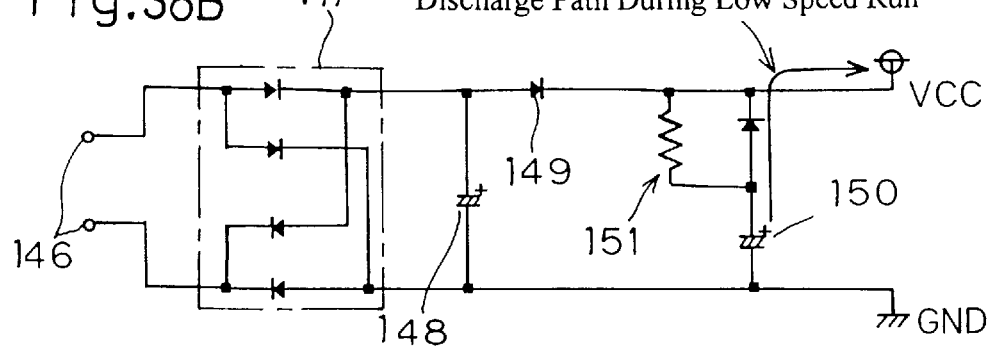

FIG. 38A illustrates a charging circuit of the electric power circuit 143 of FIG. 37 during a high speed running whereas FIG. 38B illustrates a discharge circuit thereof during a low speed running.

While the anti-skid brake device is used to secure a stable steerability during deceleration, storage of the required electric power during the high speed running so that reduction in generated electric power during deceleration can be compensated for is effective to allow the anti-skid brake device to be operated stably even when at a very low speed condition very approximating to stoppage, rather than being operated solely by the electric generator 4.

In the embodiment shown in FIG. 34, the wireless transmitting and receiving means 5 may be a wireless transmitting and receiving means 105 which as shown in FIGS. 40 to 43, wireless transmission is possible by the utilization of a magnetic coupling between a transmitting means 105A and a receiving means 105B. In such case, a transmitting coil 161 of the transmitting means 105A and a receiving coil 162 of the receiving means 105B have to be so arranged that respective centers of the coils lie at right angles with respect to an axis O of rotation of the wheel 13 and, at the same time, horizontally. It is to be noted that in the case of the front (steering) wheel, the receiving coil 162 is arranged so as to be perpendicular to the axis O of rotation, in other words, relative to the axis O of rotation in the case of a straight run in which the wheel 13 is not tilted relative to the automotive body structure 12. The transmitting means 105A and the receiving means 105B are, as is the case with the embodiment of FIG. 34, arranged on the wheel support member 1 and the automotive body structure 12 respectively. The receiving means 105B is arranged within the tire housing 12b in the automotive body structure 12.

Since the transmission system based on the magnetic coupling has a directionality, influence on peripheral equipments is minimal and, therefore, any erroneous operation resulting from external disturbances can be prevented.

Also, in communication using magnetism, depending on the ratio between the diameter and the length of the transmitting coil 161 and depending on the distance between the transmitting coil 161 and the receiving coil 162, there is a case in which the transmitting coil 161 and the receiving coil 162 are to be arranged in parallel to each other or a case in which they are to be arranged in series with each other. Where the transmitting coil 161 and the receiving coil 162 are arranged on the wheel support member 1 and the automotive body structure 12, respectively, the distance between these coils 161 and 162 is too large and, therefore, the series arrangement is generally preferred. However, in such case, deviation would occur in axes of coil ends as a result of up and down bumping of the wheel 13, resulting in a considerable change in transmission efficiency.

Figure 42:
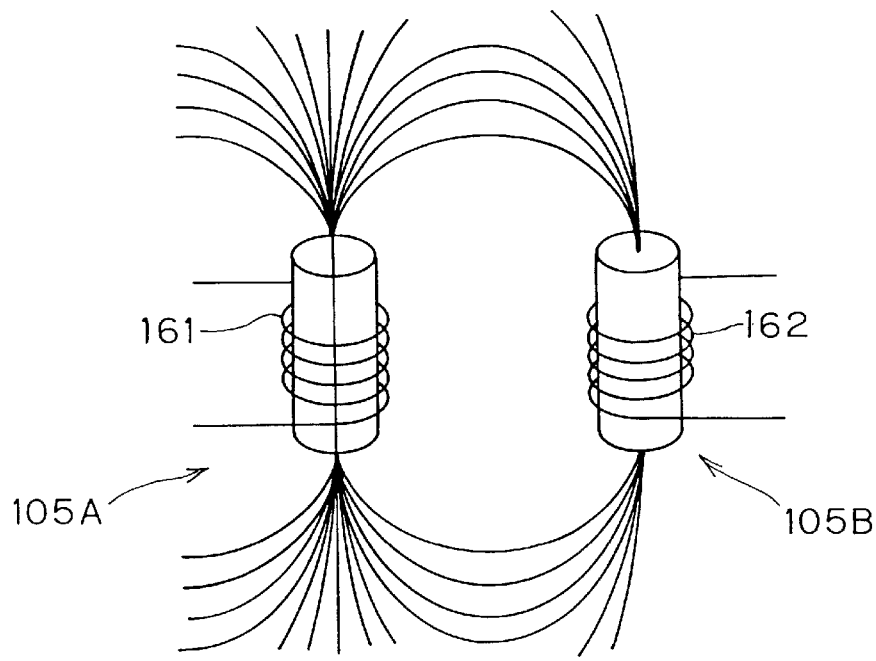
FIG. 42 is an explanatory diagram showing a magnetic field developed in the wireless transmitting and receiving means shown therein.

For this reason, the transmitting coil 161 and the receiving coil 162 are so arranged that these coils 161 and 162 lie at right angle relative to the axis O of rotation of the wheel 13 and horizontally. By so doing, even though the wheel 13 undergoes up and down bumping, change in magnetic field towards the receiving coil 162 can be suppressed more than the series arrangement. In other words, since the magnetic field is developed in a toroidal form with respect to the axis of the transmitting coil 161 as shown in FIG. 42, the employment of the above described arrangement of the transmitting and receiving coils 161 and 162 is effective to minimize the influence of change in magnetic field towards the receiving coil 162 even though the wheel 13 and the transmitting coil 161 undergo up and down bumping. Accordingly, wireless transmission and receiving of the signal indicative of the number of revolutions that is stable against vibrations brought about by running can be achieved.

Figure 43A:
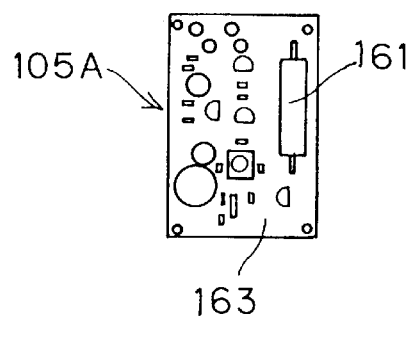
FIGS. 43A and 43B are explanatory diagrams showing an example of a circuit substrate for the transmitting means and the receiving means used in the wireless transmitting and receiving means, respectively.
Figure 43B:
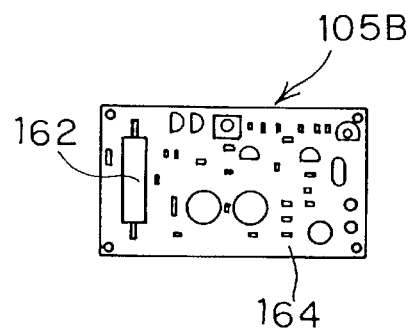

The transmitting means 105A and the receiving means 105B are of respective structures in which the transmitting coil 161 and the receiving coil 162 and electronic circuit elements are mounted on circuit substrates 163 and 164 and are then accommodated within a casing (not shown) as shown in, for example, FIGS. 43A and 43B.

In the wireless transmitting and receiving means 105 utilizing the magnetic coupling, the sensor signal can be transmitted by modulating the carrier wave with the sensor signal as is the case in which it is performed by means of the feeble radio wave, and as an electric power source for the transmitting means 105A, an electric power generated by the electric generator 4 utilizing the sensor 17 as the stator can be employed.

By way of example, the transmitting means 105A and the receiving means 105B are such that in the transmitting means 5A and the receiving means 5B utilizing the feeble radio waves as shown in FIG. 36, the transmitting coil 161 and the receiving coil 162 (FIG. 41) are provided in place of antennas 142 and 145, and the oscillating and modulating circuit 141, the power source circuit 143 and the tuned demodulating circuit 144 are used as those described together with the same figure.

Even in the case of the wireless transmitting means 105 based on the magnetic coupling, the modulation system is preferred to be the frequency modulation, rather than the amplitude modulation because the influence brought about by external disturbances can be minimized.

Figure 44:
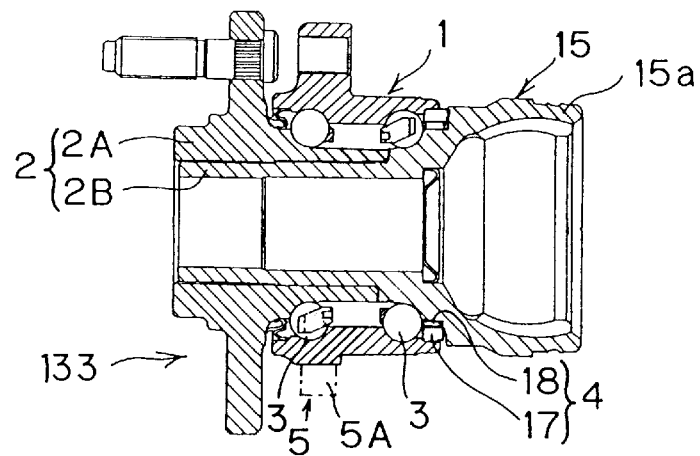
FIG. 44 is a sectional view of the anti-skid brake device according to a yet further preferred embodiment of the present invention.
Figure 45A:
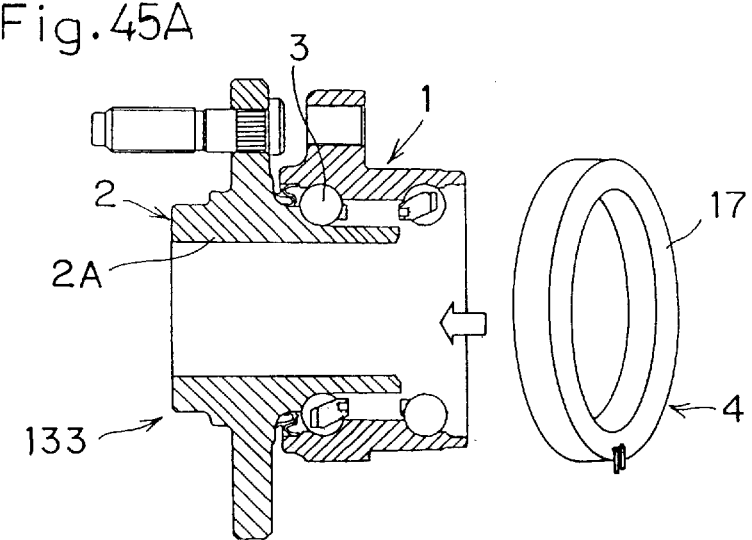
FIG. 45 is an explanatory diagram showing a process of assembling the anti-skid brake device shown in FIG. 44.
Figure 45B:
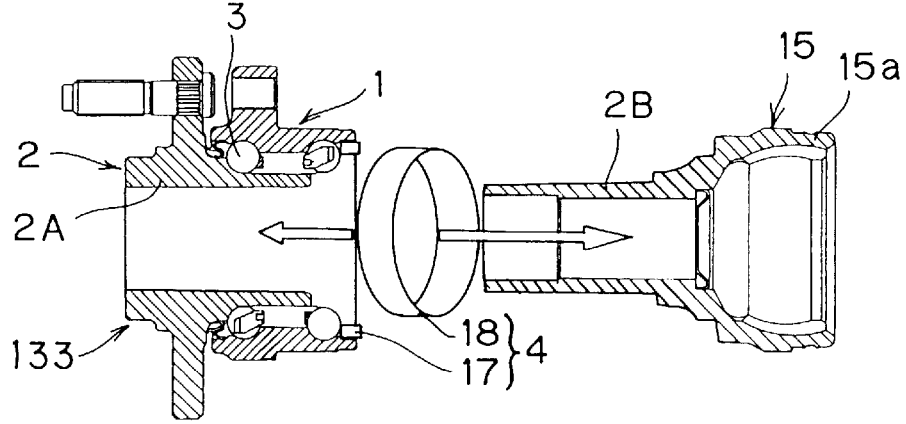

FIGS. 44 and 45 illustrate a further embodiment of the present invention. In this embodiment, the electric generator 4 is arranged at one end of the annular space between the wheel support member 1 and the rotary member 2 which serve as outer and inner races of the wheel bearing apparatus 133, respectively. In other words, the sensor 17 which is the stator of the electric generator 4 is press-fitted into the inner peripheral portion at one end of the wheel support member 1 as shown by the arrow in FIG. 45A. At this time, electrode portions are arranged so as to be oriented downwardly. As shown in FIG. 45B, a pulsar ring 18 which serves as the rotor of the electric generator 4 is mounted on an outer peripheral portion of an inner race forming member 2B which concurrently serves as an outer race 15a of the constant speed joint 15. In this condition, the inner race forming member 2B is press-fitted and mounted into the hub wheel 2A of the rotary member 2.

In the case of this structure, the electric generator 4 and the seal are integrated together, and no sealing element at the inner end of the wheel bearing apparatus 133 is necessary. Also, as compared with the structure in which the electric generator 4 is incorporated in between the plural rows of the rolling elements 3 of the wheel support bearing assembly 133, the electric generator 4 can easily be detached. Also, with no need to form in the wheel support member 1 the hole through which the electric wire or connector assembly for connecting the electric power 4 and the transmitting means 5A, the wiring connection is possible. Because of these, the number of component parts can be reduced and the number of assembling steps for assemblage of the electric power 4 can also be reduced, exhibiting an excellent maintenance of the electric generator 4 and the transmitting means 5A.

A measure used to achieve a constant voltage of the electric generator 4 that is used in any of the various embodiments shown in FIGS. 34 and 44 will now be described. Since the electric generator 4 is a rotary type, the amount of an electric power generated increase with increase of rotation (high frequency). For this reason, the amount of an induced voltage generated from the electric generator 4 will be too much at the high rotation, posing a possibility that some electronic component parts of the circuits will be damaged. Accordingly, it is undesirable to allow it to rotate at a rate greater than a predetermined number of revolutions. Accordingly, there is a need to take any countermeasure, such as the use of a constant voltage circuit, to avoid breakage of the circuits even at a high speed rotation.

In this connection, a material for the ring member 19 of the sensor 17 which serves as the stator of the electric generator 4 is chosen to be a material having a high saturation at a high frequency, in place of a standard silicon steel plate. Also, the number of turns of the coil 200 is chosen to be not less than 200 turns and the wire diameter is chosen to be not greater than 0.32 mm.

Figure 46:
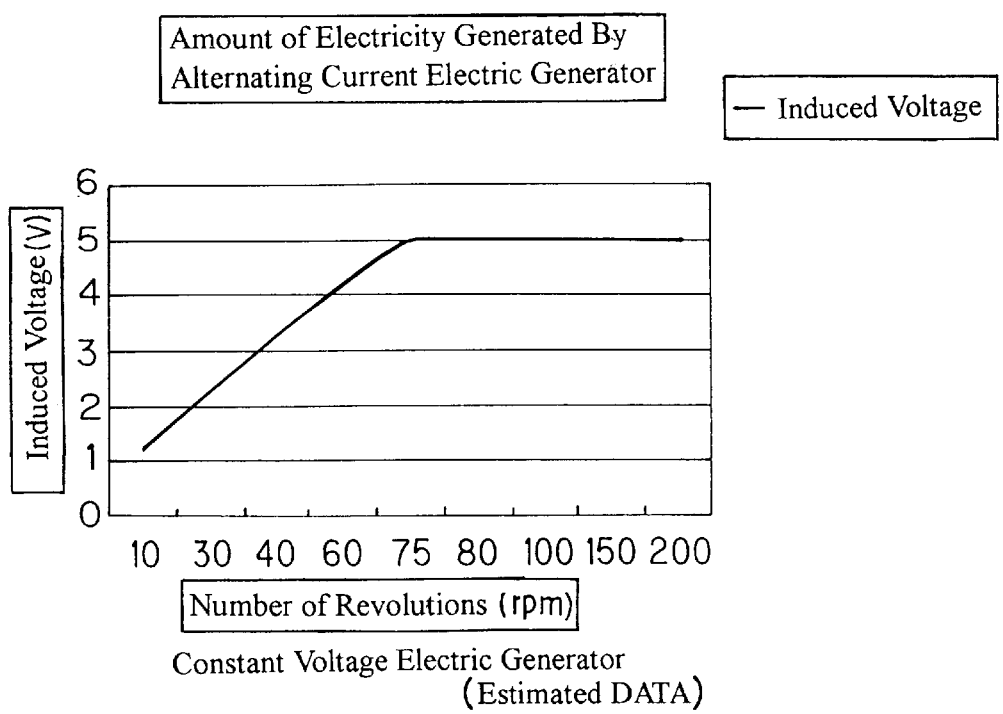
FIG. 46 is an explanatory diagram showing a constant voltage characteristic of the electric generator.

By this countermeasure, the amount of the generated electric power which does not result in damage to the circuit component parts even at the high speed rotation can be maintained. By way of example, such an alternating current generator generated electric power amount as shown in FIG. 46 can be obtained and, therefore, without the electronic component parts of the transmitting means 5A being broken even at the high speed rotation, the electric power source (+5V) for driving can be stably supplied to the transmitting circuit. For this reason, the use of the constant voltage circuit can be avoided advantageously.

The reason why the constant voltage is attained will be described. An output voltage (Ve) of the electric generator can be expressed by V=K·N, wherein K represents a constant determined by the structure of the electric generator and N represents the number of revolutions, and represents a generated voltage proportional to the number of revolutions. But, if a load is in practice connected, it is possible to cause the voltage to saturated.

If an internal resistance of the electric generator is expressed by Re, an inductance component (a coil component) thereof is expressed by Le, a load resistance (assumed to be a pure resistance) to be connected with an output of the electric generator power is expressed by R, and a voltage across the load is expressed by V, the following relation can be found:

$$V=Ve\cdot(R/(R+(Re+j\omega Le)))$$

$$=K\cdot N\cdot R/(R+Re+j\omega Le) \quad (1)$$

wherein:

K1=K·R

R1=R+Re

Also, since ω represents the angular velocity proportional to the number of revolutions, the relationship of jω=K2·N can be obtained and the equation (1) above can be rewritten as follows.

$$V=K1\cdot N/(R1+K2\cdot N) \quad (2)$$

From this equation it will be readily understood that if the number of revolutions N increases and when R1<<K2·N is attained, it will attain a constant value that is expressed by V≈K1/K2 and that a saturation characteristic is given to the output voltage of the electric generator.

If the maximum operating voltage (if this is exceeded, damage is liable to occur) and the resistance value of the transmitting means which is the load are known, there is no need to provide the transmitting means with a voltage protection circuit and the price of the transmitting means circuit can be reduced.

Since the output voltage Ve (at no load) of the electric generator is:

$$Ve=1.414\cdot\pi\cdot Kw\cdot f\cdot W\cdot\Phi$$

Wherein Kw represents a winding constant, f represents the frequency (proportional to the number of magnetic poles of a rotary magnet and the number of revolutions), W represents the number of winding turns and Φ represents the maximum magnetic flux of the rotary magnet.

Also, since the internal resistance is represented by Re W/S (wherein S represents the sectional area (thickness) of a wire) and the inner inductance is represented by Le W (noting that because of the presence of a component dependent on a magnetic circuit, analysis of the magnetic circuit including a coil frame, a magnet and hub metal portions is necessary), the magnet, the winding, the number of turns and so on have to be determined in reference to the dimensions, the prices and others that are limited depending on the condition of incorporation.

Figure 47:
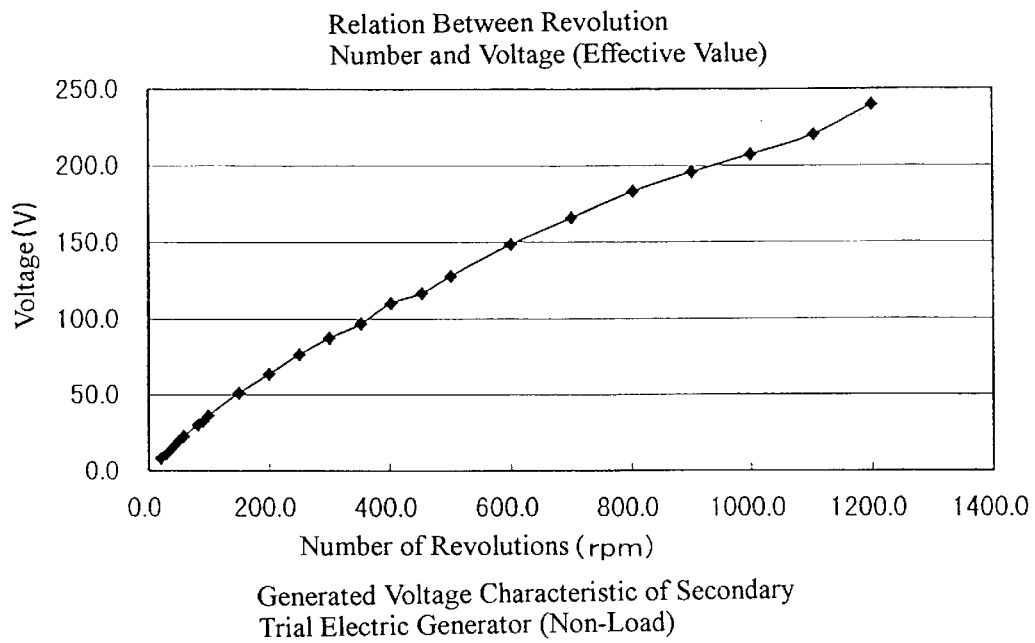
FIG. 47 is a graph showing the relationship between the number of revolutions during a non-loaded operation and an output voltage in an experimental case designed to achieve a constant voltage in the electric generator.
Figure 48:
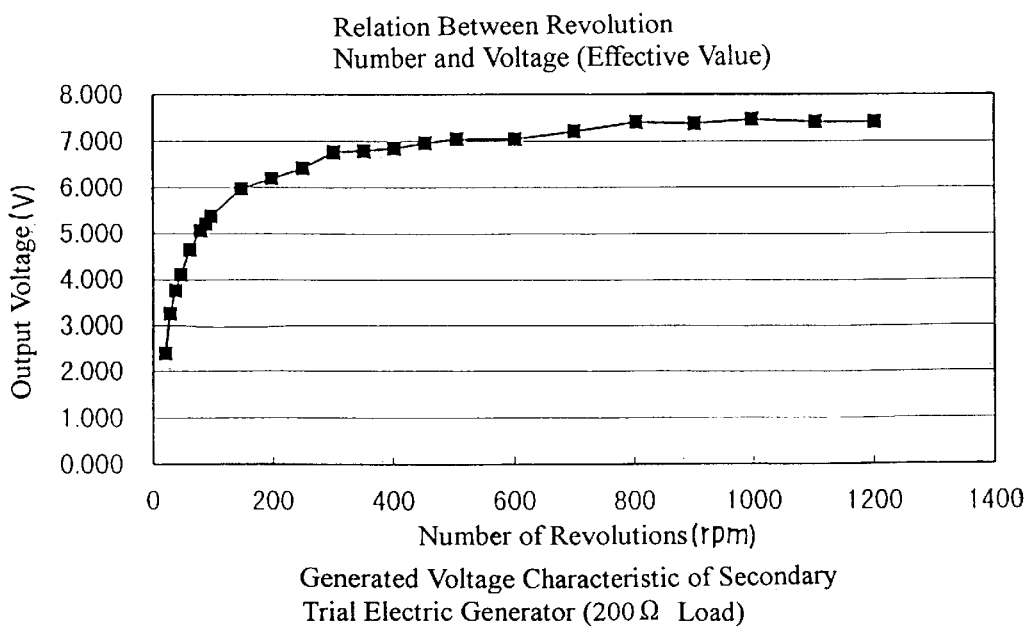
FIG. 48 is a graph showing the relationship between the number of revolutions during a loaded operation and an output voltage in an experimental case designed to achieve a constant voltage in the electric generator.
Figure 49:
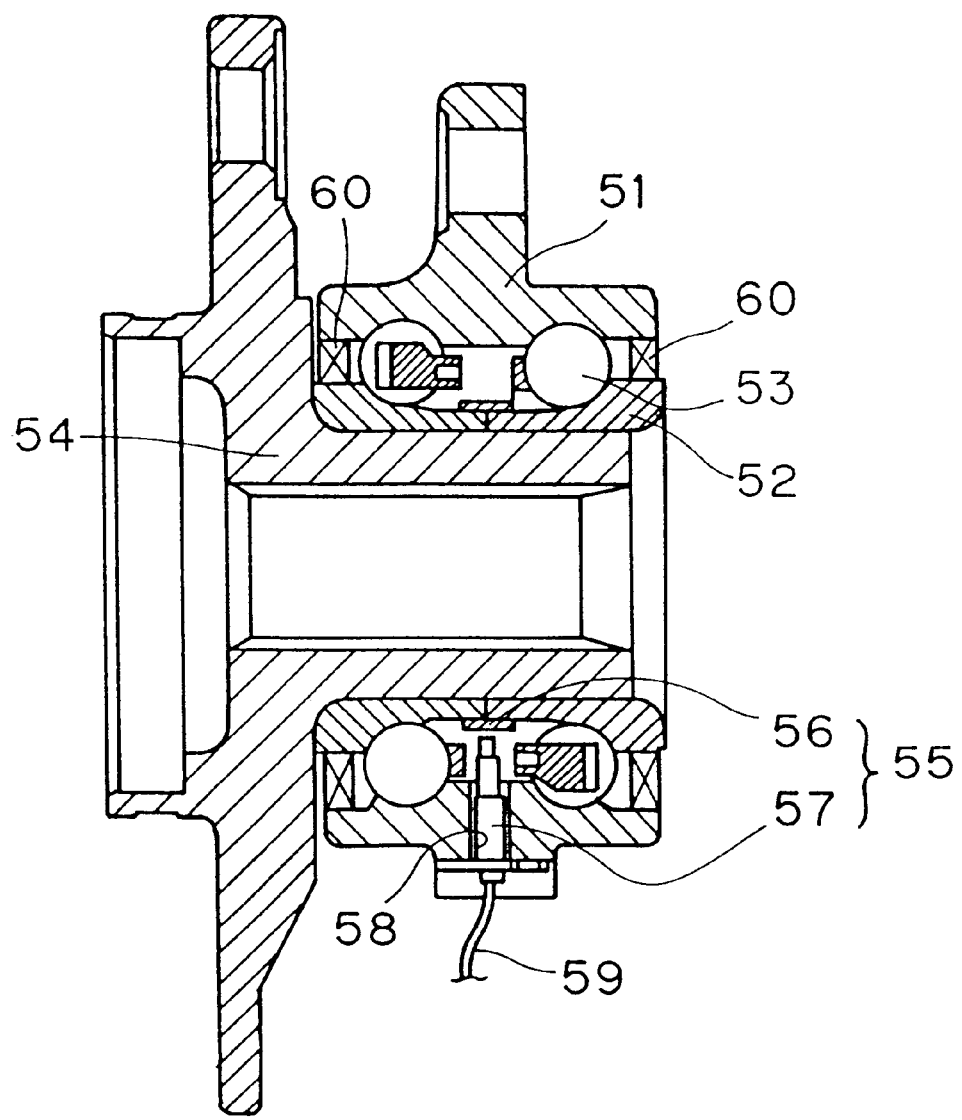
FIG. 49 is a sectional view of the prior art wheel support bearing assembly.

In this way, with the electric generator in which the magnet, the winding, the number of turns and others are properly determined, relationships between the number of revolutions and the induced voltage such as shown in FIGS. 47 and 48, respectively, could be obtained at a non-load condition and a 200 Ω loaded condition.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly for rotatably supporting a wheel relative to an automotive body structure, said bearing assembly comprising:

an outer member having an inner peripheral surface formed with plural rows of raceways;

an inner member having raceways defined therein in face-to-face relation with the raceways in the outer member;

plural rows of rolling elements accommodated between the raceways in the outer and inner members;

an electric generator for generating an electric power as one of the outer and inner members rotates relative to the other of the outer and inner members; and a wireless transmitting means for transmitting wireless a signal indicative of a number of revolutions of the wheel that is outputted from the electric generator.

2. The wheel support bearing assembly as claimed in claim 1, wherein one of the outer and inner members is provided with a wheel fitting flange.

3. The wheel support bearing assembly as claimed in claim 1 or 2, wherein one of the outer and inner members is provided with a vehicle body fitting flange.

4. The wheel support bearing assembly as claimed in any one of claim 1, wherein the electric generator comprises a ring member made of a magnetic material and accommodating a coil therein, and a multi-pole magnet and wherein the ring member is provided in one of the outer and inner members and the multi-pole magnet is provided in the other of the outer and inner members.

5. The wheel support bearing assembly as claimed in claim 4, wherein the ring member and the multi-pole magnets are arranged between the plural rows of the raceways formed in the outer and inner members.

6. The wheel support bearing assembly as claimed in claim 4, wherein at least one of the ring member and the multi-pole magnet is formed integrally with a sealing member for sealing an open end between the outer and inner members.

7. The wheel support bearing assembly as claimed in claim 6, further comprising a sealing member for preventing ingress of foreign matter into a gap between the ring member and the multi-pole magnet.

8. The wheel support bearing assembly as claimed in any one of claims 4 to 7, wherein the ring member has a sectional shape representing a groove shape and includes a plurality of comb-shaped claws bent from an open edge of one of the opposite side faces of the groove towards the other of the opposite side faces, said comb-shaped claws being alternately interleaved with each other in a direction circumferentially thereof.

9. The wheel support bearing assembly as claimed in claim 8, the comb-shaped claws on one of the opposite side faces of the ring member and the comb-shaped claws on the other of the opposite side faces of the ring members are spaced a predetermined distance in a direction circumferentially of the ring member.

10. The wheel support bearing assembly as claimed in claim 8, wherein each of the comb-shaped claws in the ring member has a width progressively decreasing in a direction towards a free end of the respective claw.

11. The wheel support bearing assembly as claimed in claim 1, wherein the transmitting means includes an annular transmitter.

12. The wheel support bearing assembly as claimed in claim 4, wherein the transmitting means includes an annular transmitter, said annular transmitter being integrated together with the ring member forming a part of the electric generator.

13. The wheel support bearing assembly as claimed in claim 11, wherein the ring member and the transmitter are arranged so as to overlap with each other in their radial directions.

14. The wheel support bearing assembly as claimed in claim 4, wherein the transmitting means includes an annular transmitter, said annular transmitter being integrated together with the ring member, said ring member being fitted to an end portion of the inner member, and further comprising a sealing member for sealing an open end between the inner and outer members, said sealing member being fitted to the outer member so as to be held in contact with an outer periphery of the ring member.

15. The wheel support bearing assembly as claimed in claim 4, wherein the transmitting means includes an annular transmitter, said annular transmitter being integrated together with the ring member, and wherein the multi-pole magnet is formed integrally with a sealing member for sealing an open end between the outer and inner members, and wherein two components made up of an assembly including the transmitter and the ring member and an assembly including the multi-pole magnet and the sealing member are used to seal the open end.

16. The wheel support bearing assembly as claimed in claim 1, wherein the outer member includes a vehicle body fitting flange formed integrally with an outer periphery thereof and the inner member has one end provided with a wheel fitting flange, wherein the electric generator includes a stator mounted on an inner diametric portion of the outer member at a location between the plural rows of the rolling elements, and a rotor mounted on the inner member in face-to-face relation with the stator, and wherein the transmitting means is mounted on an outer surface of the outer member, and further comprising a connector assembly for connecting between the transmitting means and the stator, said connector assembly being of a type capable of achieving the connection on a one-touch basis.

17. The wheel support bearing assembly as claimed in claim 16, wherein the connector assembly includes a socket and a plug that are inserted relative to each other, said socket being provided in the stator and having a plug-in opening oriented radially outwardly, said plug being provided in the transmitting means and extending radially inwardly through a radial hole defined in the outer member with contact elements at a free end thereof adapted to be inserted into and connected to the plug-in opening.

18. The wheel support bearing assembly as claimed in claim 16, wherein the connector assembly includes a socket and a plug that are inserted relative to each other, said socket being provided in the transmitting means and extending radially inwardly through a radial hole defined in the outer member and having an axially oriented plug-in opening at a free end thereof, said plug being provided in the stator.

19. The wheel support bearing assembly as claimed in any one of claims 16 to 18, wherein the electric generator is a claw-pole type.

20. The wheel support bearing assembly as claimed in claim 16, wherein the inner member is a flanged member having a wheel fitting flange and combined with other member and wherein one of the raceways is defined in the flanged member and the other of the raceways is defined in the other member.

21. The wheel support bearing assembly as claimed in claim 16, wherein the inner member is a flanged member having a wheel fitting flange and combined with other member and wherein the other member is an inner race which is a component dedicated for formation of the raceways and is press-fitted into an outer peripheral surface of the flanged member.

22. The wheel support bearing assembly as claimed in claim 16, further comprising a positioning engagement portion provided at at least one circumferential location of an inner peripheral surface of the outer member, and an engaged portion formed in an outer peripheral surface of the stator for engagement with the engagement portion.

23. An anti-skid brake device provided with a wheel support bearing assembly as set forth in claim 1, wherein the electric generator includes a pulsar ring mounted on a rotary member of a wheel, and a sensor mounted on a wheel support member in face-to-face relation with the pulsar ring and wherein the transmitting means is installed on the wheel support member, said anti-skid brake device being operable to control a braking force in response to a signal indicative of a number of revolution of a wheel that has been detected, said anti-skid brake device comprising:

a control circuit installed on a vehicle body structure for controlling the braking force, and a wireless transmitting and receiving means including the transmitting means and a receiving means installed on the vehicle body structure for transmitting and receiving wireless a signal of the sensor, and said transmitting means being capable of transmitting a feeble radio wave by frequency modulating a carrier wave with the signal of the sensor.

24. An anti-skid brake device provided with a wheel support bearing assembly as set forth in claim 1, wherein the electric generator includes a pulsar ring mounted on a rotary member of a wheel, and a sensor mounted on a wheel support member in face-to-face relation with the pulsar ring and wherein the transmitting means is installed on the wheel support member, said anti-skid brake device being operable to control a braking force in response to a signal indicative of a number of revolution of a wheel that has been detected, said anti-skid brake device comprising:

a control circuit installed on a vehicle body structure for controlling the braking force, and a wireless transmitting and receiving means including the transmitting means and a receiving means installed on the vehicle body structure for transmitting and receiving wireless a signal of the sensor, and said wireless transmitting and receiving means being of a type capable of transmitting and receiving wireless by means of a magnetic coupling between the transmitting means and the receiving means, a transmitting coil of the transmitting means and a receiving coil of the receiving means being arranged such that respective centers of those coils lie at right angles to an axis of revolution of the wheel and horizontally.

25. The anti-skid brake device as claimed in claim 23 or 24, wherein the transmitting means makes use of an electric power generated by the electric generator as an electric power source, and further comprising a super capacitor added to an electric power circuit connected with the electric generator of the transmitting means for compensating for reduction in the electric power generated during a low speed revolution of the wheel.

* * * * *